US012619344B2

(12) United States Patent
Bowler et al.

(10) Patent No.: US 12,619,344 B2
(45) Date of Patent: May 5, 2026

(54) GRAPHICAL USER INTERFACE FOR CONTROLLING EXTENDED SPECTRUM DOCSIS AMPLIFIER

(71) Applicant: ARRIS Enterprises LLC, Horsham, PA (US)

(72) Inventors: David B. Bowler, Stow, MA (US); Jeffrey A. Boast, Colmar, PA (US); Michael R. Morisseau, Lowell, MA (US); Samuel D. Francois, Lowell, MA (US); Brent D. Arnold, Doylestown, PA (US)

(73) Assignee: ARRIS Enterprises LLC, Horsham, PA (US)

( * ) Notice: Subject to any disclaimer, the term of this patent is extended or adjusted under 35 U.S.C. 154(b) by 168 days.

(21) Appl. No.: 18/424,658

(22) Filed: Jan. 26, 2024

(65) Prior Publication Data

US 2024/0256113 A1 Aug. 1, 2024

Related U.S. Application Data

(60) Provisional application No. 63/625,210, filed on Jan. 25, 2024, provisional application No. 63/501,344, filed on May 10, 2023, provisional application No. 63/441,389, filed on Jan. 26, 2023, provisional application No. 63/441,416, filed on Jan. 26, 2023.

(51) Int. Cl.
| | |
|---|---|
| *G06F 3/04847* | (2022.01) |
| *G06F 3/04817* | (2022.01) |
| *H04B 3/04* | (2006.01) |
| *H04L 12/28* | (2006.01) |
| *H04N 7/10* | (2006.01) |

(52) U.S. Cl.
CPC ...... *G06F 3/04847* (2013.01); *G06F 3/04817* (2013.01); *H04B 3/04* (2013.01); *H04L 12/2801* (2013.01); *H04N 7/102* (2013.01)

(58) Field of Classification Search
None
See application file for complete search history.

(56) References Cited

U.S. PATENT DOCUMENTS

| | | | | | |
|---|---|---|---|---|---|
| 5,231,660 | A | * | 7/1993 | West, Jr. | H04N 7/102 455/240.1 |
| 2022/0345788 | A1 | * | 10/2022 | Mäki | H03G 9/00 |

FOREIGN PATENT DOCUMENTS

| | | | | | |
|---|---|---|---|---|---|
| EP | 2182647 | A2 | * | 5/2010 | H04N 7/102 |
| EP | 2182647 | B1 | | 8/2016 | |

OTHER PUBLICATIONS

International Search Report and Written Opinion RE: Application No. PCT/US2024/013247, dated Jun. 5, 2024.

* cited by examiner

*Primary Examiner* — Tuan S Nguyen
(74) *Attorney, Agent, or Firm* — Chernoff, Vilhauer, McClung & Stenzel, LLP

(57) ABSTRACT

Devices and methods that present a graphical user interface (GUI) by which a user may manually adjust the level and tilt settings of an amplifier in a communications network. The GUI preferably includes a plurality of user-interactive icons for making the adjustments, where the effects of the adjustments on level and tilt are contemporaneously shown in the display.

20 Claims, 53 Drawing Sheets

| Downstream Parameter | | Specification |
|---|---|---|
| Frequency Split, MHz[1] | 042 Slpit | 54-1218 |
| | 065 Slpit | 85-1218 |
| | 085 Slpit | 102-1218 |
| | 204 Slpit | 258-1218 |
| Flatness, dB[2] | | ±0.75 |
| Operational Gain, dB[3] | | 47 |
| Internal Slope (Slope Option X), dB[4] | 042 Slpit | 16.1 |
| | 065 Slpit | 15.2 |
| | 085 Slpit | 14.7 |
| | 204 Slpit | 11.5 |

| File | Edit | Mode | Tools | Global Change | Spec Edit | Test | Misc | Reports |

| 🗋 🗁 🖫 ↰ ↱ ✛ ━ 🖾 ➜ ✎ 🔲 EQ | Auto ▾ | OP | Off ▾ | DEV |

| 0 Alter | 1 Jump | 2 Forward | 3 Carry | 4 Fwd2A | 5 Test | 6 WillWrk |
| .0 Break | .1 Join | .2 BkFeed | .3 UnBkFD | .4 XFd2A | .5 MoveCpl | .6 XWillWK |
| ..0 SpcVw | ..1 Xspec | ..2 FwdFd | ..3 UnFFd | ..4 BrLabel | ..5 Dsmry | ..6 Clear |

| Node | 1794 | 492 | 396 | 108 | ftg | hc | cab | lv | Amp | TSG |
|---|---|---|---|---|---|---|---|---|---|---|
| 1 | 55.53 | 37.51 | 8.75 | 8.38 | 75 | | 411 | | | |
| 2 | 49.73 | 33.01 | 13.15 | 12.48 | 0 | 2 | 411 | | | |
| 3 | 43.39 | 29.83 | 16.05 | 14.30 | 140 | | 101 | | | |
| 4 | 33.77 | 23.67 | 21.93 | 18.13 | 192 | 2 | 401 | | | |
| 5 | 25.23 | 18.09 | 27.13 | 22.35 | 140 | 2 | 401 | | | |
| 6 | 15.85 | 11.54 | 33.29 | 27.50 | 144 | | 401 | | 31 | |
| 7 | 57.40 | 38.41 | 8.00 | 8.00 | 0 | 2 | 401 | | | |
| 8 | 52.31 | 35.87 | 10.32 | 9.46 | 108 | | 401 | | | |
| 9 | 44.39 | 30.51 | 15.50 | 12.92 | 145 | 2 | 401 | | | |
| 10 | 33.67 | 23.19 | 22.42 | 18.88 | 95 | 1 | 401 | | | |
| 11 | 28.73 | 19.31 | 26.12 | 22.30 | 40 | | 401 | | | |
| 12 | 24.12 | 17.14 | 28.04 | 23.33 | 128 | | 401 | | | |
| 13 | 22.50 | 16.37 | 28.72 | 23.69 | 45 | | 401 | | 32 | |
| 14 | 57.40 | 38.41 | 8.00 | 8.00 | 0 | 1 | 401 | | | |
| 15 | 54.69 | 37.00 | 9.33 | 8.94 | 42 | 4 | 401 | | | |
| 16 | 50.53 | 34.75 | 11.31 | 10.32 | 85 | 4 | 401 | | | |
| 17 | 45.44 | 32.10 | 13.76 | 12.99 | 97 | 4 | 401 | | | |
| 18 | 39.69 | 28.72 | 16.86 | 15.34 | 93 | 4 | 401 | | | |
| 19 | 34.16 | 25.24 | 20.16 | 17.93 | 87 | 4 | 401 | | | |
| 20 | 26.55 | 19.53 | 25.70 | 22.84 | 89 | | 401 | | 33 | |
| 21 | 57.40 | 38.41 | 8.00 | 8.00 | 0 | 4 | 401 | | | |
| 22 | 52.92 | 36.01 | 10.11 | 9.45 | 94 | 4 | 401 | | | |
| 23 | 48.54 | 33.67 | 12.18 | 10.88 | 91 | 2 | 401 | | | |
| 24 | 42.09 | 30.43 | 15.12 | 12.72 | 143 | 2 | 401 | | | |
| 25 | 31.26 | 23.07 | 22.09 | 18.71 | 98 | 4 | 401 | | | |
| | 26.86 | 18.87 | 26.29 | 22.91 | | | | | | |
| | | | | | 64 | | | | | |
| | | | 62 | | | | | | | |

*FIG. 4*

Figure 4:
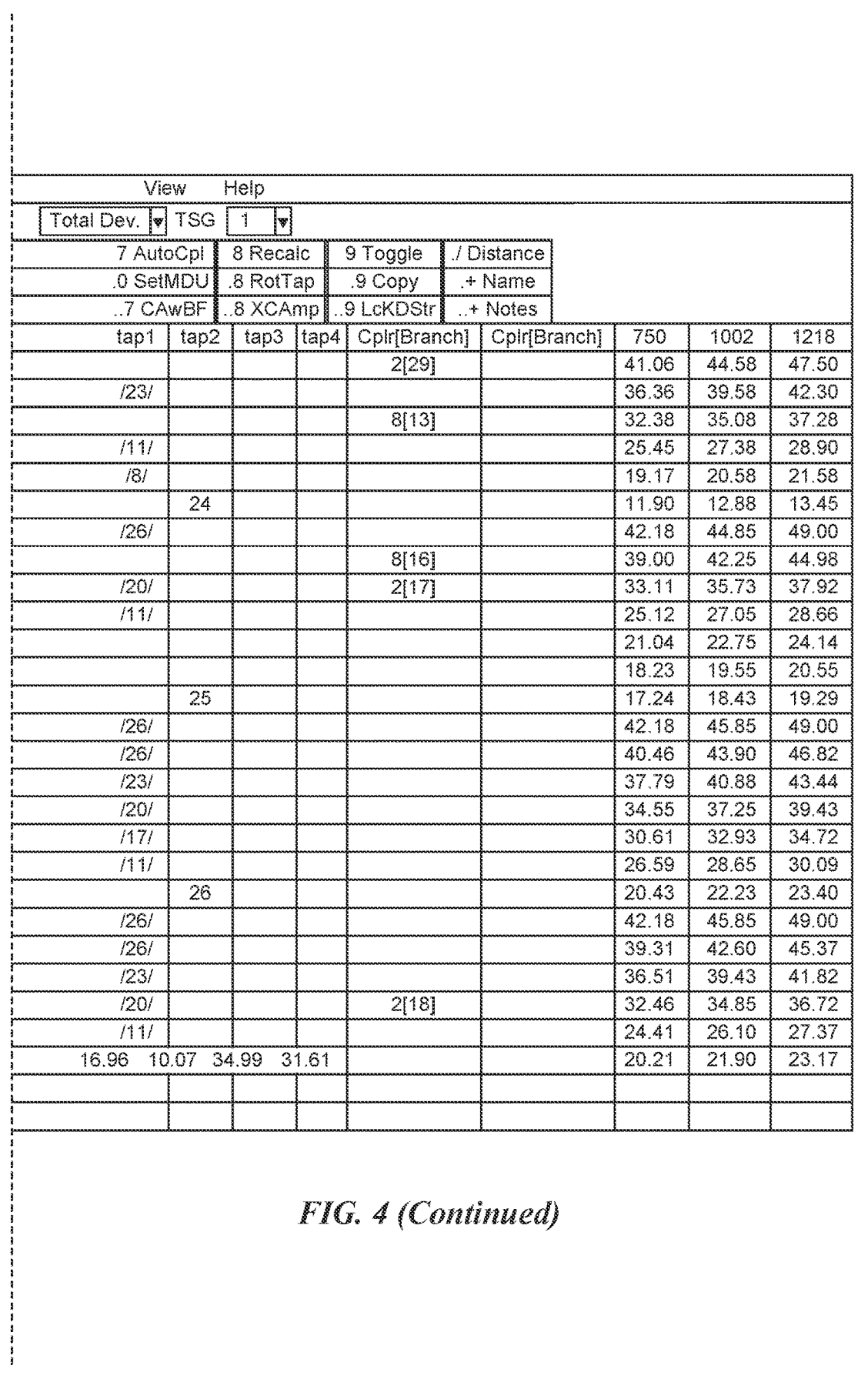

| View | Help | | | | | | | |
|---|---|---|---|---|---|---|---|---|
| Total Dev. ▼ | TSG | 1 ▼ | | | | | | |

| 7 AutoCpl | 8 Recalc | 9 Toggle | ./ Distance |
|---|---|---|---|
| .0 SetMDU | .8 RotTap | .9 Copy | .+ Name |
| ..7 CAwBF | ..8 XCAmp | ..9 LcKDStr | ..+ Notes |

| tap1 | tap2 | tap3 | tap4 | Cplr[Branch] | Cplr[Branch] | 750 | 1002 | 1218 |
|---|---|---|---|---|---|---|---|---|
| | | | | 2[29] | | 41.06 | 44.58 | 47.50 |
| /23/ | | | | | | 36.36 | 39.58 | 42.30 |
| | | | | 8[13] | | 32.38 | 35.08 | 37.28 |
| /11/ | | | | | | 25.45 | 27.38 | 28.90 |
| /8/ | | | | | | 19.17 | 20.58 | 21.58 |
| | 24 | | | | | 11.90 | 12.88 | 13.45 |
| /26/ | | | | | | 42.18 | 44.85 | 49.00 |
| | | | | 8[16] | | 39.00 | 42.25 | 44.98 |
| /20/ | | | | 2[17] | | 33.11 | 35.73 | 37.92 |
| /11/ | | | | | | 25.12 | 27.05 | 28.66 |
| | | | | | | 21.04 | 22.75 | 24.14 |
| | | | | | | 18.23 | 19.55 | 20.55 |
| | 25 | | | | | 17.24 | 18.43 | 19.29 |
| /26/ | | | | | | 42.18 | 45.85 | 49.00 |
| /26/ | | | | | | 40.46 | 43.90 | 46.82 |
| /23/ | | | | | | 37.79 | 40.88 | 43.44 |
| /20/ | | | | | | 34.55 | 37.25 | 39.43 |
| /17/ | | | | | | 30.61 | 32.93 | 34.72 |
| /11/ | | | | | | 26.59 | 28.65 | 30.09 |
| | 26 | | | | | 20.43 | 22.23 | 23.40 |
| /26/ | | | | | | 42.18 | 45.85 | 49.00 |
| /26/ | | | | | | 39.31 | 42.60 | 45.37 |
| /23/ | | | | | | 36.51 | 39.43 | 41.82 |
| /20/ | | | | 2[18] | | 32.46 | 34.85 | 36.72 |
| /11/ | | | | | | 24.41 | 26.10 | 27.37 |
| 16.96 | 10.07 | 34.99 | 31.61 | | | 20.21 | 21.90 | 23.17 |

| (3) | 6 | 15.85 | 11.54 | 33.29 | 27.50 | 144 | 401 | 31 | 24 | | JXP-0 :  CEQ-CS03) |
|---|---|---|---|---|---|---|---|---|---|---|---|
| | | - | - | - | - | | [ | | 24] | JXP- 8:  SRE-S-0 ) |
| | | - | - | - | - | | ( | | C) ( | 691 17.14 24.05 24.05] |
| | | - | - | - | - | | | [ 0 | 0 476 691 | |
| | | 57.40 | 38.41 | 8.00 | 8.00 | | | 1-1 | 0-6 116 476 | 476 |
| | 7 | 57.40 | 38.41 | 8.00 | 8.00 | 0 | 2 | | | /26/ |
| | | 30.50 | 10.21 | 36.30 | 36.80 | 2 | 401 | | | |

| (3) | 13 | 24.12 | 17.14 | 28.04 | 23.33 | 45 | 401 | 32 | 25 | | JXP- 1:  CEQ-CS06) |
|---|---|---|---|---|---|---|---|---|---|---|---|
| | | 25.50 | 16.37 | 28.72 | 23.69 | - | - | | 25] | JXP- 12:  SRE-S-0 ) |
| | | - | - | - | - | | ( | | C) ( | 1252 11.09 20.20 44.25] |
| | | - | - | - | - | | [ | [ 0 | 0 308 561 | 308 |
| | | 57.40 | 38.41 | 8.00 | 8.00 | | | 1-2 | 0-2 40 308 | |

Device Configuration          Trunking Pad Change Confirmation

Spectrum Analyzer "Zoom In" And "Zoom Out"

Spectrum Analyzer In Marker Adjustment

GRAPHICAL USER INTERFACE FOR CONTROLLING EXTENDED SPECTRUM DOCSIS AMPLIFIER

CROSS REFERENCE TO RELATED APPLICATIONS

This application claims the benefit of priority under 35 U.S.C. § 119 (e) to prior U.S. Provisional Application No. 63/441,389 filed on Jan. 26, 2023, U.S. Provisional Application No. 63/441,416 filed on Jan. 26, 2023, prior U.S. Provisional Application No. 63/625,210 filed on Jan. 25, 2024, and prior U.S. Provisional Application No. 63/501,344 filed on May 10, 2023, the contents of each of which are herein incorporated by reference in their entirety.

BACKGROUND

The subject matter of this application relates to improved systems and methods that deliver CATV, digital, and Internet services to customers.

Cable Television (CATV) services historically have provided content to large groups of subscribers from a central delivery unit, called a "head end," which distributes channels of content to its subscribers from this central unit through a branch network comprising a multitude of intermediate nodes. Modern Cable Television (CATV) service networks, however, not only provide media content such as television channels and music channels to a customer, but also provide a host of digital communication services such as Internet Service, Video-on-Demand, telephone service such as VoIP, and so forth. These digital communication services, in turn, require not only communication in a downstream direction from the head end, through the intermediate nodes and to a subscriber, but also require communication in an upstream direction from a subscriber and to the content provider through the branch network.

To this end, such CATV head ends included a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern CATV systems have combined the functionality of the CMTS with the video delivery system (EdgeQAM) in a single platform called the Converged Cable Access Platform (CCAP). Still other modern CATV architectures (referred to as Distributed Access Architectures or DAA) relocate the physical layer (e.g., a Remote PHY or R-PHY architecture) and sometimes the MAC layer as well (e.g., a Remote MACPHY or R-MAC-PHY architecture) of a traditional CCAP by pushing it/them to the network's fiber nodes. Thus, while the core in the CCAP performs the higher layer processing, the remote device in the node converts the downstream data sent by the core from digital-to-analog to be transmitted on radio frequency, and converts the upstream RF data sent by cable modems from analog-to-digital format to be transmitted optically to the core.

Regardless of which architectures were employed, historical implementations of CATV systems bifurcated available bandwidth into upstream and downstream transmissions i.e., data was only transmitted in one direction across any part of the spectrum. For example, early iterations of the Data Over Cable Service Interface Specification (DOCSIS) specified assigned upstream transmissions to a frequency spectrum between 5 MHz and 42 MHz and assigned downstream transmissions to a frequency spectrum between 50 MHz and 750 MHz. Later iterations of the DOCSIS standard expanded the width of the spectrum reserved for each of the upstream and downstream transmission paths, the spectrum assigned to each respective direction did not overlap.

Still later iterations of the DOCSIS standard utilized Orthogonal Frequency Division Multiplexing (OFDM) as a cable data transmission format. The purpose of OFDM/OFDMA technology is to maximize the efficiency of data transmissions across a cable data network by optimizing the QAM modulation level used for each subcarrier of RF frequency bandwidth. Although originally defined for use directly in the downstream direction, OFDM technology was adapted for multiple access (Orthogonal Frequency Division with Multiple Access—OFDMA) for use in the upstream direction. In each direction, a relatively wide channel is subdivided into many small subcarriers. In the downstream direction, each of these subcarriers may use its own Quadrature Amplitude Modulation (QAM) level, which equates to a different bit capacity per subcarrier QAM symbol. In the upstream direction, groups of subcarriers are combined and, when time multiplexed, create the atomic unit of upstream bandwidth assignment known as a "minislot." In the upstream direction, all subcarriers of a minislot are assigned the same QAM level and thus all subcarriers of a minislot have the same bit capacity per QAM symbol.

Recently, cable operators have searched for additional alternative architectures to satisfy ever-increasing demand for both upstream and downstream services. One such proposed architecture, for example, is full duplex (FDX) DOCSIS technology. With FDX DOCSIS, upstream and downstream spectrum is no longer separated, allowing up to 5 Gbps upstream service and 10 Gbps downstream service over the cable access network. In a full duplex system, because the CCAP/R-PHY core knows the characteristics of its own downstream transmission, it can distinguish upstream communications transmitted in the same frequencies that it provides those downstream services. Full duplex technology, however, is unsuitable in the longer HFC plants that exist in most operators' networks. Furthermore, in FDX systems, subscribers must be organized into "interference groups" to mitigate interference in downstream transmissions to some subscribers caused by upstream transmissions by other subscribers, but the presence of amplifiers located between a customers' premises and the closest node inhibits the separation of those customers into groups because the amplifiers cause all subscribers to interfere with each other. Theoretically, this problem could be addressed by eliminating the amplifiers running fiber to each subscriber's premises, or including cancellation in the amplifiers, but both are costly.

Other proposed architectures would increase the spectrum of both services to customers in both upstream and downstream directions, moving the split between these services upwards. For example, the proposed DOCSIS 4.0 standard would extend the upper frequency of the downstream spectrum from 1218 MHz to 1794 MHz while moving the maximum split between the upstream and downstream services from 204/258 MHz to as high as 684/834 MHz. These architectures are often referred to as Extended Spectrum DOCSIS (ESD). Again, however, upgrading the equipment from the head end to the subscribers premises to accommodate the increase in bandwidth is expensive.

A common theme of all these evolutions of the CATV architecture is the need to provide ever increasing amounts of bandwidth. One deleterious influence on bandwidth is noise; as noise increases relative to signal strength, less of the available bandwidth becomes usable. In a typical CATV or other communications network, a signal is propagated over a transmission medium, such as an optical fiber or a coaxial cable, for often a great distance before reaching a customer. Signal degradation occurs over this length and is typically recovered using one or more amplifiers. Yet, amplification produces distortion, particularly as amplification grows large, and this distortion reduces the usable bandwidth of the system.

What is desired, therefore, are improved systems and methods for amplifying communications signals to reduce noise or other such degradations in the signal being amplified.

BRIEF DESCRIPTION OF THE DRAWINGS

For a better understanding of the invention, and to show how the same may be carried into effect, reference will now be made, by way of example, to the accompanying drawings, in which:

FIG. 4 shows exemplary performance metrics of the amplifier of FIG. 3.

FIGS. 5A-5C show an exemplary Lode tool analysis of different amplifiers and spans feeding those amplifiers.

DETAILED DESCRIPTION

Figures 1, 2A:
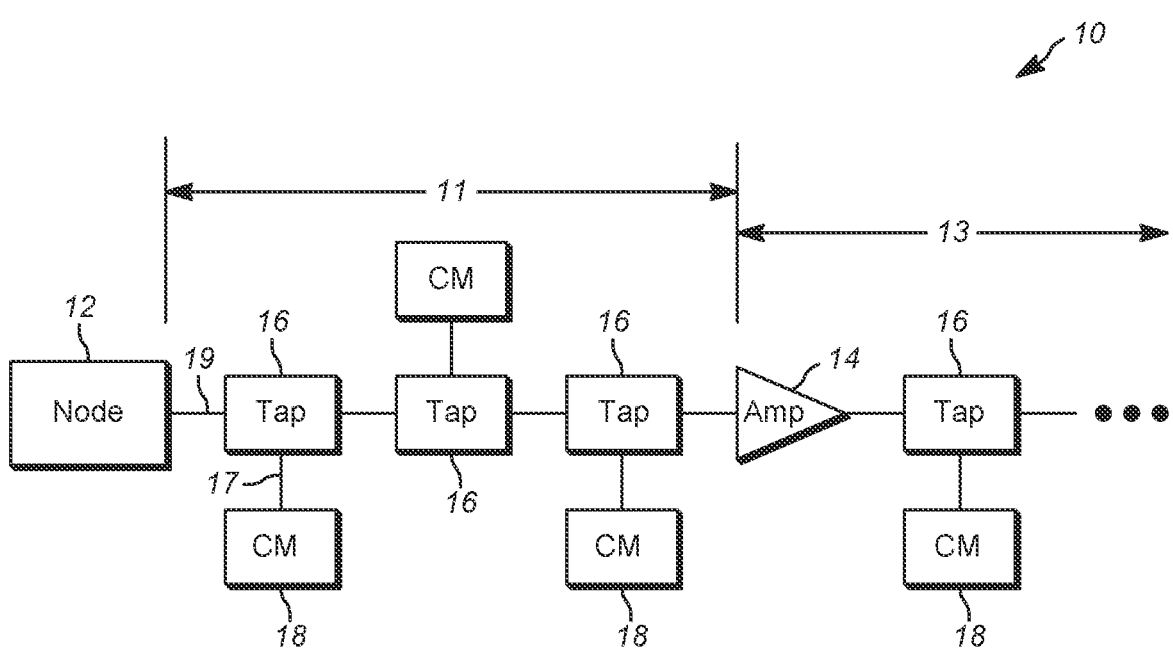
FIG. 1 shows a portion of an exemplary communications system in which a node supplies a signal to a large number of customers via a network of cables and amplifiers.
FIG. 2A shows specifications for an exemplary amplifier used in the system of FIG. 1.

FIG. 1 shows an exemplary communications network 10 that extends from a node 12 to a plurality of cable modems 18 in the homes of subscribers. Communications signals are propagated over the network via trunk cable 19, and each cable modem 18 is fed by a respective tap 16 and feeder cable 17. The system 10 shown in FIG. 1 may be an HFC system as previously described, where the node 12 is served by a head end having a CCAP (not shown), or alternately the node 12 may be one in a DAA architecture, e.g., an RPD, RMD, etc. The cable 17, 19 may comprise coaxial cable, although those of ordinary skill in the art will appreciate that other transmission media may be used, such as fiber optic cable, and that although the system 10 does not show the cabling between the node 12 and any devices upstream from the node e.g., a head end, another node, etc. may also benefit from the systems and methods disclosed in the present application.

The system of FIG. 1 also utilizes one or more amplifiers 14, which are necessary because the signal that propagates along cable 19 degrades over the cable length and is also degraded by the passive elements along the cable 19, such as taps 16. This necessitates the periodic spacing of amplifiers along the length of the cable to recover the signal.

As explained in more detail below, the amplifiers 14 are typically designed to achieve "unity gain," meaning that the amplifiers have an amplification intended to recover the signal to the same level that it would have been were it not for the degradation caused while the signal travels along the span between the given amplifier and an adjacent active (i.e., amplification) device such as another amplifier 14 or node 12. Achieving unity gain is complicated by the fact that signal loss or attenuation over a span varies as a function of frequency, where more signal loss occurs at high frequencies than at low frequencies. Thus, the span 11 between the node 12 and the first amplifier 14 shown in FIG. 1, for example, will not only likely have a different amount of loss than the successive span 13 between amplifier 14 and the next sequential amplifier, but the loss within span 11 will vary as a function of frequency.

Existing amplifiers, however, do not have a variable gain; rather, they each run at maximum gain, and as part of their set-up and balancing process a technician inserts padding (attenuation) and signal conditioning (equalization or cable simulation) at the input of the amplifier, which adds even more loss in an amount required so that, when it augments the loss in the adjacent span over which the signal travels, the amplifier—when operating at maximum gain, achieves unity gain across the relevant spectrum.

An example illustrates this process. Consider FIG. 2A, which shows specifications for an exemplary "bridger" amplifier. In this example, assume that the system 10 is operating in a "high split" configuration where upstream signals are propagated in the 5-204 MHz frequency range, while downstream signals are propagated in the 258-1218

MHz frequency range. The amplifier in this example shows an operational gain of 47 dB and an internal tilt of 11.5 dB, which means that the gain at 258 MHz is 35.5 MHz (47 dB-11.5 dB).

Figure 2B:
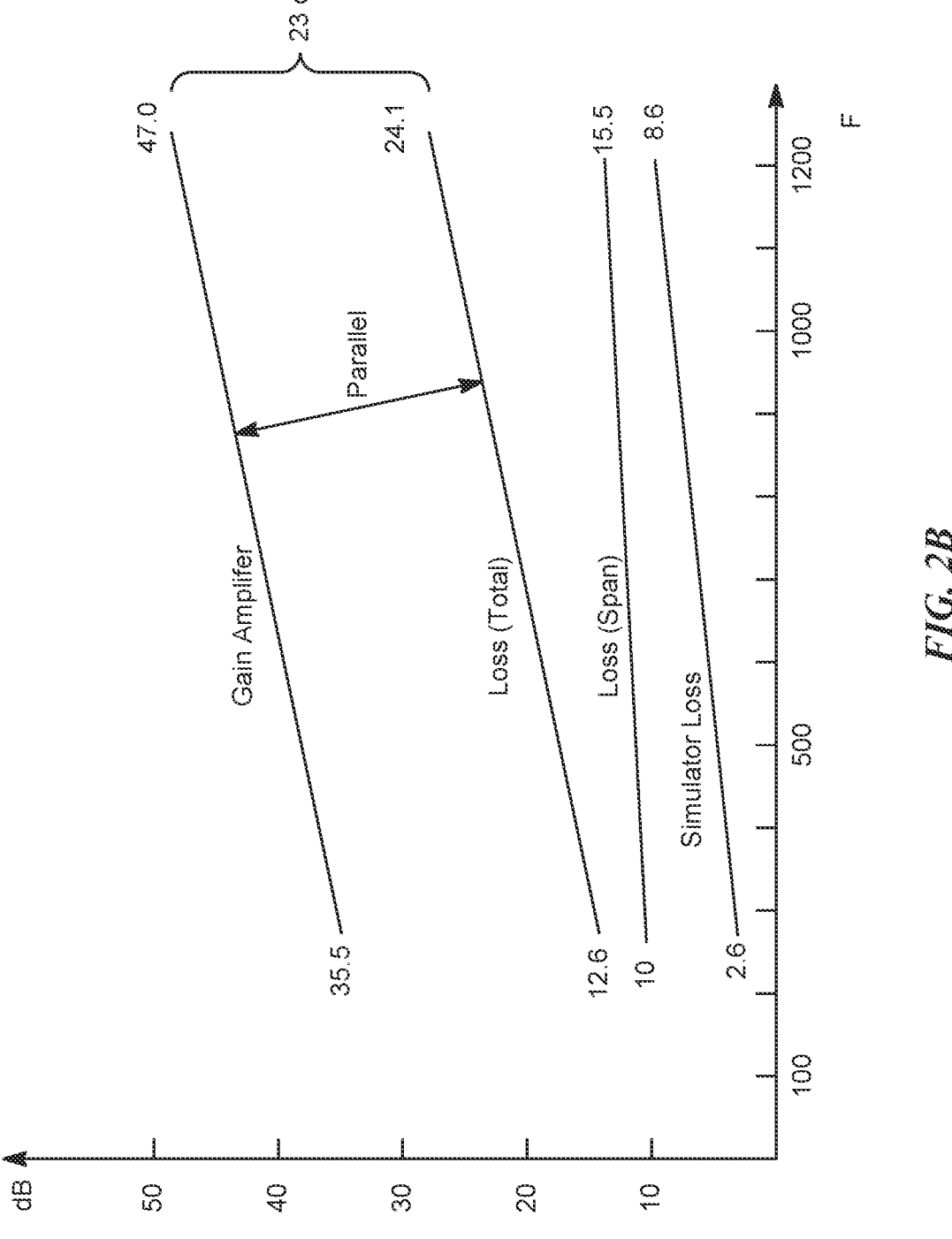
FIG. 2B shows the manner in which an amplifier, with the specifications shown in FIG. 2A, may compensate for line losses in the span preceding it, in order to achieve unity gain.

For this example, also assume that the span (e.g., span 11 of FIG. 1) preceding the amplifier (e.g., amplifier 14 of FIG. 1) imposes a loss of 10 dB at 258 MHz and 15.5 dB at 1218 MHz. As shown in FIG. 2B, in order to achieve "unity gain" for this amplifier, across the downstream spectrum, the downstream signal may be "conditioned" by linearly adding 2.6 dB of loss at 258 MHz and 8.6 dB of loss at 1218 MHz. When so conditioned, this loss, added to the existing span loss, produces a loss "tilt" that is parallel to that of the gain of the amplifier. However, the gain of the amplifier is still too large for the desired "unity gain," hence an additional attenuation of approximately 23 dB must be added across the downstream spectrum. Once this is accomplished, the loss of the signal feeding the amplifier is such that the amplifier achieves unity gain across the spectrum of the downstream signal.

Although, in this example, the equalizer or cable simulator added loss that increased as a function of frequency, those of ordinary skill in the art will understand that this merely results from the fact that the example given shows a span loss with a tilt less than that of the amplifier. In a situation where a span exhibits sufficiently heavy losses that its tilt over the downstream frequency is more than that of the amplifier, the signal conditioning would have to add equalization that exhibits more loss at lower frequencies than at higher frequencies.

Figure 3:
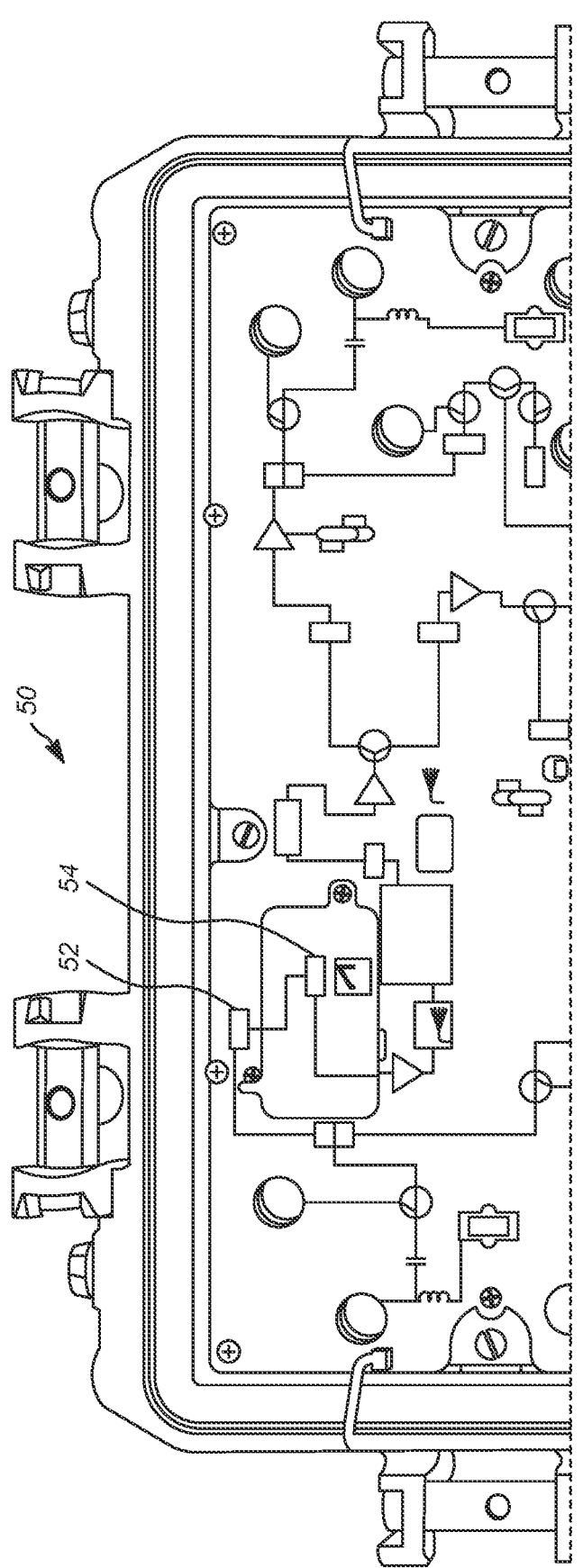
FIG. 3 shows an exemplary amplifier that implements the technique of FIG. 2B.

Mechanically, the required cable simulation and attenuation is incorporated into amplifier circuits as plug-in units before any of the amplifier gain stages. Referring to FIG. 3, for example, which shows an exemplary amplifier 50, a plug-in attenuator 52 may add a desired amount of attenuation (in the example above, 23 dB) and a plug-in simulator or equalizer 54 may add a desired amount of tilt to the signal (in the example above a tilt of 8.6 dB at 1218 MHz minus 2.6 dB at 258 MHz).

Although the foregoing example was described with respect to a downstream signal, a similar process occurs when amplifying an upstream signal, which will be described in more detail later in the specification. Specifically, in the upstream direction, signal conditioning is applied to a signal such that, when added to losses of an adjacent span, amplification of the signal produces unity gain.

The foregoing systems and methods, unfortunately, are not always successful at achieving unity gain. In particular, the tilt of span loss is exacerbated by extending the spectrum of a signal; because loss increases with frequency, when the frequency range or bandwidth of a communications channel is extended by for example, migrating to extended spectrum DOCSIS, the tilt associated with any span of a given length increases. This necessitates a greater amount of conditioning or equalization associated with a cable simulator in an amplifier. This means adding more loss using the plug-in units just described, and in some circumstances more loss may need to be added than can be recovered by the amplifier to achieve unity gain.

FIG. 4, for example, shows a screenshot 60 from an industry CAD simulation tool, Lode, which is a tool for designing CATV networks. In this example, a legacy network is being upgraded to support 1.8 GHz ESD. The left columns 62 show signal levels (dBmV) at the balancing frequencies of the network, while the columns 64 show the lengths and types of cables in a span of the network, and a count of taps along that span. For example, the screenshot 60 shows node 13 having an amplifier of type "32" (a line extender amplifier) being fed by a 45 foot section of 401-type cable, with a count of zero taps along that section. The columns 62 therefore show the input levels into the amplifier at each of the network's balancing frequencies.

Figure 5C:
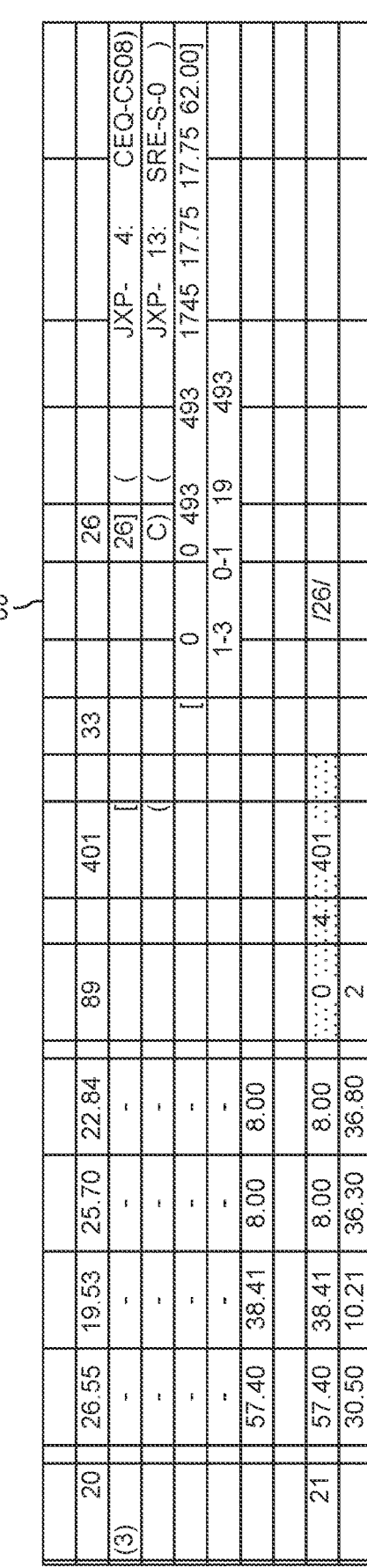

Referring also to FIGS. 5A to 5C, the Lode simulation shows three amplifiers, a "31-type" 66, a "32-type" 67, and a "33-type" 68. Specifically, the tool looks at all the losses, at each balancing frequency, through the intervening nodes feeding the amplifiers 67 and 68, and adding then together to arrive at the span loss into an amplifier, for which the amplifier must compensate. Then Lode selects from available attenuators and cable simulators to compensate for those span losses to achieve unity gain. Of these amplifiers, the amplifiers 67 and 68 are shown in green by Lode, which means that the tool shows these amplifiers as being able to balance the inputs to achieve unity gain. This can be seen in FIG. 4 by comparing the levels at node 14 to node 7, and at node 21 to node 14.

The amplifier 66, however, is shown by the tool in red. This means that Lode is unable to achieve the target levels that were feeding the 75-foot cable shown at node 1. This occurs because, after adding the conditioning needed to match the slope of the span losses preceding amplifier, over the large frequency range of the ESD downstream spectrum, the amplifier—even at its "maximum-amplification" and with no attenuation or padding required, cannot attain the required levels.

Figure 6:
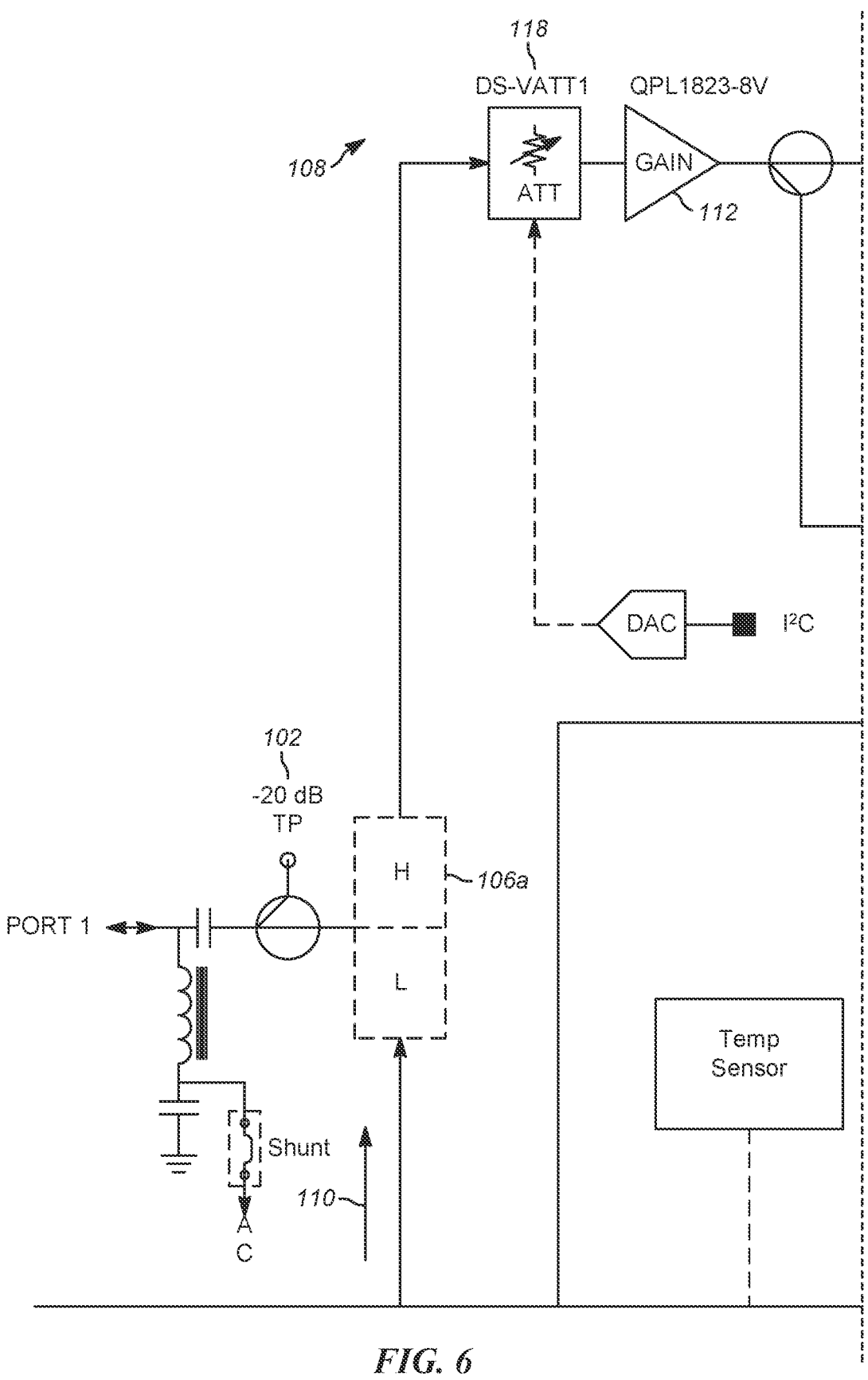
FIG. 6 shows a partial view of an amplifier according to an embodiment of the disclosure, with corresponding elements for amplifying and processing a downstream signal.
Figure 6:
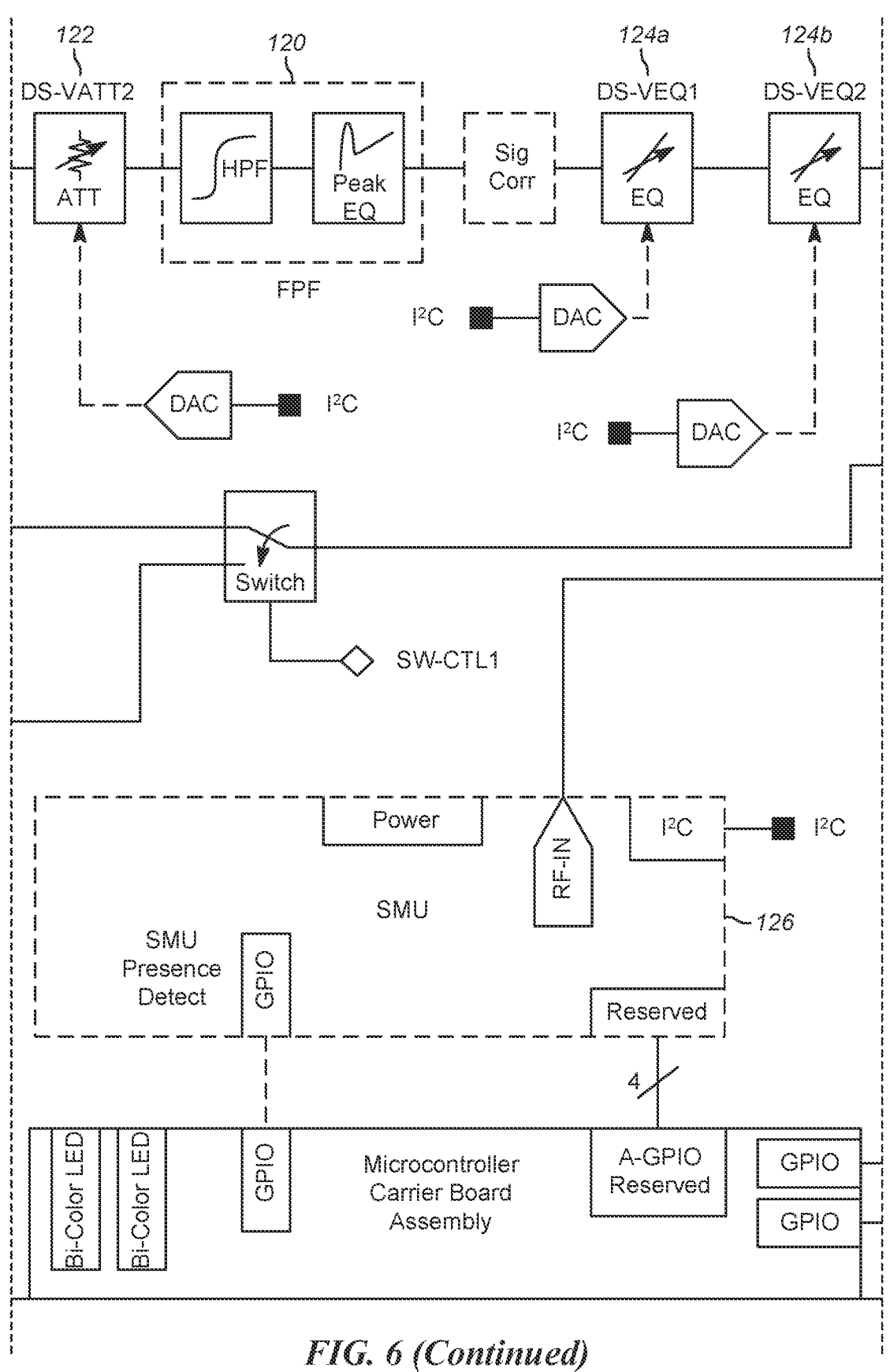
Figure 6:
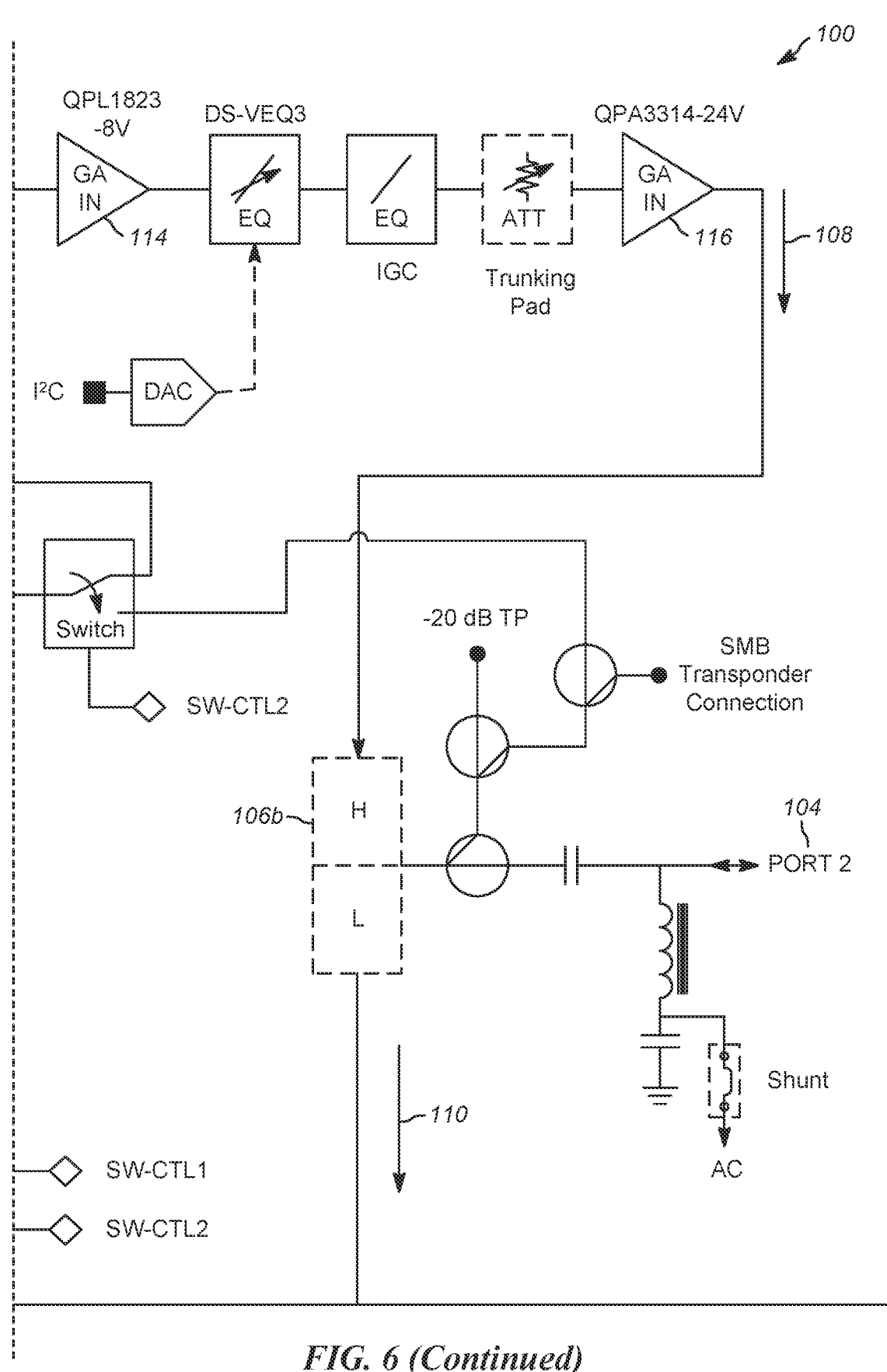

FIG. 6 shows an embodiment of an extended-spectrum amplifier 100 that is better able to achieve unity gain over a much wider range of frequencies than amplifiers that add padding and signal conditioning as just discussed. Specifically, rather than condition and/or pad a signal so as to make a fixed gain amplifier achieve unity gain, the amplifier 100 modulates the gain so that the modulated output of the amplifier is what is needed to provide unity gain, given the adjacent span. Though FIG. 6 shows the components that perform such downstream processing of the amplifier 100, this disclosure will later describe the upstream processing of the amplifier 100 that similarly modulates the gain of the amplifier.

The amplifier 100 may receive a downstream signal at northbound port 102 and output an amplified downstream signal at southbound port 104. The amplifier 100 preferably includes a pair of diplexers 106a, 106b used to separate the downstream signal from the upstream signal and route each through separate paths 108, 110 through the amplifier so that the downstream signal through path 108 may be amplified separately from the upstream signal through upstream path 110.

Downstream Path

Regarding the downstream path 108, the amplifier 100 may preferably include a plurality of separate, successive gain blocks, which may for example include three gain blocks 112, 114, and 116, and which together provide the total amplification of amplifier 100. Amplifier 110 may also include an optional attenuator 118, having the purpose of attenuating the signal by a value just sufficient to prevent clipping of the signal by the amplifier 112 of the first gain block or gain stage of amplifier 100. The amplifier 100 may also preferably include a forward path filter 120 intended to further isolate any crosstalk between the upstream and downstream signals beyond that provided by the diplexer 106a. In some preferred embodiments, the filter 120 is positioned after the first gain block 112.

Between the first or initial gain block 112 that receives a downstream signal to be amplified by amplifier 100 and the final gain block 116 that provides the amplified downstream signal to the southbound port 104, are preferably at least one attenuator 122 and at least one equalizer, such as the three equalizers conditioners 124a, 124b, 124c shown in FIG. 6. As noted earlier, the attenuator(s) 122 and equalizer(s) 124a, 124b, 124c modulate the gain over frequency of the amplifier 100 so as to apply an equal and opposite gain over frequency to that of the preceding span before the amplifier 100.

In some embodiments, this feature may be reflected in the absence of signal conditioning (cable simulation or equalization) in the amplifier 100 outside of the initial gain block 112 and the final gain block 116. Since many modern amplifiers are designed for use in a communications network following locations of a wide variety of span lengths, tap house counts, etc., in some embodiments this feature may more particularly be reflected in the absence of plug-in signal conditioners and/or plug-in attenuators outside of the initial gain block 112 and the final gain block 116, or alternately in the lack of receptacles for plug-in signal conditioners and/or plug-in attenuators outside of the initial gain block 112 and the final gain block 116.

Referring back to the example previously discussed of a hypothetical span loss of 10 dB at 258 MHz and 15.5 dB at 1218 MHz, the amplifier 100 may easily achieve unity gain. Specifically, because there is a 5.5 dB of down-tilt in the loss profile of the span preceding the amplifier 100, in order to compensate for this loss, the equalizers 124a, 124b, 124c are set to a value that adjusts the upwards gain tilt of the amplifier to 5.5 dB. Then the value of the attenuator 122 is set to reduce the open loop gain of the amplifier to be equal to the remaining span loss, after accounting for the tilt adjustment made in the equalizer(s) 124a, 124b, 124c, thereby achieving unity gain.

Figure 7:
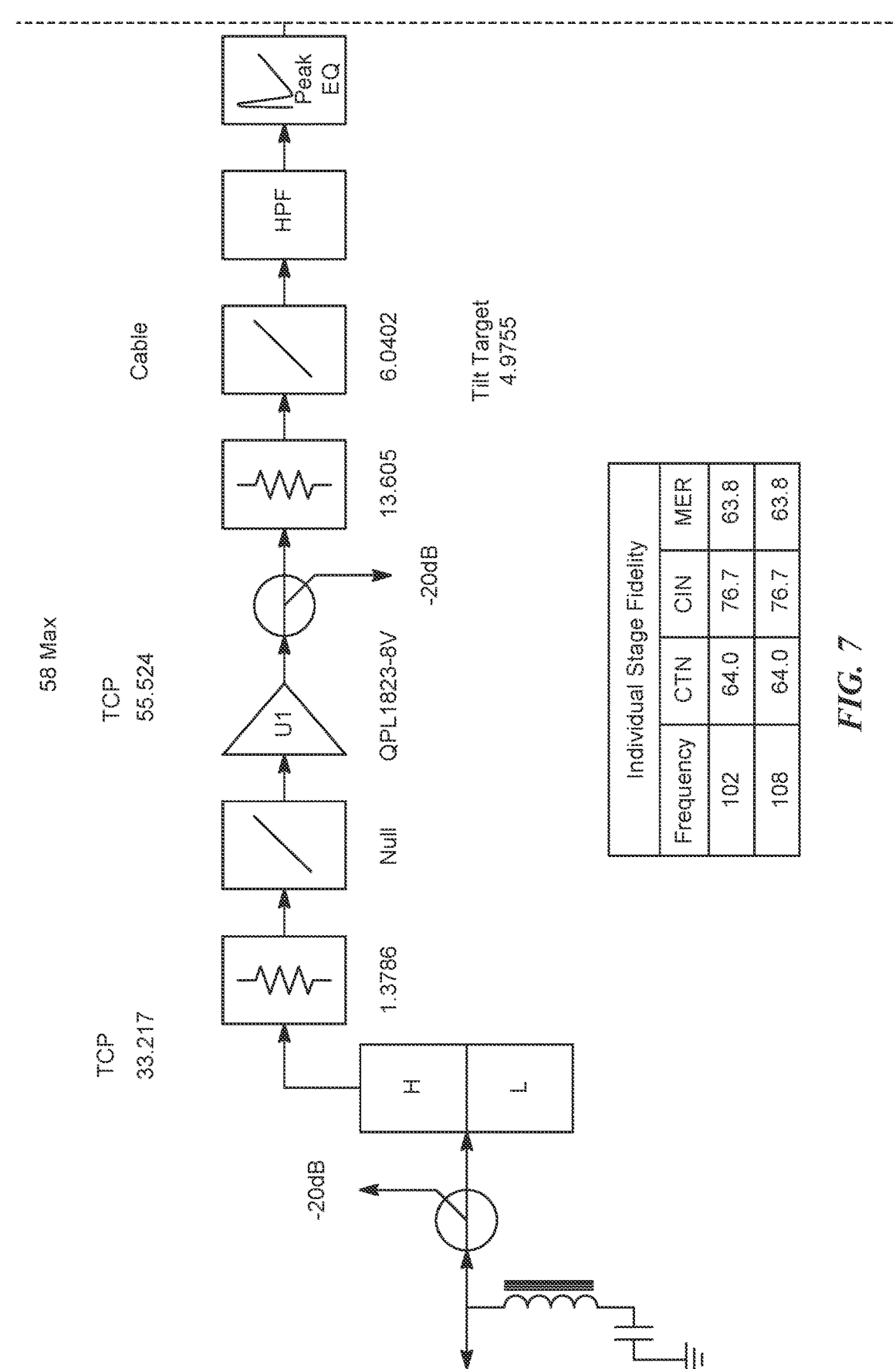
FIG. 7 shows how the amplifier of FIG. 6 is better balanced and has improved performance relative to prior art amplifiers.
Figure 7:
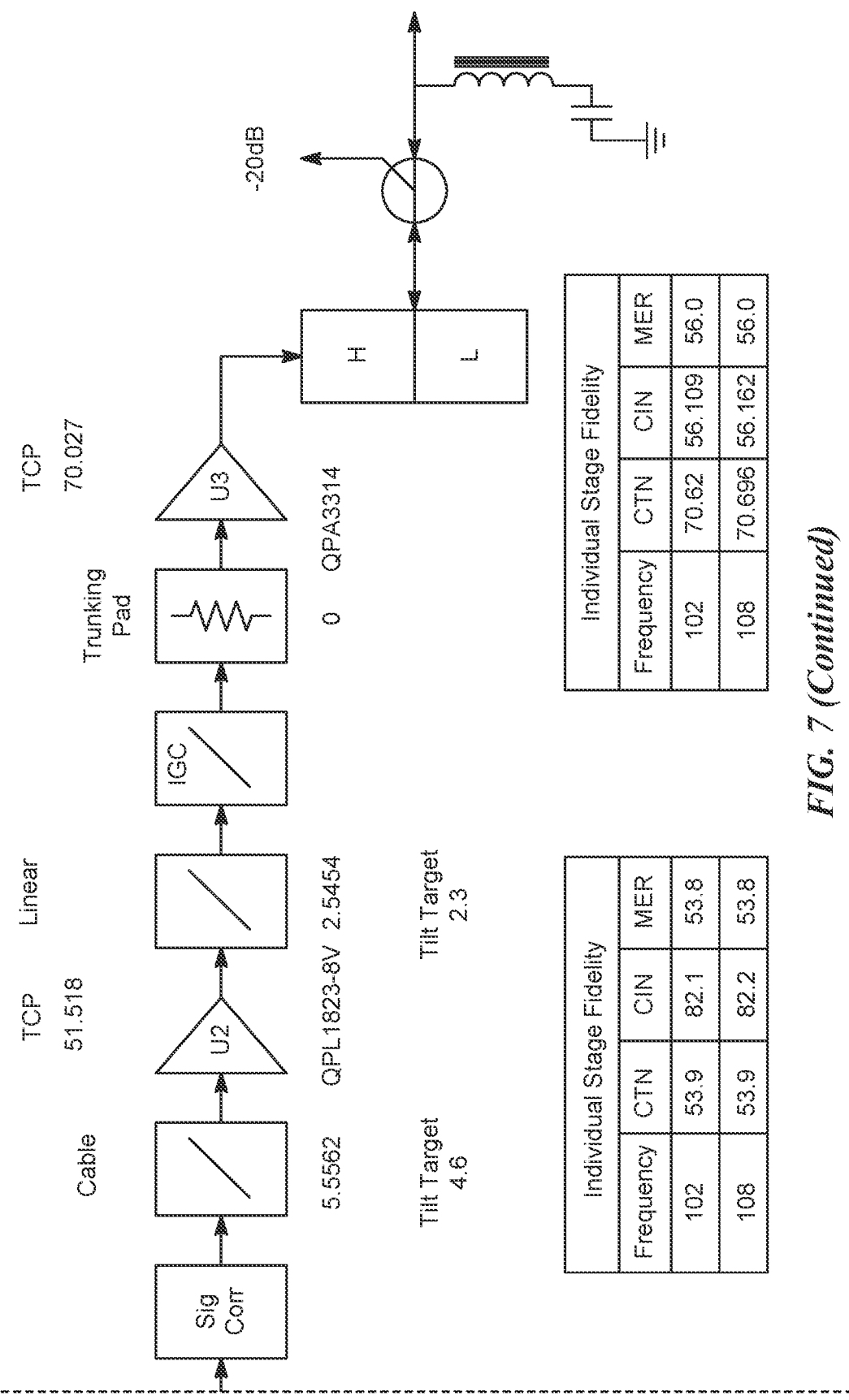

FIG. 7 shows the resulting total composite power (TCP) and noise levels throughout the downstream path through a simulated line extender amplifier that uses the systems and methods of the foregoing disclosure. As can be seen this figure, the total equalization provided by equalizers 124a (6 dB), 124b (5.5 dB). And 124c (2.5 dB) totals 14 dB, and each equalizer is capable of providing up to 13.5 dB limit, hence the provided total equalization is well within the abilities of the amplifier 100. Similarly, the attenuator 122 is providing 13.6 dB of attenuation, meaning that the amplifier is only using approximately 50% of the gain available. This is in marked contrast to the amplifier discussed with reference to FIGS. 2A, 2B, and 3 where there was no attenuation of the signal, meaning that the amplifier would be operating at full amplification and still not attaining unity gain. In contrast, the disclosed amplifier 100 is capable of providing unity gain with tremendous margin.

Although amplifier 100 may in some embodiments only include a single equalizer between the gain blocks 118 and 116, that single equalizer adjusting the tilt of the amplifier as needed to provide unity gain, the amplifier preferably includes a plurality of such equalizers. As shown above, one benefit of multiple such equalizers is that the amplifier 100, in order to achieve unity gain, may need to provide more tilt than any single equalizer could. Moreover, as explained in further detail below, by using a plurality of equalizers, and particularly by positioning equalizers on either side of gain block 114, the shape response of the amplifier as a function of frequency may be controlled in a manner that is not achievable by current amplifiers.

Furthermore, in some preferred embodiments, and again as described later in this specification, the attenuator 122 as well as any or all of the equalizers 124a, 124b, 124c may preferably be variable attenuators controlled by a signal monitoring unit 126 in a manner that, for example, adjusts for changes in span losses due to temperature variations so as to maintain unity gain in spite of such changes.

Upstream Path

In an amplifier cascade that propagates an upstream signal, the architecture is typically designed such that each amplifier is presented with the same upstream input levels at every amplifier or other active element, balanced to a flat target. For example, the system might be designed such that each active element has a flat 11 dBmv/6.4 MHz at its respective upstream input. Because each amplifier is unique, each amplifier is adjusted such that the upstream signal is output to a span at the proper output level in order to provide the next amplifier in the upstream cascade with the flat target at its input.

Accordingly, regarding the upstream path 110 shown in FIG. 6, an upstream signal received at southbound port 104 may also preferably be amplified by the amplifier 100, and the amplified upstream signal may be output onto outbound port 102. Preferably, the amplifier 100 is configured to provide unity gain for the upstream path given the loss characteristics of the same span for which the amplifier 100 provides downstream signal compensation. This will typically require different signal processing than what is done for downstream signal amplification, because as just noted, unlike the downstream signal where unity gain over the downstream spectrum is to be achieved at the southbound port 104 of the amplifier 100 given the loss profile of the span that the downstream signal just traversed, in the upstream direction the objective is to output a signal at the northbound port 102 that will achieve unity gain over the upstream spectrum at the input port of the next upstream amplifier (or other active component), given the loss profile of the span that the upstream signal will traverse to that next upstream amplifier.

For example, referring to FIG. 1, when compensating for the loss profile of the span 11, in the downstream direction the amplifier 14 receives a degraded input signal at its northbound port where the degradation (loss) varies as a function of frequency, and the amplifier 100 is configured to provide unity gain (with a flat power profile) at its output intended to exactly reproduce the signal that existed at the output of the preceding active at the other end of the span 11, in this case the node 12 which should also have such unity gain at its output. In the upstream direction, however, the amplifier receives an input upstream signal at its southbound port exhibiting unity gain with a flat power profile, but outputs an amplified signal with a power profile as a function of frequency that, given the loss profile of span 11, is intended to produce an input at the node 12 that exactly matches the upstream signal that exists at the southbound port of the amplifier 14.

Figure 8:
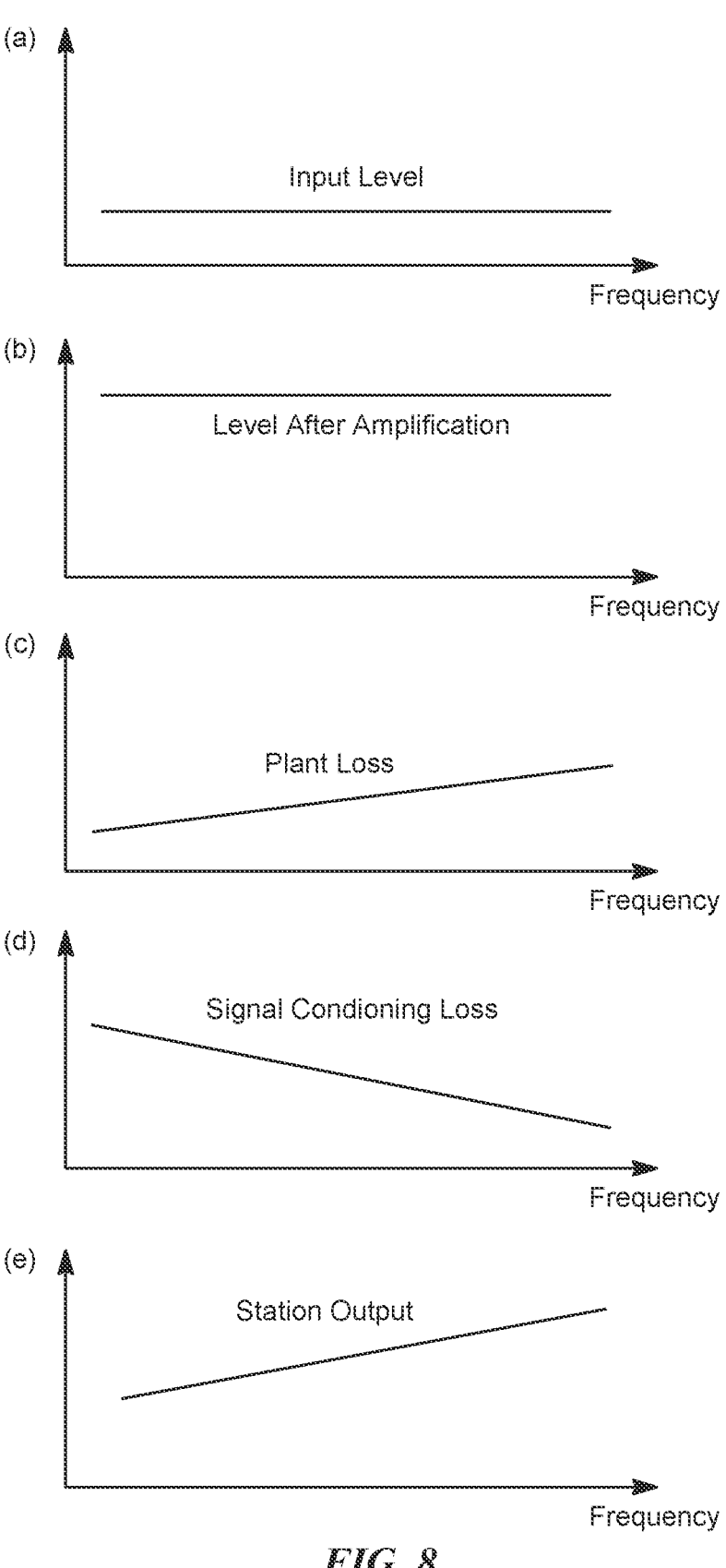
FIG. 8 shows desired signal processing for amplification of upstream signals performed by the amplifier of FIG. 6.

The desired upstream signal processing is illustrated in FIG. 8. The first panel (a) of this figure shows the input power levels at the input to the amplifier 100, i.e. power levels that are flat as a function of frequency. Panel (b) shows those input levels after amplification at the full operational gain of amplifier 100 and panel (c) shows the loss profile of the intervening span between the amplifier 100 and the next amplifier or other active in the upstream path. Panel (e) shows the power levels that are desired at the northbound port of the amplifier 100 in order to achieve unity gain at the next upstream amplifier, given the plant loss shown in panel (c). Panel (d) shows the signal conditioning loss that must be added by the amplifier 100 that will achieve the desired power levels of panel (e) at the next upstream amplifier, given the levels shown in panel (b). Stated differently, the station output is the result of the amplified input shown in panel (b) as modified by the signal conditioning loss of panel (d). The plant or span loss of panel (c) applied to the station output of panel (e) reproduces the desired input level of panel (a) at the next upstream amplifier.

Figure 9:
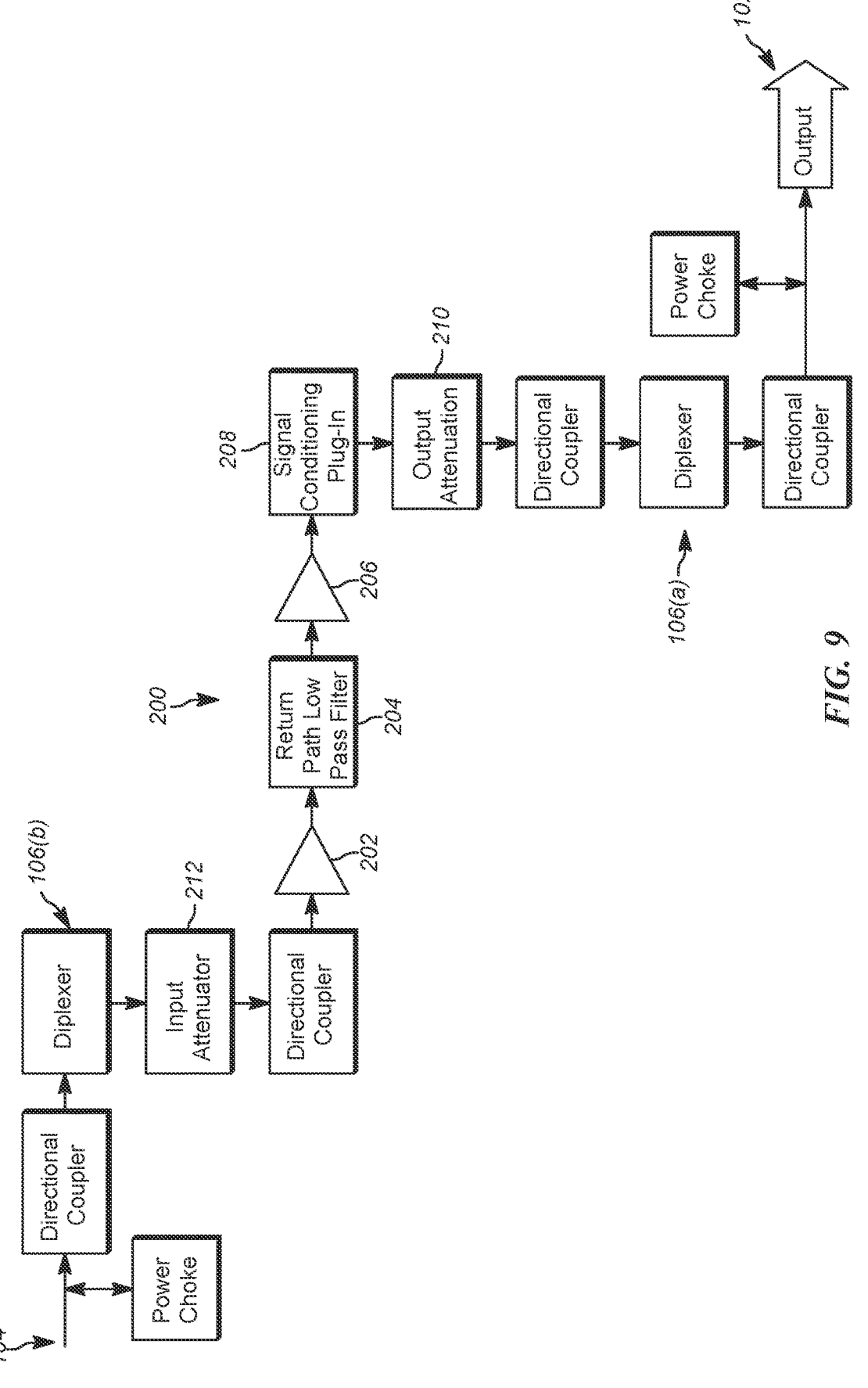
FIG. 9 shows a first exemplary embodiment of upstream amplification logic that achieves the signal processing shown in FIG. 8.

FIG. 9 shows one exemplary embodiment of upstream amplification logic that achieves the signal processing shown in FIG. 8. Specifically, an amplifier such as the amplifier 100 may have a southbound port 104 that receives an input upstream signal as well as a northbound port 102 that outputs an amplified upstream signal. The amplifier 100 may include upstream amplification logic 200 that includes at least two amplifier or gain blocks 202 and 206, where gain block 202 is the first gain block of the amplifier 100 in the upstream direction following diplexer 106(*b*) that isolates the upstream signal processed by the amplifier 100 from the downstream signal output from amplifier 100, and gain block 206 is the final gain block of amplifier 100 prior to diplexer 106(*a*) that isolates the upstream signal processed by the amplifier 100 from the downstream signal input to the amplifier 100. Upstream amplification logic 200 may also include a return path filter (RPF) 204 that preferably includes a low pass filter (LPF) that rejects signals above the passband to the upstream signal to improve loop isolation and stability beyond what the diplexers 106(*a*) and 106(*b*) provide. Following the final gain block 206, amplification logic 200 may also preferably include a signal conditioning plug-in 208 and an output attenuator 210 together configured to produce the signal conditioning loss profile shown in panel (d) of FIG. 8. Amplification logic may optionally include an input attenuator 212 that slightly adjust the input levels to avoid clipping by the gain blocks 202 and 206.

The use of signal conditioning plug-in 208 and an output attenuator 210 following the final gain block 206 may in some instances successfully achieve unity gain in the upstream direction, even when amplifier 100 is used to amplify upstream extended spectrum (ESD) signals. That is to say, in some embodiments amplifier 100 may include the downstream logic as shown in FIG. 6 and the upstream logic of FIG. 9. However, as already noted previously in this specification, in some instances and particularly where amplifier 100 amplifies upstream ESD signals, the amplification logic of FIG. 9 may not be sufficient to achieve unity gain in the upstream direction because the tilt of span loss is exacerbated by extending the spectrum of a signal, and the needed compensating tilt/attenuation of the amplified signal may be beyond the capabilities of the available plug-in units.

Figure 10:
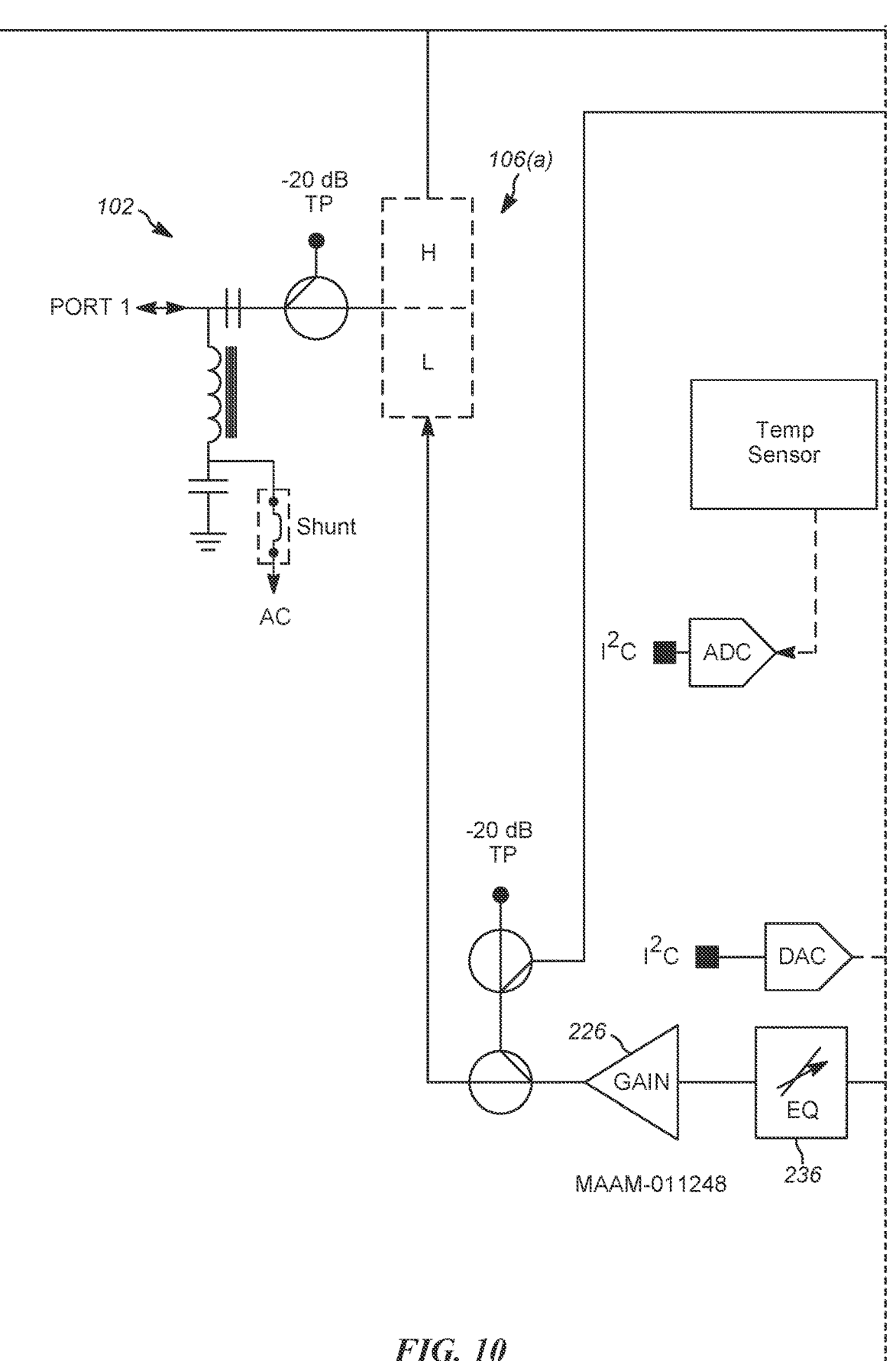
FIG. 10 shows a second exemplary embodiment of upstream amplification logic that achieves the signal processing shown in FIG. 8.
Figure 10:
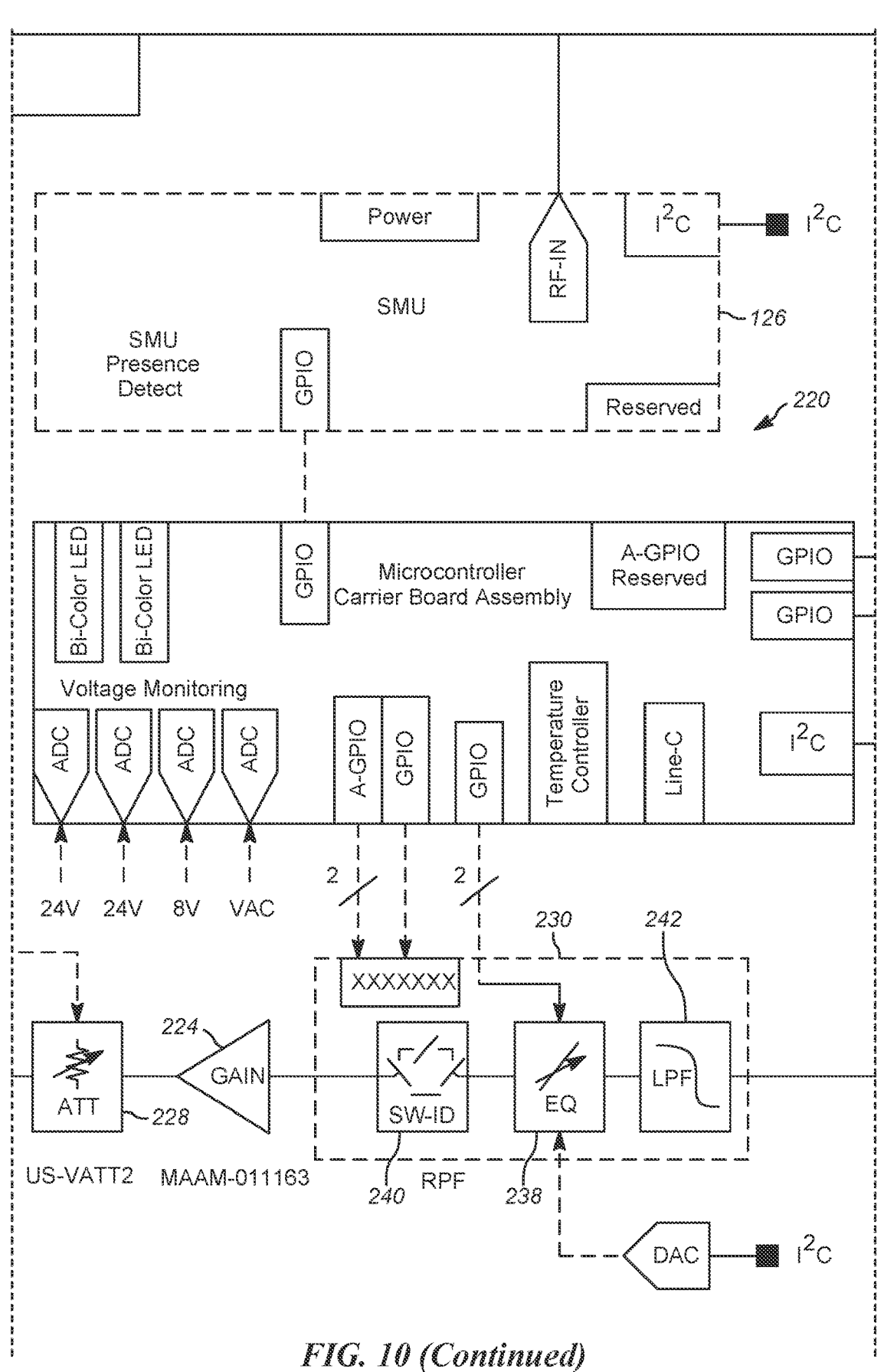

Therefore, some embodiments of the amplifier 100 may include the amplification logic 220 shown in FIG. 10, and as described herein. Specifically, amplification logic 220 may include a plurality of gain blocks or amplifiers 222, 224, and 226. Preferably, gain block 222 is the first gain block of the amplifier 100 in the upstream direction following diplexer 106(*b*) that isolates the upstream signal processed by the amplifier 100 from the downstream signal output from amplifier 100, and gain block 226 is the final gain block of amplifier 100 prior to diplexer 106(*a*) that isolates the upstream signal processed by the amplifier 100 from the downstream signal input to the amplifier 100.

The amplifier 100 also preferably includes, between gain blocks 222 and 226, at least one variable attenuator such as attenuator 228 as well as at least one equalizer (signal conditioner) such as any, some, or all of equalizers 236, 238,

240 as will be later described in this disclosure. In this manner, rather than condition and/or pad a signal so as to make a fixed gain upstream amplifier provide unity gain to the input of some other upstream amplifier, the amplifier 100 modulates the amplified upstream gain so that the modulated upstream output of the amplifier is what is needed to provide such unity gain, given the adjacent span. As with the downstream signal processing discussed with respect to FIG. 6, this feature may be reflected in the absence of upstream signal conditioning (equalization) and/or upstream attenuation in the amplifier 100 outside of the signal path between gain block 234 and gain block 236. Since many modern amplifiers are designed for use in a communications network following locations of a wide variety of span lengths, tap house counts, etc., in some embodiments this feature may more particularly be reflected in the absence of plug-in signal conditioners and/or plug-in attenuators outside of the gain block 234 and the gain block 236, or alternately in the lack of receptacles for plug-in signal conditioners and/or plug-in attenuators outside of the gain block 234 and the gain block 236.

In some embodiments, the features just described may be provided by a variable attenuator 228 that provides overall level control for upstream amplification, as well as at least one variable equalizer such as equalizer 238 and/or equalizer 240. In a preferred embodiment, the variable equalization is provided within a novel plug-in Return Path Filter (RPF) module 230. Historically, RPFs are merely a simple low-pass filter that rejects signals above the bandpass of the upstream spectrum in order to provide additional loop isolation, and prevent instability. Preferably, RPF 230 includes at least one variable equalizer (signal conditioner) such as one or more of equalizers 238, 240 to provide variable equalization for the amplified upstream signal. More specifically, in some preferred embodiments, RPF 230 may comprise a first variable equalizer 238 that provides a continuously variable amount of equalization (signal conditioning). That is to say that the variable equalizer 238 provides a continuously variable amount of tilt or slope of gain as a function of frequency. Furthermore, in some other preferred embodiments, RPF 230 may comprise a second variable equalizer 240 comprising a switch that alternately routes the upstream signal path between a first equalizer and a second equalizer. In some embodiments, the switched equalizer 240 comprises two alternately selectable fixed equalizers, each having a different amount of tilt, or gain slope as a function of frequency. In other embodiments, the switched equalizer 240 may be implemented as an attenuator with a fixed amount of gain as a function of frequency (equalization of zero), in combination with an equalizer or signal conditioning unit having a fixed amount of tilt. Still other embodiments may implement the switched equalizer 240 as a combination of two fixed attenuators that each have respectively different amounts of attenuation.

Some preferred embodiments of the disclosed RPF 230 may include both the variable equalizer 238 and the switched equalizer 240. The variable equalizer 238 thereby provides dynamic adjustment of gain tilt within a first range, while the switched equalizer 240 provides an offset adjustment of the variable tilt of the equalizer 238. For example, in an embodiment where the switched equalizer alternates between one fixed attenuator with a flat response of 0 dB and a second attenuator with a tilt of 7 dB, and the variable equalizer 238 applies an amount of tilt that changes from 0 dB to 10 dB, the total range of adjustment is 0 dB to 17 dB. Thus, as can be seen by this example, in embodiments where both the equalizers 238 and 240 are included, the equalizer 238 is analogous to an accelerator pedal of a car, while the equalizer 240 is analogous to a gear shift. Those of ordinary skill in the art will appreciate that the equalizer 240 may include more than two equalizers or "gears" as is needed. Those of ordinary skill in the art will also appreciate that other embodiments may implement an RPF 230 that includes more than one variable attenuator 238 and more than one switched attenuator 240.

In some embodiments, the difference in tilt provided by the switched equalizer is less than the range of tilt provided by the variable equalizer. This ensures that the switched filter does not switch too often.

Preferably, the RPF 230 includes a "knee frequency" that is optimized to the upstream/downstream split implemented by the amplifier 100. The "knee frequency" as described in the specification and claims of the present application refers to the frequency at which any variable tilt of an equalizer hinges. That is to say, one equalizer may be designed to apply a range of 0 dB to 7 dB of tilt (difference in attenuation between high and low frequency), beginning at 5 MHz and ending at 684 MHz, while another may be designed to apply a range of 0 dB to 7 dB of tilt beginning at 5 MHz and ending at 204 MHz. In the first instance, the knee frequency is 684 MHz and in the second instance the knee frequency is 204 MHz. The reason that this knee frequency is important is that, in conjunction with the amount of tilt provided by the variable equalizer, the knee frequency determines the maximum amount of span loss that may be compensated for by an amplifier 100 having a specific amount of full operational gain; the higher the knee frequency, the less gain available at a frequency below the knee frequency for a given loss gain tilt profile and the lower the span loss that an amplifier may correct for. The greater the span losses, the greater the needed amplification required to achieve unity gain. If the knee frequency of the equalizer is optimized for a higher frequency than necessary for the span, the less gain will be available at a given loss tilt. Referring to FIG. 8D for example, as the signal conditioning loss slope is shifted to the right, so is the frequency of minimum loss. This means that for any given gain tilt, the signal conditioning losses at frequencies below the minimum loss frequency are increased, resulting in less gain available for compensating for span losses (loss as a function of frequency), i.e., the amplifier fails as shown in FIG. 4.

In some embodiments, the amplifier 100 may include a fixed-tilt equalizer 236 (i.e., not variable) positioned between the final gain block 226 and any preceding gain blocks in the upstream path. Preferably, the fixed-tilt equalizer 236 is employed in amplifiers 100 where a certain minimum amount of equalization or tilt will always need to be provided e.g., with a very high split such as 684 MHz. This provides a much lower-cost solution that implementing an RPF 230 having more than two equalizer settings in the switched equalizer 240, or providing a very large-range variable equalizer, so as to provide a very large range of equalization. The fixed equalizer 236 may be implemented as a switched equalizer with a high tilt path and a loo tilt path. Also, in some embodiments, the equalizer 236 is separated from the RPF 230 by intermediate gain block 224. Either including the fixed equalizer 236 inside the RPF 230, or positioning it immediately adjacent the RPF 230 would adversely degrade noise performance e.g., Carrier Noise Ratio (CNR) at low frequencies. In other embodiments, the equalizer 236 may be located after the output gain stage 226.

In some preferred embodiments, the amplifier 100 may also include an RPF 230 with a low pass filter 242 that is optimized to the specific split implemented by the amplifier 100. The low pass filter 242 in the RPF 230 may have a cut-off frequency that is aligned to the knee frequency of the variable equalizer 238, providing rejection for frequencies above the knee frequency. The low pass filter 234 provides whatever further attenuation is needed for the amplifier 100 to reject signals above the bandpass of the upstream spectrum in order to provide additional loop isolation and prevent instability.

As with the downstream direction, the variable attenuation and equalization provided by the attenuator 228 and the equalizers 238 and 240 may be controlled by the SMU 126. in a manner that, for example, Thus, the SMU 126 may preferably adjust for changes in span losses due to temperature variations so as to maintain unity gain in spite of such changes. This preferably eliminates the need for a Bode circuit to compensate for temperature variations.

As can be appreciated by the foregoing disclosure, the upstream architecture of the amplifier 100 as just described minimizes total composite power (TCP) that the output gain stage need to operated at and, unlike legacy amplifiers, gain and signal conditioning of the amplifier 100 in the upstream direction are set between amplifier blocks or stages, allowing each amplifier block to operate with the best possible distortion performance as well as the lowest possible TCP. This distribution of gain control withing the amplifier 100 beneficially maintains performance and does not limit the fidelity of the signal by wither Carrier to Thermal Noise (CTN) or Carrier to Intermodulation Noise (CIN).

In some embodiments, a Digital-to-Analog Converter (DAC) may be included to control the variable equalizer(s) and/or an Electrically Erasable Programmable Read-only Memory (EEPROM) may be included in the RPF 230 to store information about the implemented split and the response shape of the equalizers 238 and 240.

Booster Amplifier

In addition to standard amplifiers such as multiport Mini-Bridger (MB) and Line Extender (LE) amplifiers, the Extended Spectrum DOCSIS specification provides for low cost, low gain booster amplifiers to support the upgrade of spans where a simple drop-in of a higher bandwidth amplifier is not sufficient for meeting Quality of Service (QOS) requirements of subscribers. Preferably, such booster amplifiers should have a fixed upstream/downstream gain as well as be power and cost optimized using low-power and low-TCP upstream/downstream gain blocks. Furthermore, such booster amplifiers should preferably not require (or include) any thermal compensation or power control, nor should they cost-burden or otherwise impede the standard, primary multi-port and single port amplifiers in the system.

The variability in loss that occurs in a span due to e.g., temperature fluctuations increases with the length of the span, and this variability must be compensated for. When a booster with fixed gain is added to the span, the effective loss of the span is reduced, however, the variability in loss due to temperature is increased. This is because temperature changes not only affect the cable, but also affect the performance of the amplifiers in the span, including that of any added booster amplifiers. In addition, the booster amplifier allows the primary station amplifier to support spans with more cable and passive elements than it could otherwise, resulting in an increase in the variability of loss over temperature. All this increased variability must be handled by the primary station amplifier because the low-cost requirements for the booster amplifier prevent such booster amplifiers from including expensive components to perform thermal compensation. Stated differently, the booster amplifier must not only provide the additional amplification required for a desired upgrade, but also must provide further amplification to allow the primary amplifiers to have sufficient gain reserve to compensate for the increase in the variability of span losses caused by the addition of the booster amplifier itself. Any design of a booster amplifier must be evaluated against such requirements, else the cost of the increase in gain reserve required in the primary amplifiers may outweigh the benefit of the booster.

To illustrate required specifications of a potential booster amplifier, the present inventors evaluated a sampling of twelve existing node designs, which consisted of a mixture of 860 MHz, 870 MHz, and 1 GHz designs, and included a total of 307 amplifiers and 942 total spans. Across these networks, a total of thirteen spans were found to fail after performing a like-for-like drop-in upgrade of amplifiers to upgrade the span to support a higher bandwidth of 1.8 GHz i.e., MB amplifiers were replaced with 1.8 GHz MB amplifiers, LE amplifiers were replaced with 1.8 GHz LE amplifiers, etc. These thirteen failed spans accounted for 1.4% of the total upgraded spans and included 4.2% of the total active elements in the upgraded spans.

Figure 11A:
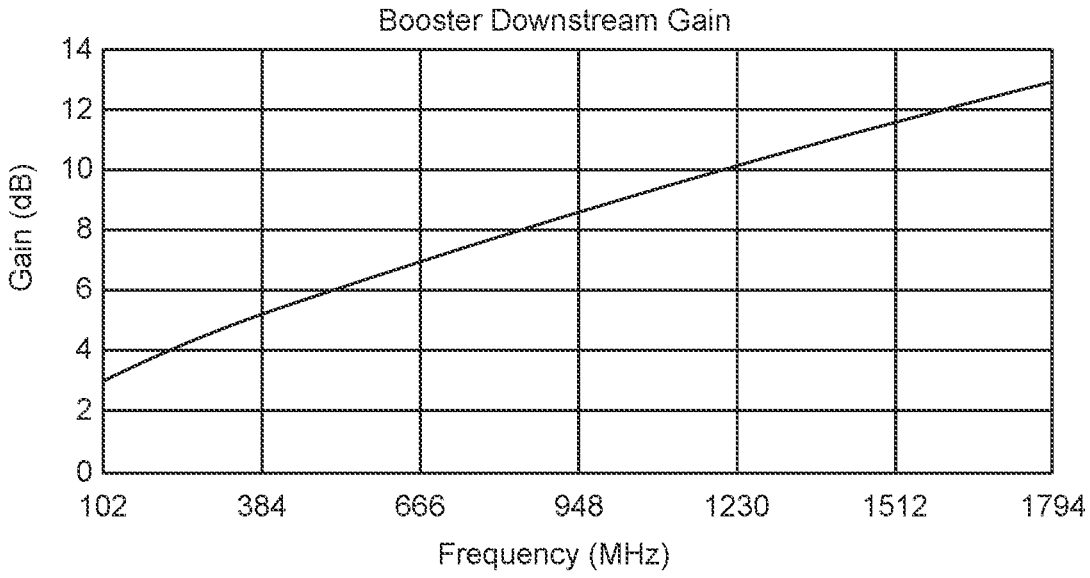
FIGS. 11A and 11B show downstream and upstream gain tilt curves as a function of frequency for an exemplary booster amplifier having a maximum Total Composite Power (TCP) output of 55 dBmV.
Figure 11B:
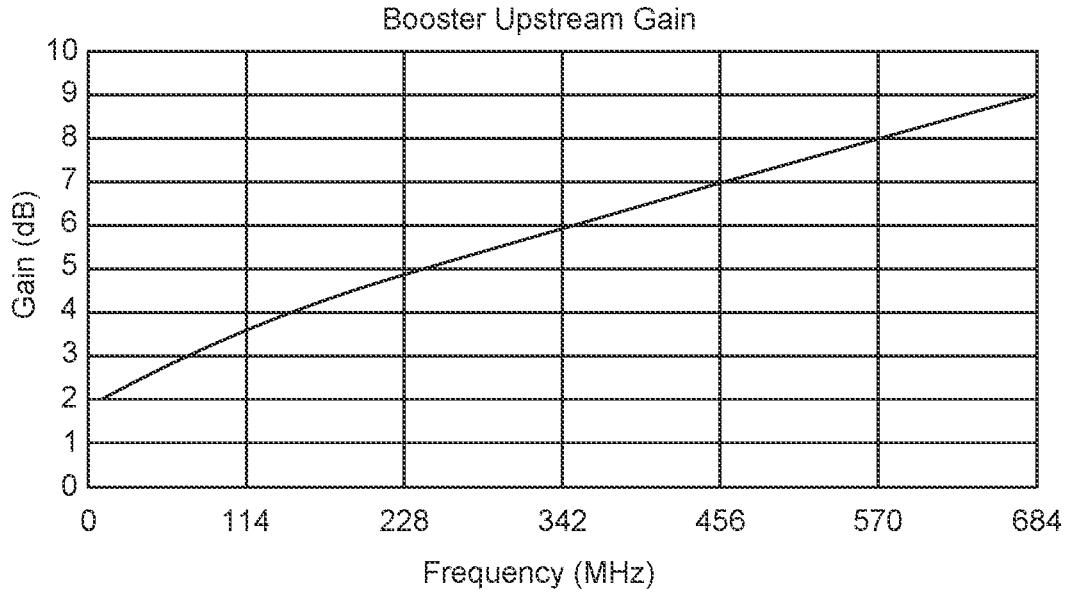

These failed spans, along with worst-case legacy full express spans, were used to determine specifications for an exemplary booster amplifier that would back-off the gain and gain tilt of the primary amplifiers in the failed spans a sufficient amount so as to compensate for the additional thermal variability of the upgraded span. Specifically, FIGS. 11A and 11B show the upstream and downstream gain tilts, respectively, of such an exemplary booster amplifier, which has a maximum TCP output of 55 dBmV.

In addition to the foregoing considerations, the present inventors realized that booster amplifiers should preferably permit flexibility in their placement. This is a critical consideration, because the booster amplifiers contemplated by the DOCSIS specification must rely on placement within the plant span to manage the input and output levels such that neither the upstream nor downstream levels are too high and introduce signal clipping, or so low as to cause degrades carrier-to-thermal-noise performance. Therefore, it is essential that any successful booster design allows for a range of installation locations within the network span that satisfies both the upstream and downstream signal level operating requirements.

Figure 12:
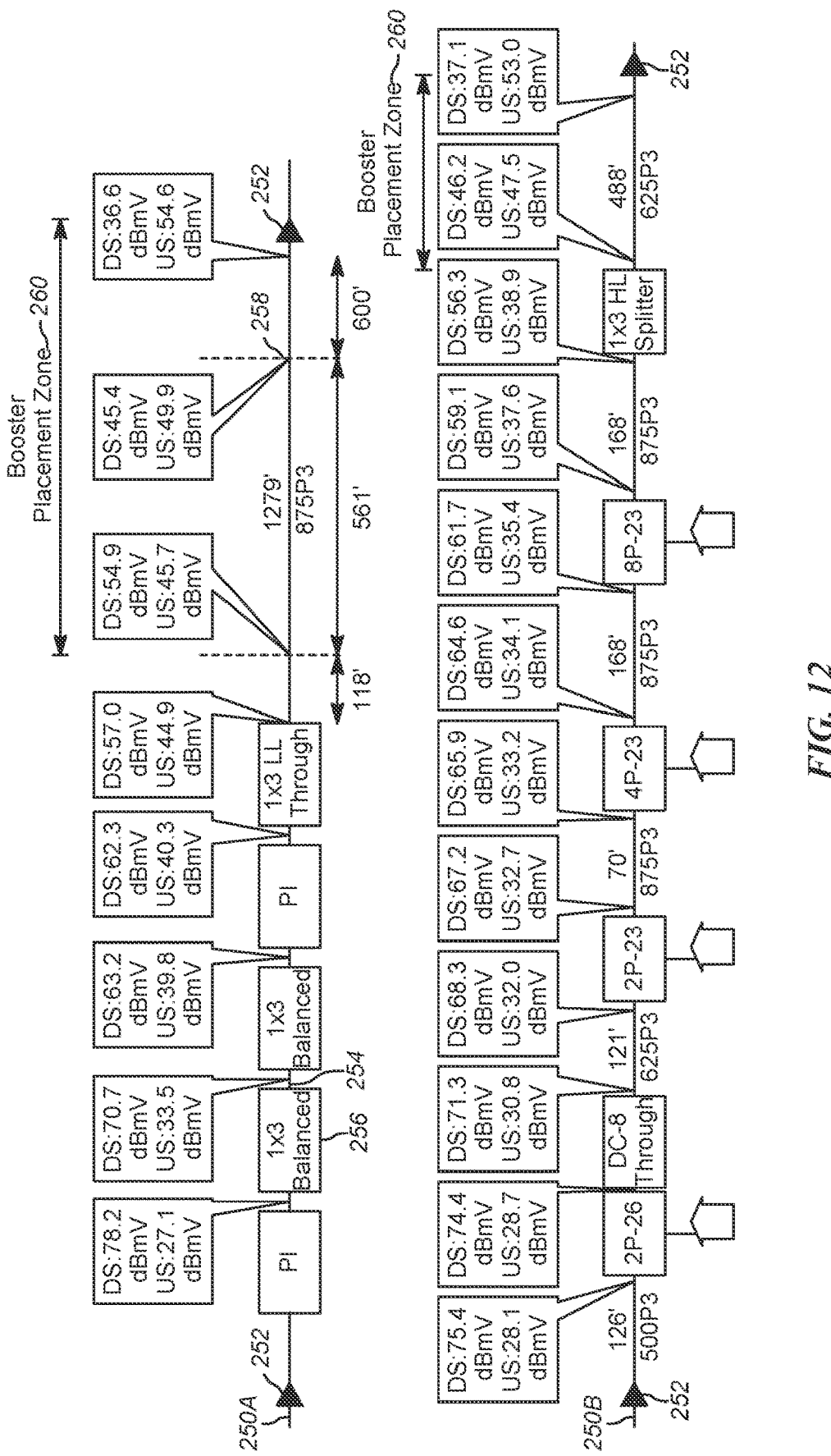
FIG. 12 shows potential booster amplifier placement zones for two exemplary spans of a communications network.

FIG. 12. for example, shows two exemplary spans 250A and 250B where a booster amplifier is required to upgrade a span with mini-bridger (MB) amplifiers 252 to Extended Spectrum DOCSIS (ESD). To understand the range of locations where a booster can be installed the upstream and downstream, booster power levels for every possible installation point within the span were calculated. The upstream TCPs were calculated for a worst-case 492/606 split, while downstream TCPs were calculated for 102 MHz-1.8 GHz. As can be seen in this figure, if a booster amplifier were placed at location 254 of span 252 following the balanced 1×3 splitter 256, the booster amplifier would only require a TCP output level 33.5 dBmV in the upstream direction, well within the 55 dBmV design of the booster amplifier of FIGS. 11A and 11B. In the downstream direction, however, the booster amplifier would require 70.7 dBmV TCP, well beyond the capabilities of that booster amplifier. Conversely, if the booster amplifier were placed at location 258, between the 561-foot length of 875P3 cable and the 600-foot length of 875P3 cable, both the upstream and downstream TCP requirements fall within the specifications of the booster amplifier. As can be seen in span 252, a booster placement zone 260 may represent the location along a span for which a booster amplifier may be placed given its capabilities.

The present inventors also realized, however, that the mere theoretical existence of a place in the network where a booster amplifier may be successfully located may not be sufficient. For example, though the span 250A of FIG. 12 shows a relatively large booster placement zone comprising multiple locations within 1279 feet of cable, span 250B of that figure shows a much more restrictive booster placement zone. Furthermore, even though several locations may theoretically exist within the 488 feet of the booster placement zone 260 of span 250b, in reality a booster might not actually be able to be placed in that zone. For example, there are times when the plant design may not match the actual deployed network. Still other situations may arise where a cable plant operator lacks an easement or other access to the particular location in which the booster placement zone sits, or portions of the booster placement zone. This can lead to a potential placement for a booster amplifier that works on paper, but results in significant overload distortion which in turn may require a technician to remove the booster, resplice the cable, and find a new location to install the booster.

Figure 13A:
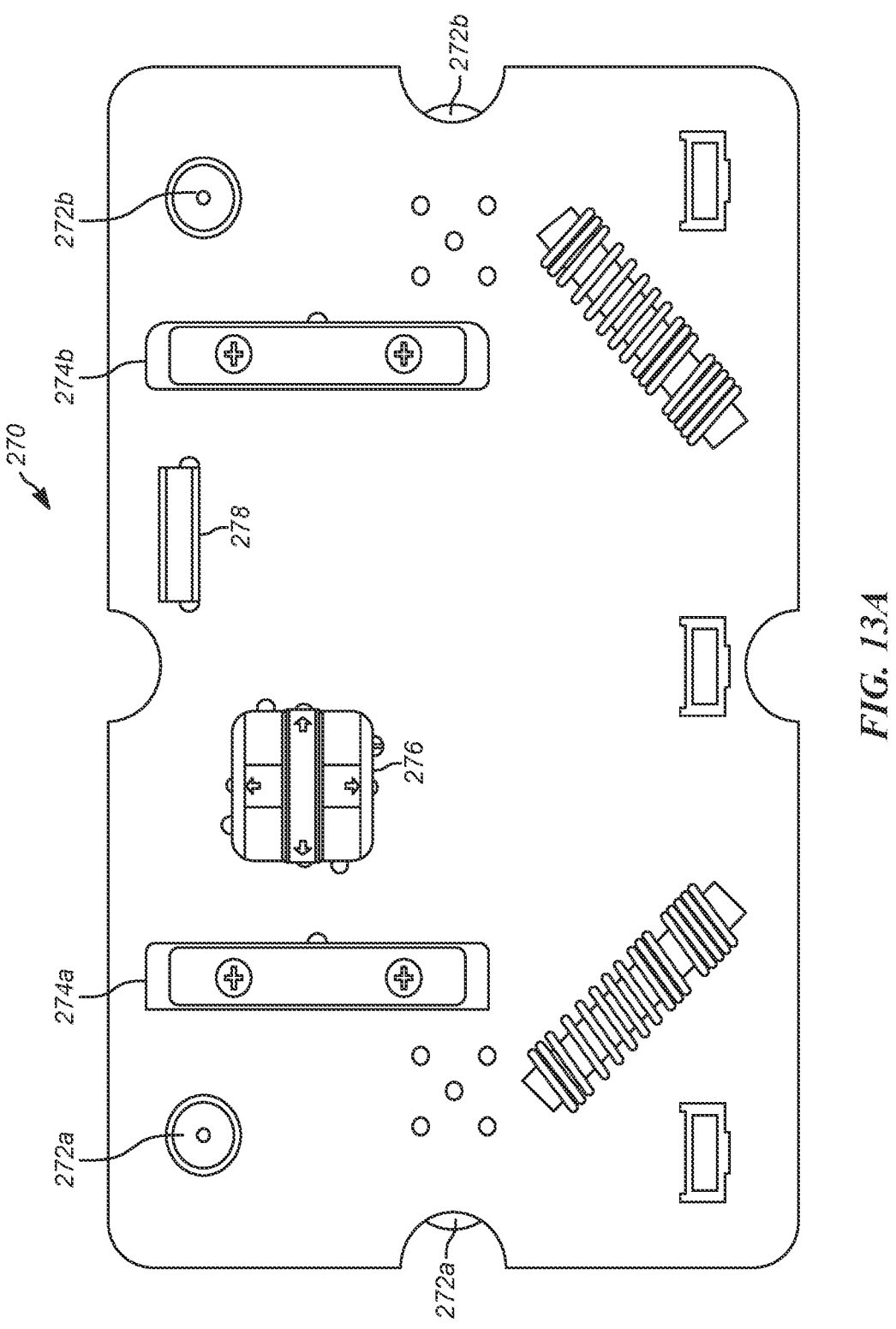
FIG. 13A shows an exemplary top view of a circuit board for an input plugin to a booster amplifier in accordance with some embodiments of the present disclosure, having an adjustable attenuator.
Figure 13B:
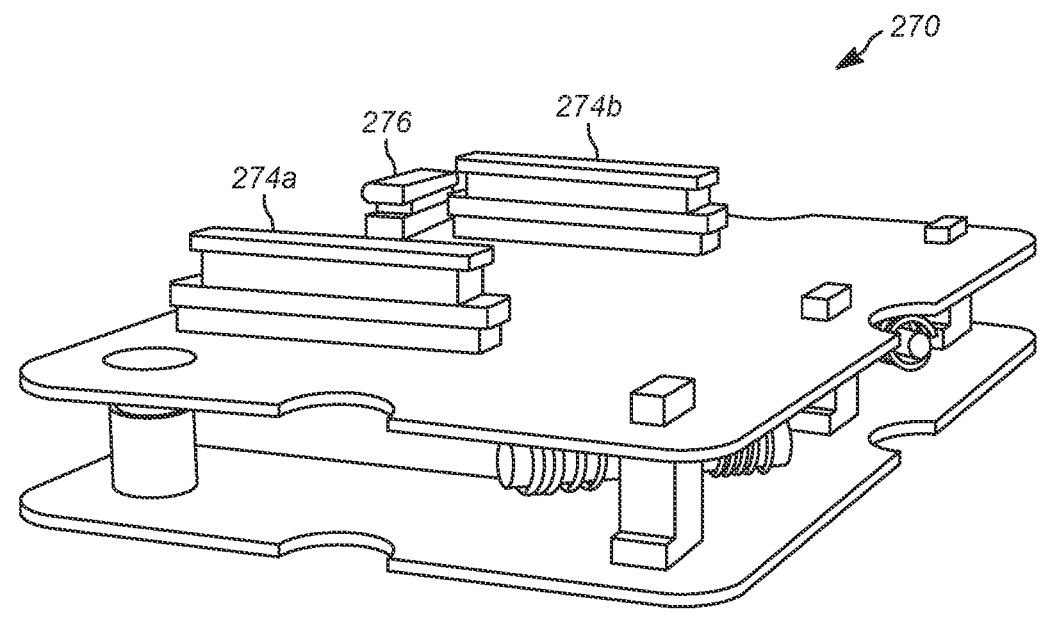
FIG. 13B shows a perspective view of the input plug-in of FIG. 13A.

FIGS. 13A and 13B show a novel input module 270 for a booster amplifier. Specifically, the module 270 may comprise an input port for receiving an input signal to the plug-in 270 and an output port that outputs a signal to the amplification stage of a booster amplifier. Between ports 272a and 272b are diplexers 274a and 274b that isolate a downstream signal from an upstream signal. The input module 270 also preferably includes an attenuator 276 and a signal conditioner (equalizer) 278 that attenuate and condition, respectively, the downstream signal prior to that signal being output for amplification by a booster amplifier that includes the module 270. In some embodiments, the input module 270 is a plug-in module that may be inserted and/or removed from a slot or other electrical receptacle of a booster amplifier. Furthermore, those of ordinary skill in the art will appreciate that some embodiments of the input module 270 may have an attenuator 276 but no signal conditioner 278.

As can easily be appreciated, the disclosed input module 270 allows a technician or plant operator to configure a booster amplifier to have different characteristics by selectively adding attenuation and/or signal conditioning to the input of a booster amplifier, and in doing so will expand the booster placement zone 260. For example, by selectively inserting the input module 270 into a booster amplifier and adding sufficient attenuation, the booster placement zone 260 of span 250b as seen in FIG. 12 may be expanded leftwards, providing more options for placement. Those of ordinary skill in the art will also appreciate from FIG. 12 that, although booster amplifiers may typically be expected to fail in the downstream direction, in some circumstances failure may occur in the upstream direction, hence some embodiments of the input module 270 may also include attenuation/signal conditioning in the upstream direction as well as the downstream direction.

In a preferred embodiment, the attenuator 276 and/or the equalizer 278 are plug-in modules that may selectively and alternately inserted into, and removed from, the input module 270. This beneficially allows adjustability of the amount of attenuation/signal conditioning performed by the input module 270. As one example, a technician may have several available attenuators/signal conditioners and may simply select and insert the appropriate one for a given location in a span, or best one by trial and error.

Figure 14:
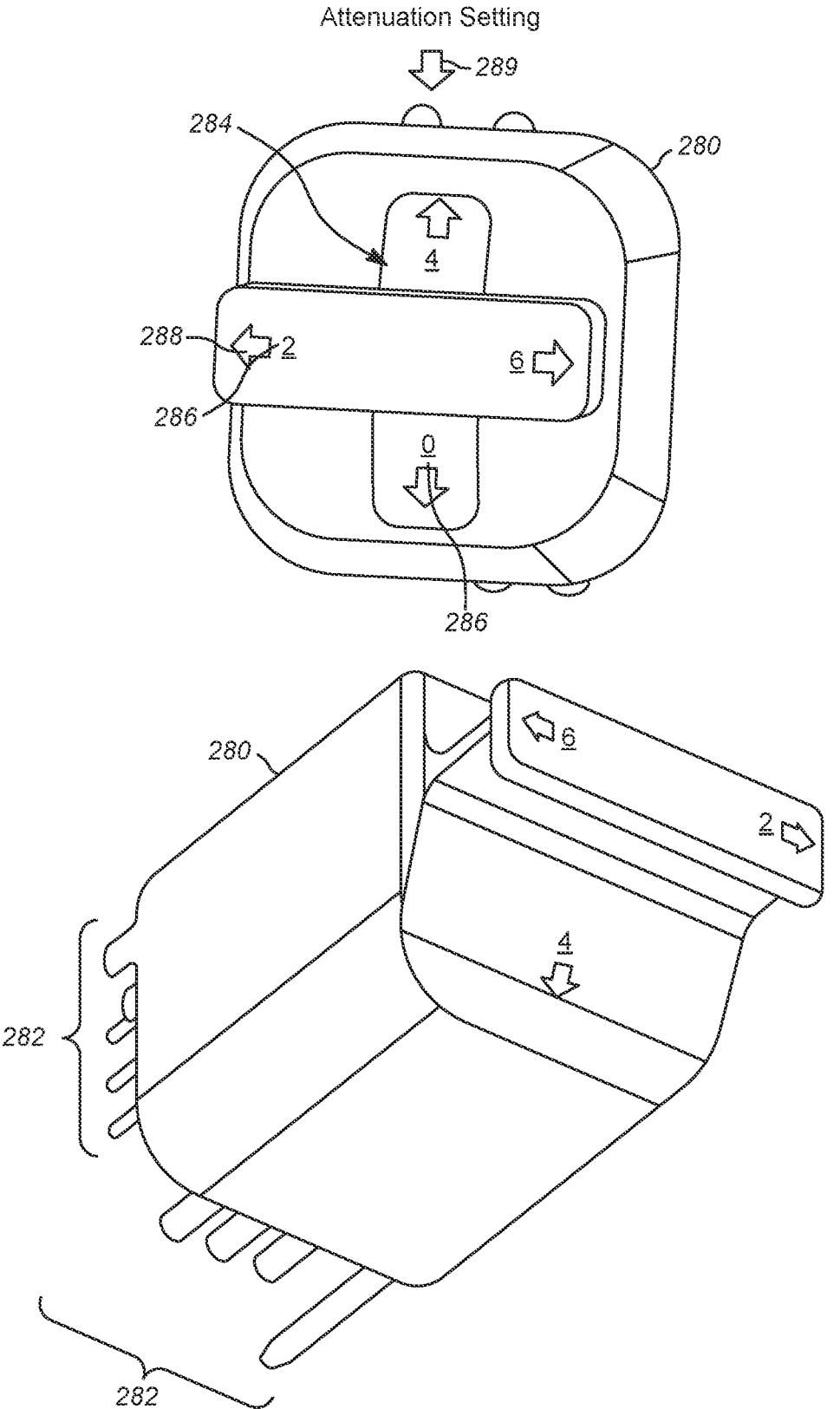
FIG. 14 shows top and perspective views of the adjustable attenuator of FIGS. 13A and 13B.

Furthermore, in other preferred embodiments a single attenuator 276 may itself provide an adjustable range of attenuation. Referring specifically to FIG. 14 for example, the attenuator 276 may comprise an insert 280 having a plurality of interfaces 282 that allow the insert 280 to be secured into the input module 270 in one of a plurality of different orientations, where each orientation provides a different amount of attenuation. For example, the insert 280 may selectively provide either 0 db, 2 dB, 4 dB, or 6 dB of attenuation depending on which of four different orientations that the insert 280 is secured into the input module 270. In some embodiments, the interfaces 282 conform to the JXP 3-pin form factor.

Preferably, the insert 280 and/or the input module 270 includes markings, such as an arrow, a dot, etc. that indicate the orientation of insertion to achieve a specified amount of attenuation. Thus, for example, FIG. 14 shows an insert 280 with a legend 284 displaying the incremental amount 286 of attenuation for each possible orientation, as well as one or more guides 288 by which a technician knows the proper orientation associated with each of these displayed amounts. Similarly, the input module 270 may have a complementary guide 289 that aligns with a selected one of the guides 288.

The insert 280 provides numerous benefits. First, it provides a robust and reliable method for a technician to adjust an input amount of attenuation to a booster amplifier and thereby expand the zone in which a booster amplifier may be placed in a span. Furthermore, the insert 280 reduces or eliminates the need for a technician to carry many different JXP plugins.

Figure 15:
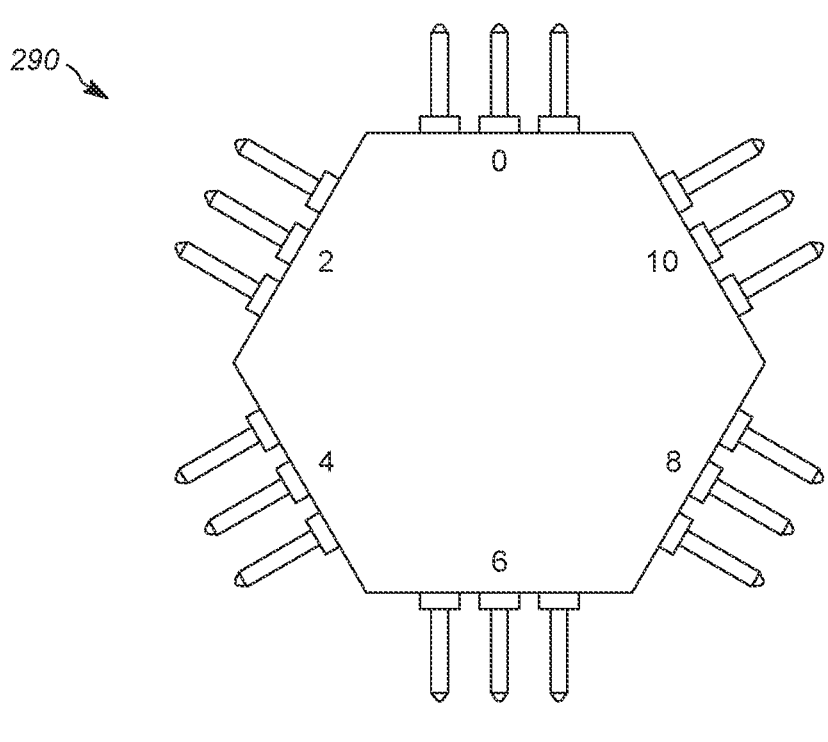
FIGS. 15 and 16 each show respectively different alternate embodiments to the adjustable attenuator of FIGS. 13A and 13B.
Figure 16:
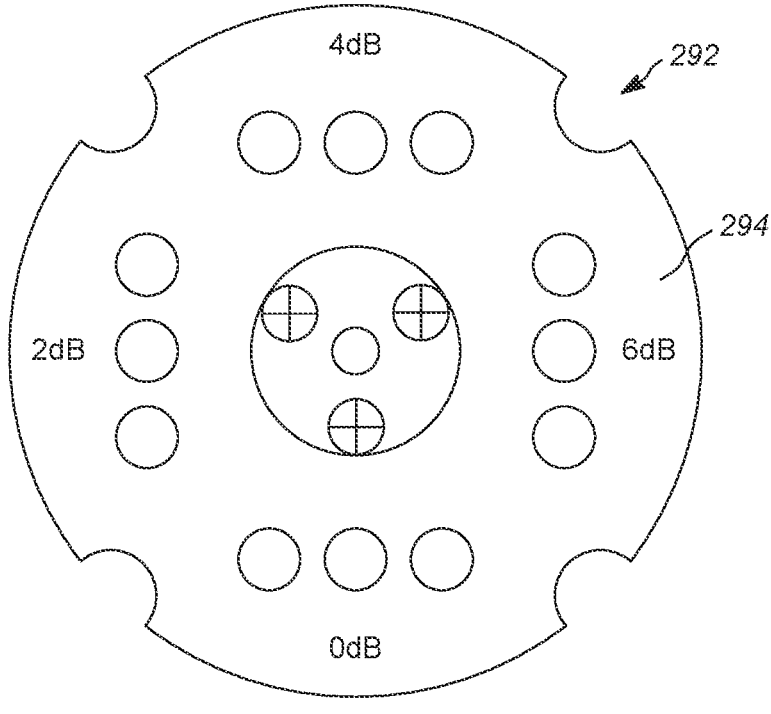
Figure 17:
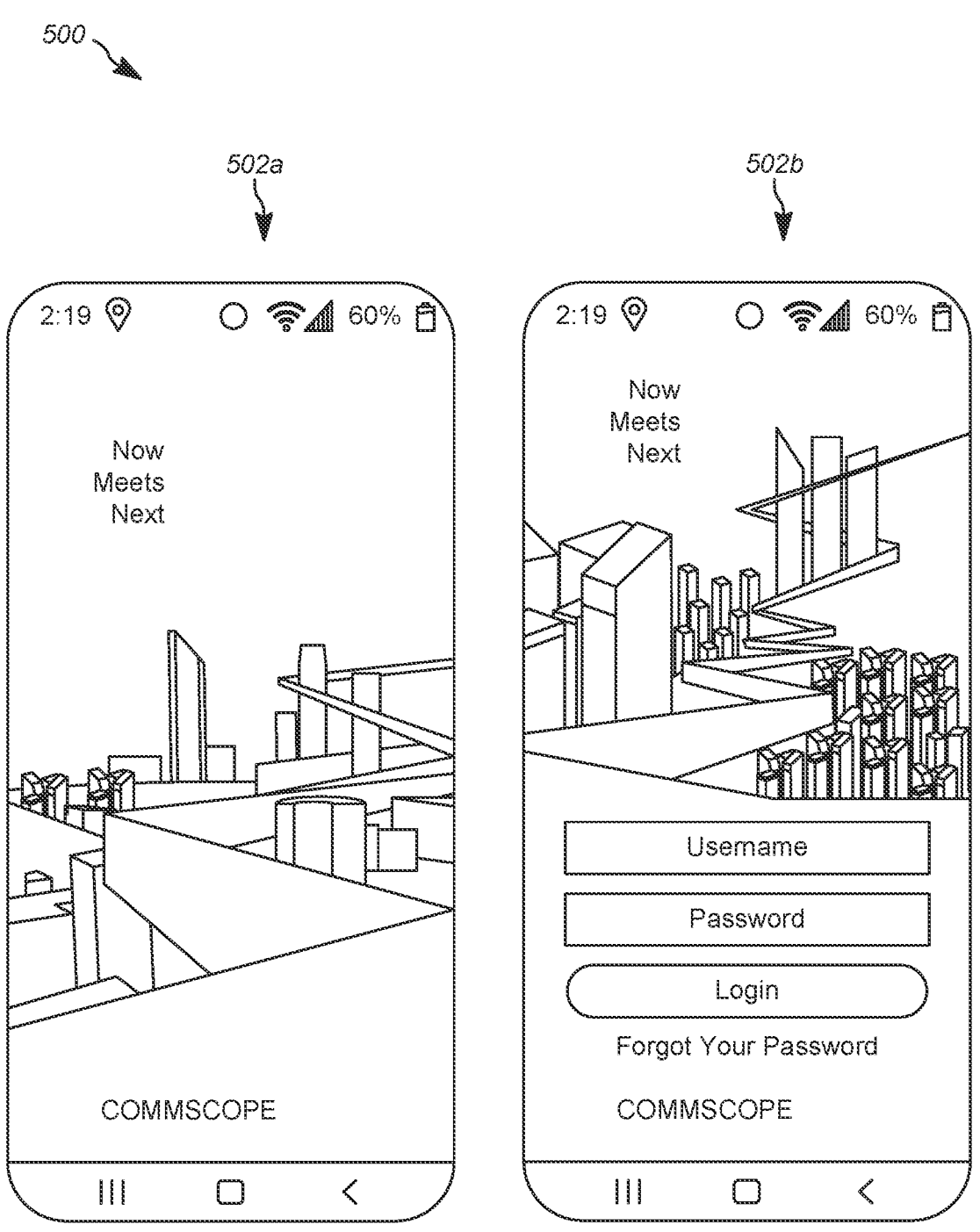
FIGS. 17-25F each show respective screens of an exemplary user interface for configuring and managing an amplifier as disclosed in the present application.

Those of ordinary skill in the art will also appreciate that many different configurations of the insert 280 are possible, as are many different ranges and/or gradations of attenuation. For example, FIG. 15 shows an alternate, hexagonal shaped insert 290 having a range of 0 dB-10 dB in six 2 dB increments. FIG. 16 similarly shows a dial-type insert 292 that has a range of 0 dB-6 dB in 2 dB increments. In still further embodiments, an insert may not need to be removed in order to adjust the attenuation, as variable attenuation may be implemented by a knob, dial, or other such mechanism.

User Interface

The amplifiers disclosed in the present application, and particularly the amplifier(s) embodied by FIGS. 6 and 8-10 may be configured, monitored, and controlled through a novel user interface which is shown in FIGS. 17-25F. This user interface may preferably be displayed on a mobile device such as a cell phone, or alternatively any similar device such as a laptop, PDA, tablet etc. As shown specifically in FIG. 17, the disclosed user interface may initially present a splash screen or initial loading screen 502a that is displayed while the device upon which it operates boots up. Once the boot operation is finished, the display preferably transitions to a security or log-in screen 502b by which a person is prompted to enter a user name and password.

Figure 18A:
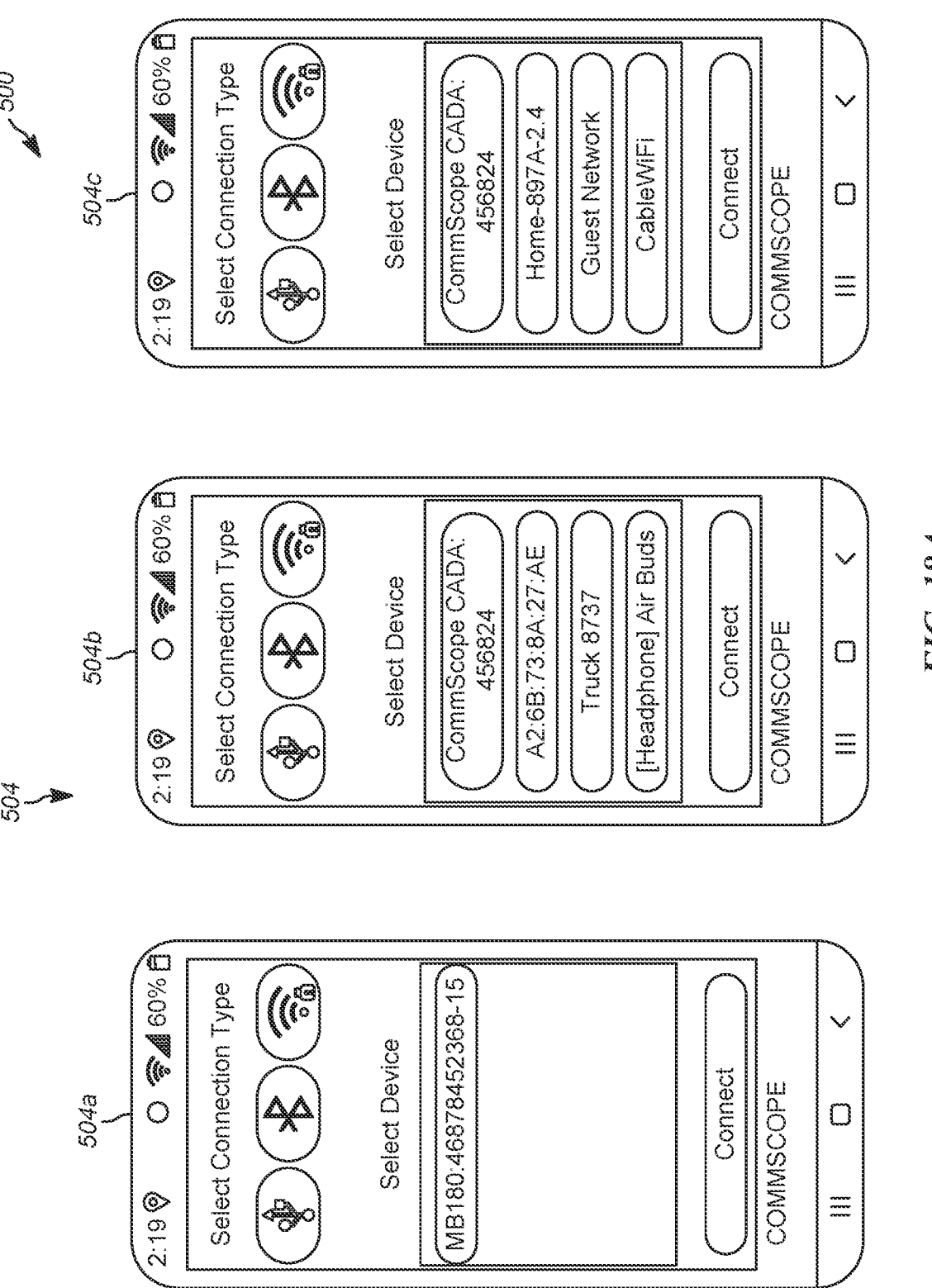
Figure 18B:
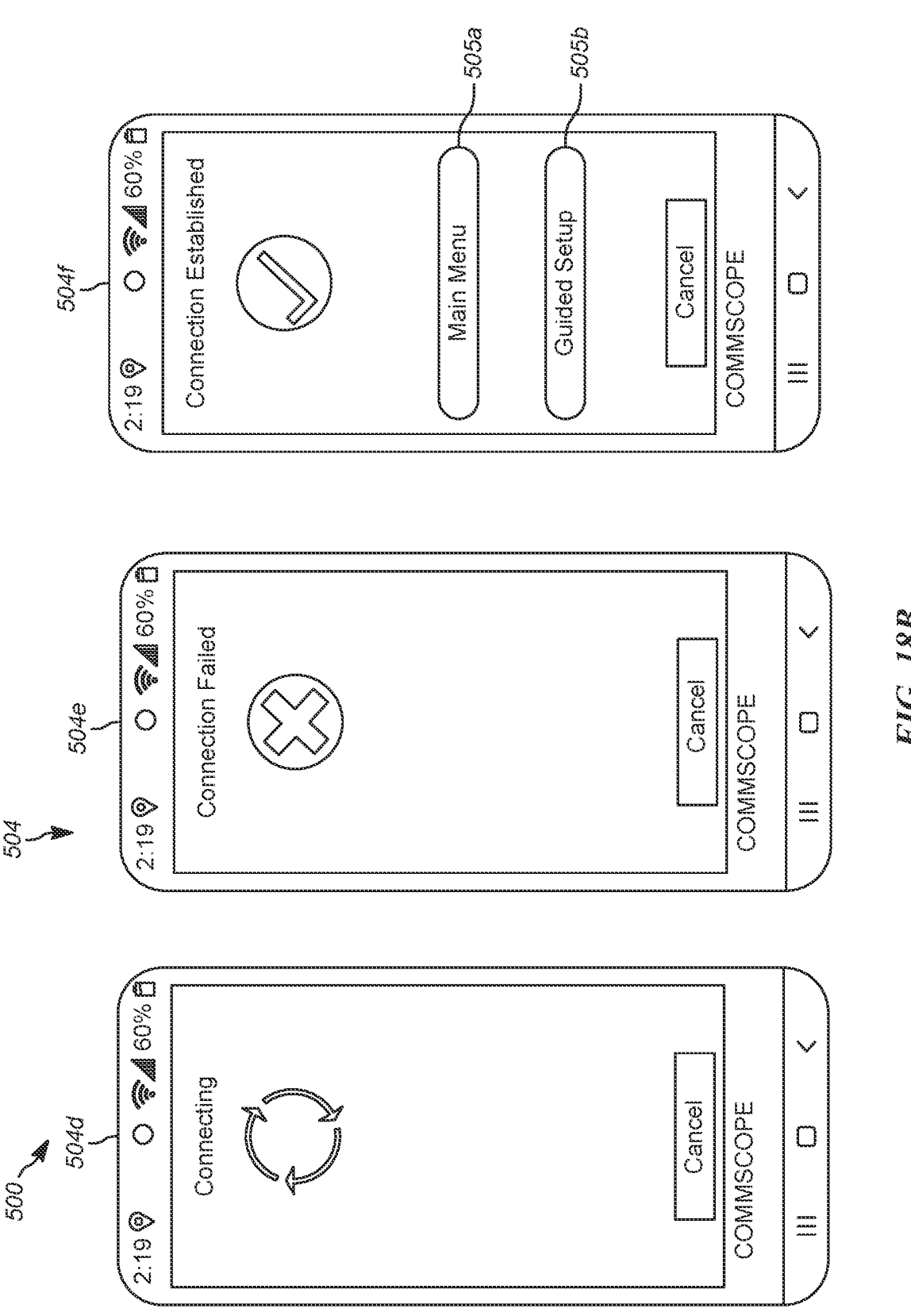

When these data fields are successfully entered, as seen in FIGS. 18A and 18B, a connection interface 504 with associated connection screens 504a-504f may be selectively accessed/displayed. Connection interface 504 is used by a technician to select a connection type by which the mobile device that operates the user interface connects to the amplifier that is being configured/monitored/controlled. As seen in FIGS. 18A-18C, three options for connection may be presented: a USB cable (screen 504a), a Bluetooth Low Energy (BLE) connection (screen 504b), and a wireless connection (screen 504c). With respect to the BLE and wireless interfaces, preferably a Customer Access Dongle Accessory (CADA) is plugged into a port, such as a USB port, of the amplifier and this CADA is securely paired to the handheld device (cell phone etc.) to allow technician access to the amplifier using the disclosed user interface. Also, with respect to the BLE and Wifi connections shown in screens

504b and 504c, multiple devices may be detected and in that instance a device selection would be required. Once a connected device is identified connection screens 504d-504f as shown in FIG. 18B are presented where, upon successful connection the user is presented with a main menu option 505a and a guided setup option 505b. The user may also engage a cancel button or a back arrow to return to the connection screen.

Figure 19:
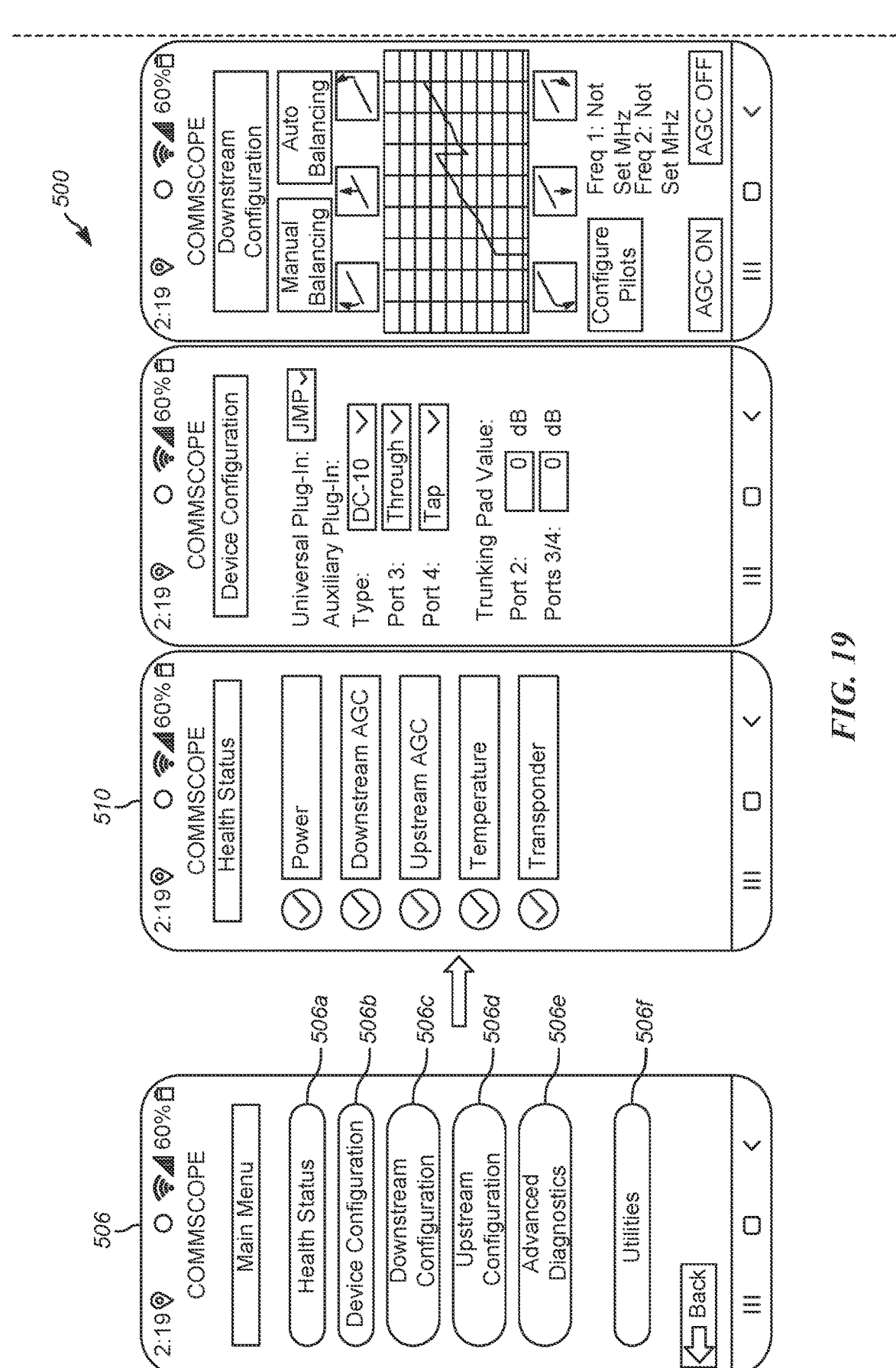
Figure 19:
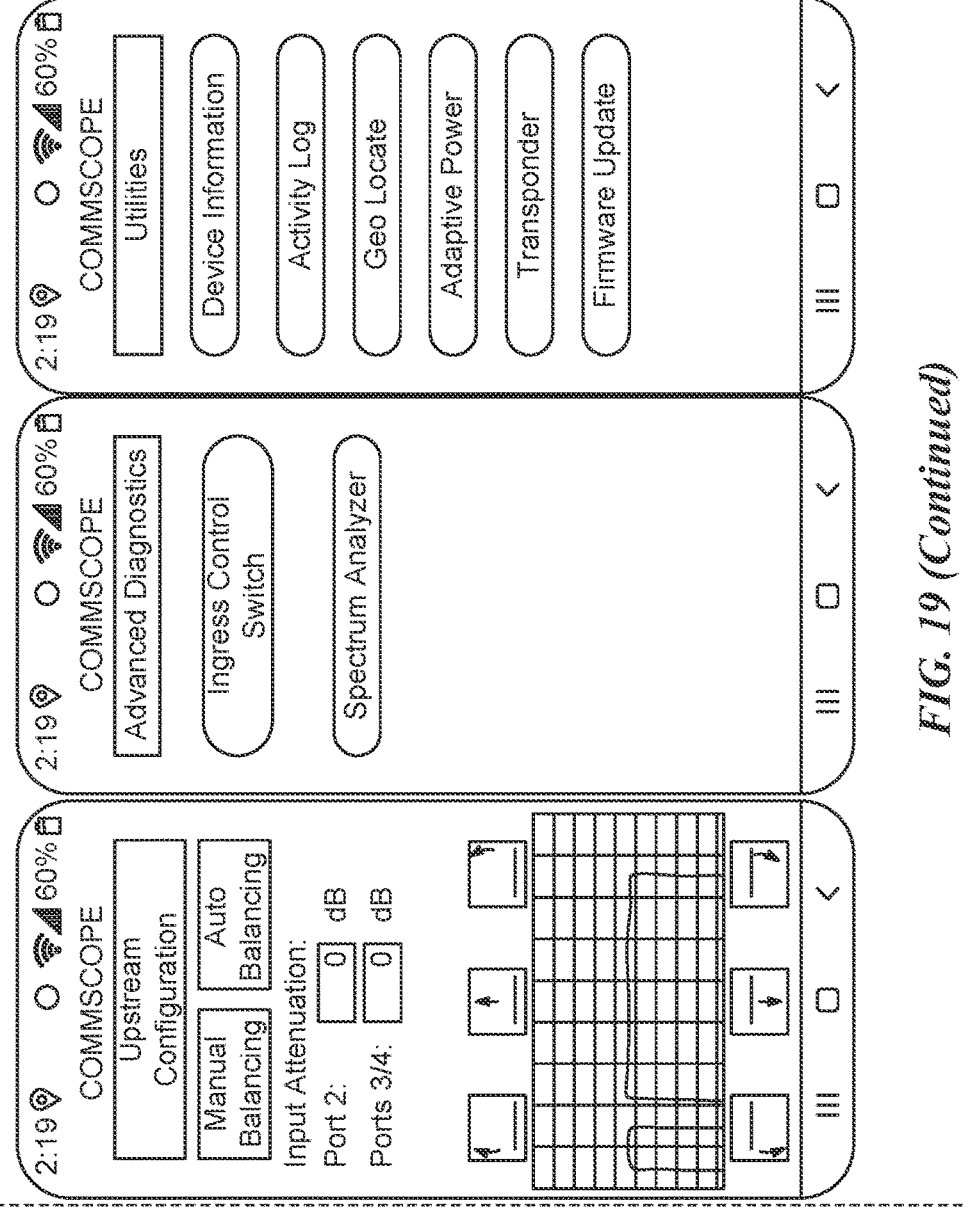

FIG. 19 shows an exemplary main menu screen 506 that presents a technician with a health status option 506a, a device configuration option 506b, a downstream configuration option 506c, an upstream configuration option 506d, an advanced diagnostics option 506e, and a utilities option 506f. Selecting any of these options will present respective interfaces that show the health of the amplifier 100, enable its general, upstream, and downstream, configuration etc. All of the settings monitored or configured through these respective interfaces preferably persist through a power cycle event.

Figure 20A:
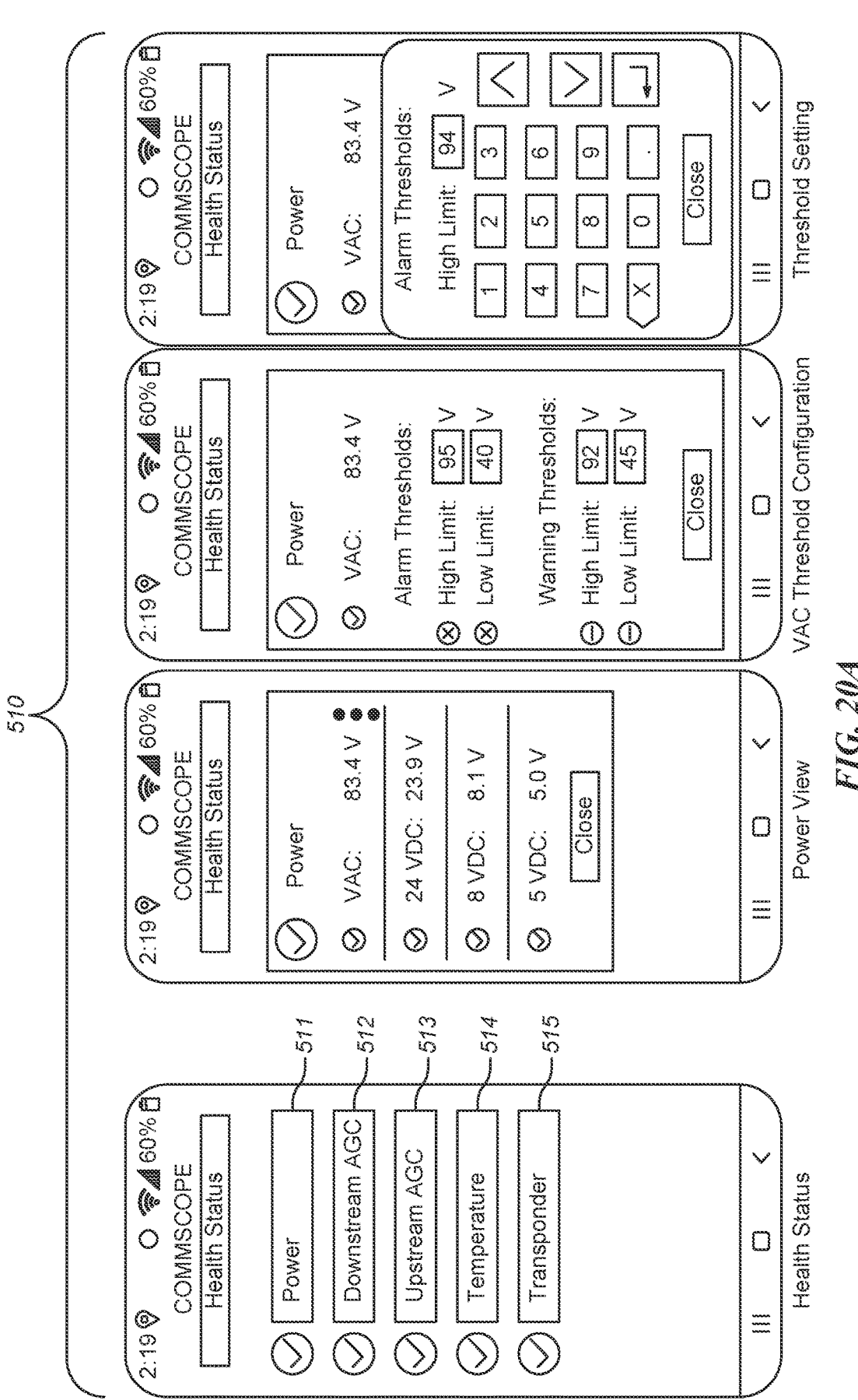
Figure 20B:
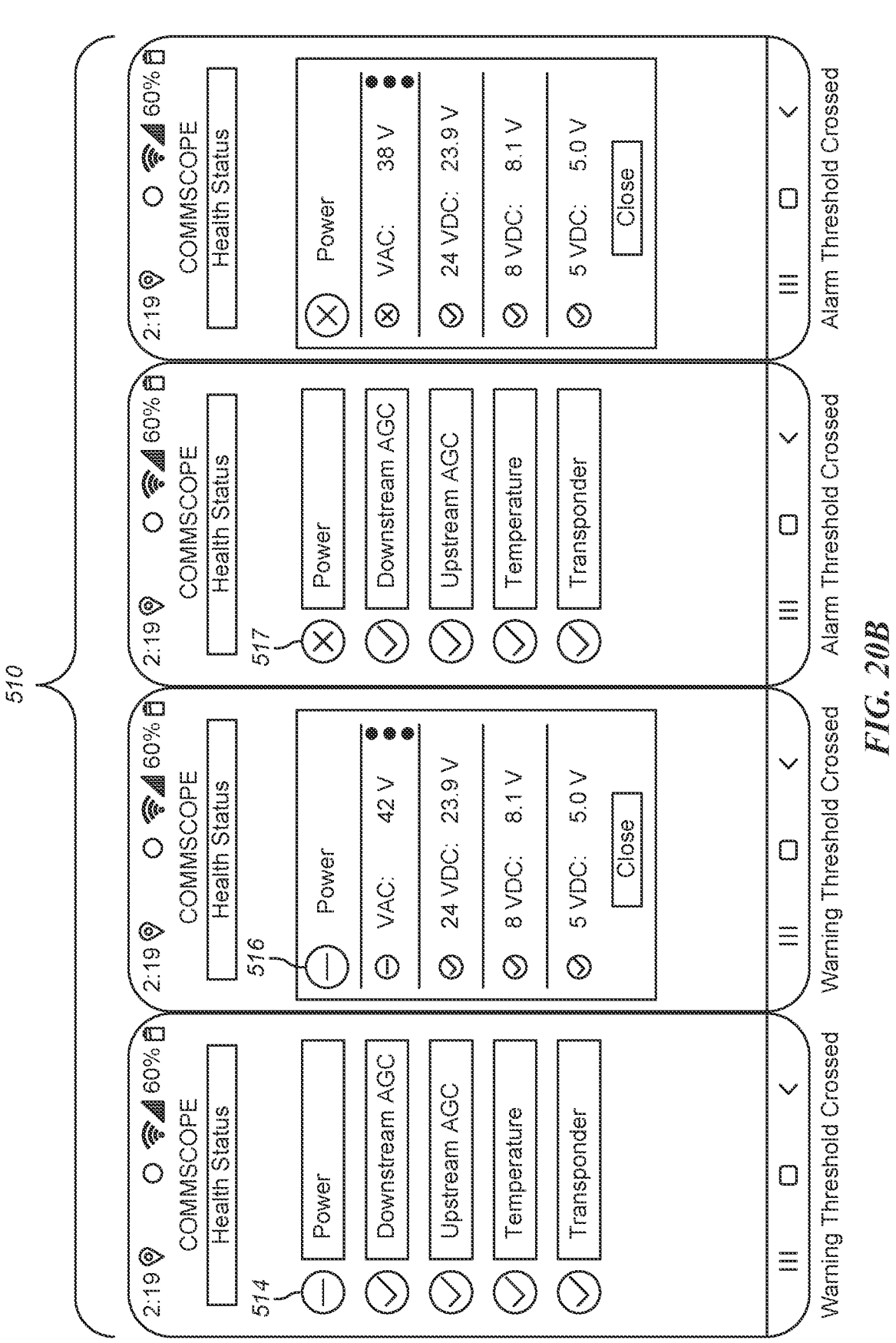
Figure 20C:
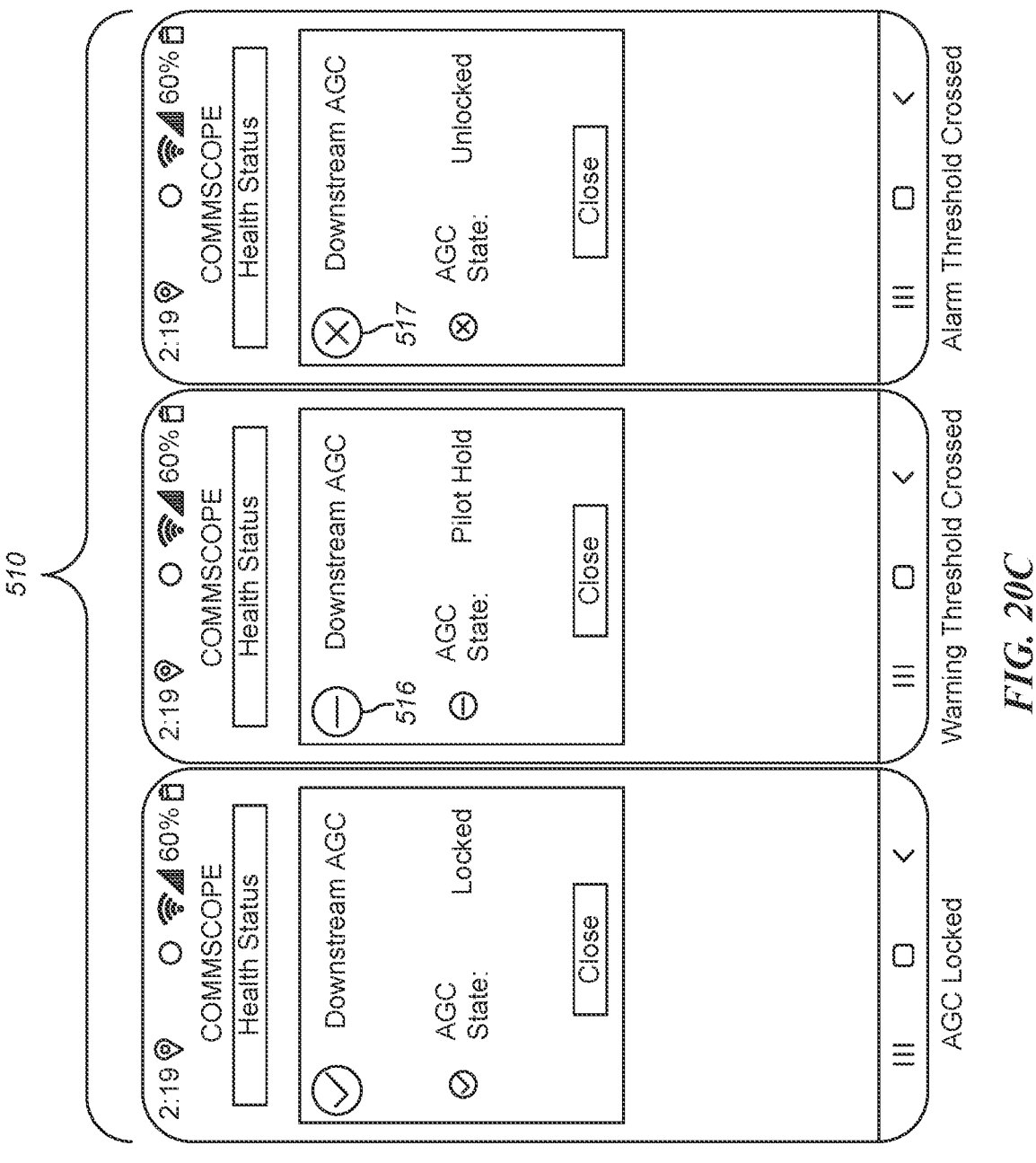
Figure 20D:
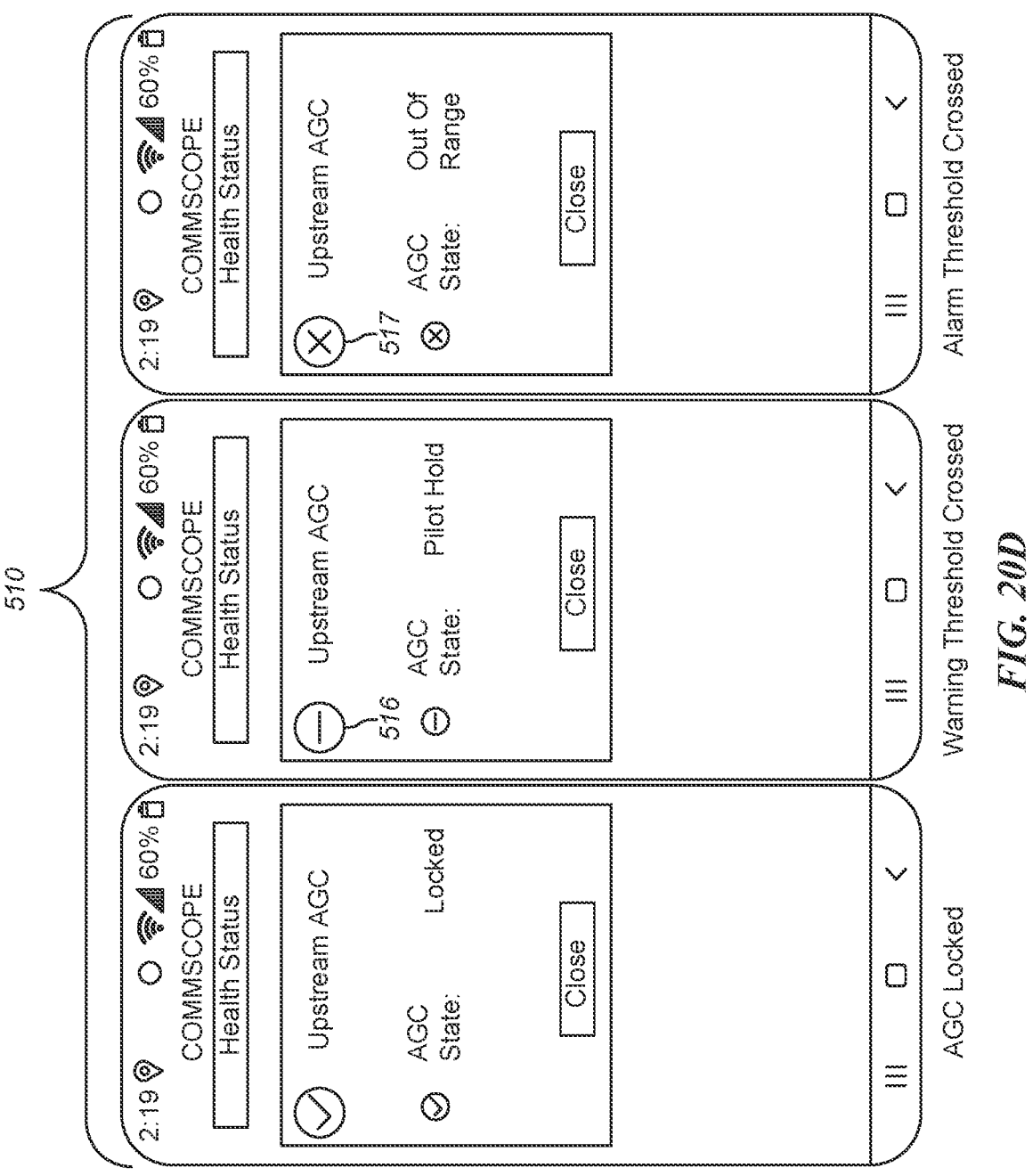
Figure 20E:
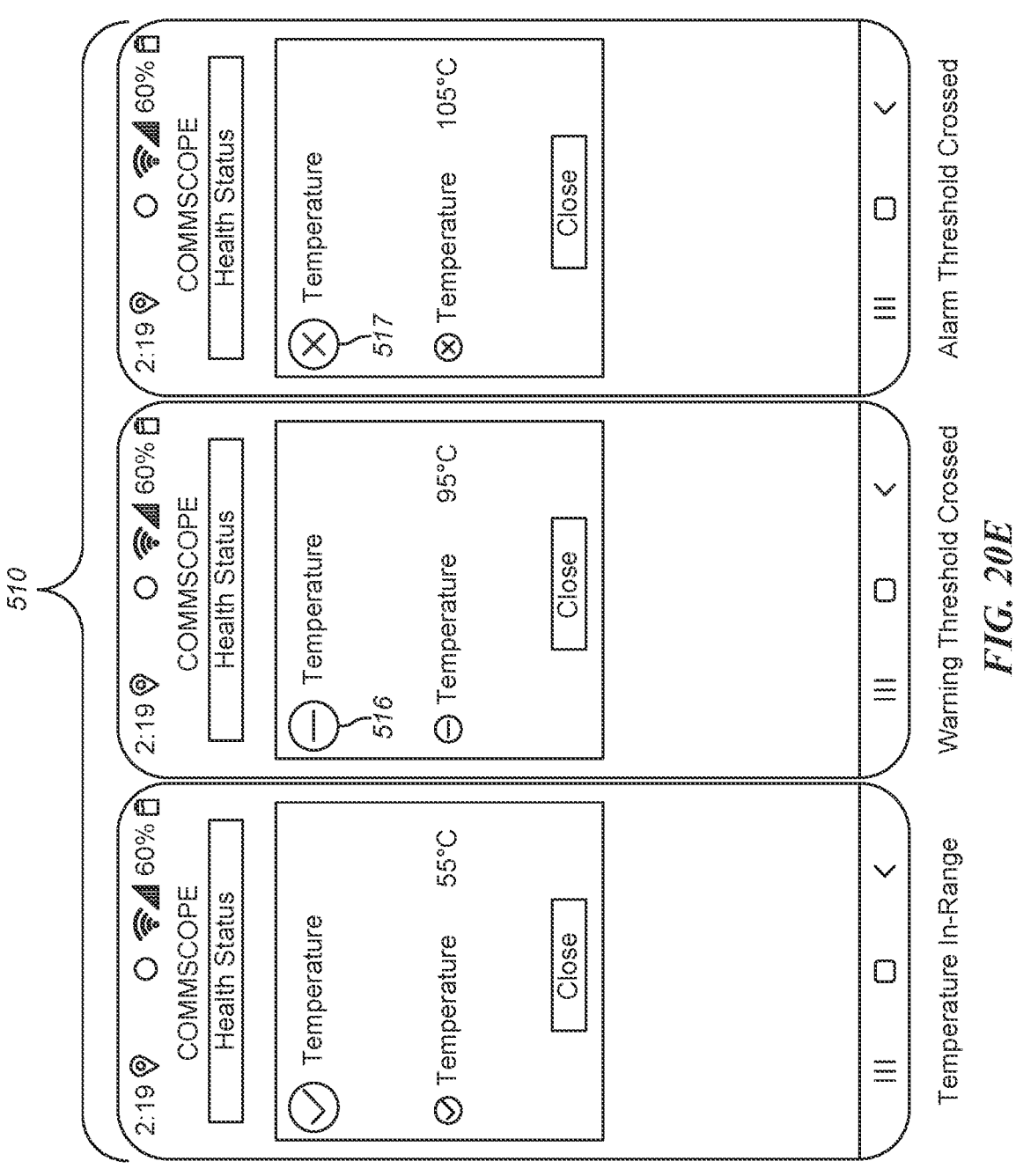
Figure 20F:
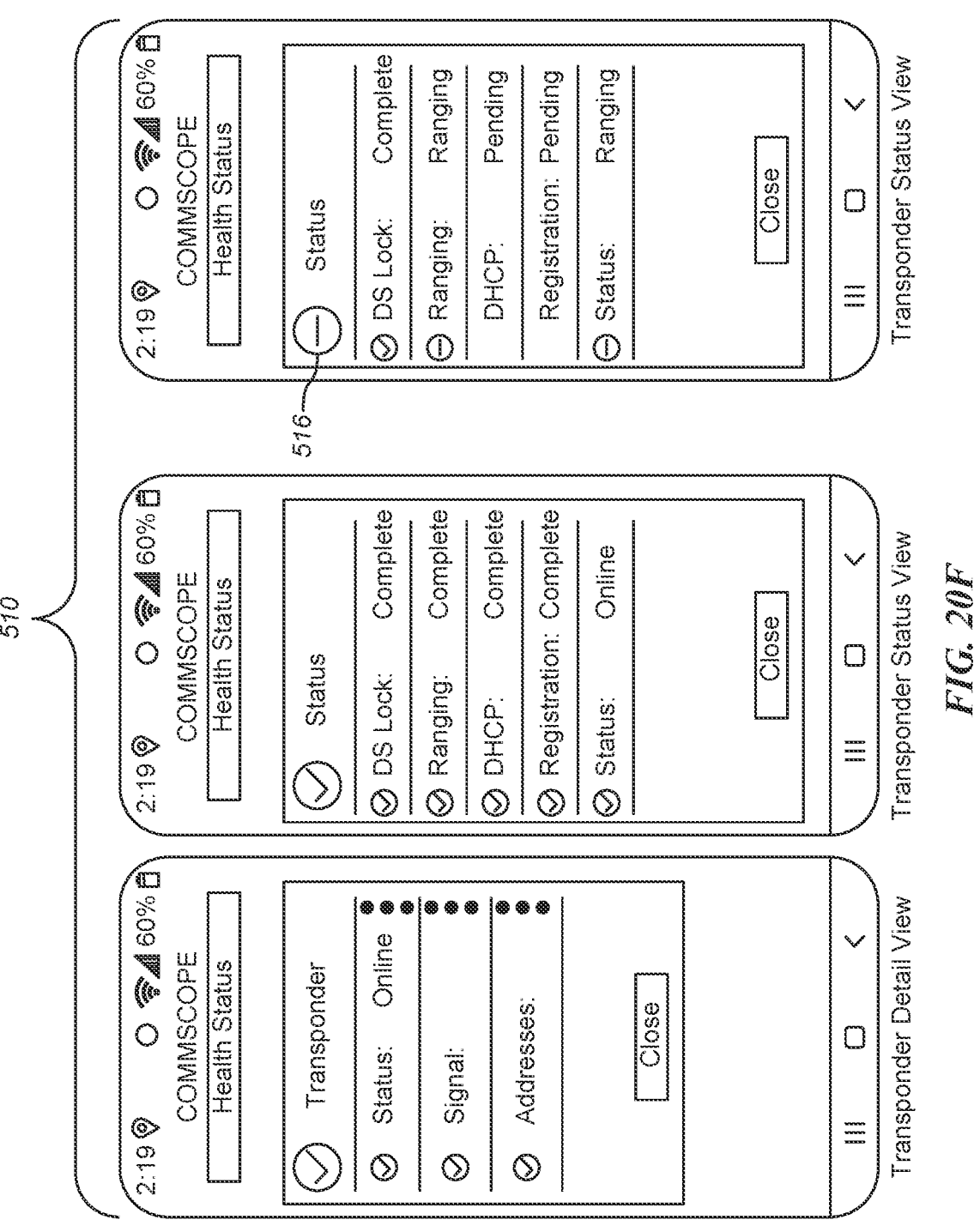

Selecting the health status option 506a of FIG. 19 causes a health status interface 510 to be accessed, and which is shown in detail in FIGS. 20A-20H. As seen in FIG. 20A, the health status interface 510 presents a user with respective selections for power 511, downstream Automatic Gain Control (AGC) 512, upstream AGC 513, temperature 514, and transponder 515. Any of these options may be selected for additional detail. For example, as seen in the second panel of FIG. 20A, tapping on the power option 511 brings up detailed values for the four power rails being monitored, displayed to 0.1V resolution. The warning and alarm thresholds are preferably only configurable for the VAC rail. To configure these thresholds, the user may click on the three vertical dots, and the thresholds are set to cause an alarm when they are met or exceeded. When configuring the thresholds, clicking in the data entry box seen in the third panel of FIG. 20A brings up the number pad shown in the fourth panel of FIG. 20A, which shows which parameter is being modified. The up or down arrows in the number pad preferably allow the user to increment or decrement the voltage thresholds in 1V steps, and only values of 0V or greater are allowed.

As can be seen in FIGS. 20B-20F, warning and alarm thresholds preferably show changes that propagate through the accessible screens/views. Also, the threshold crossing icons are preferably both color and shape coded for color-blinded access. For example, when a warning threshold is being crossed, a yellow circle 516 with a dash may be displayed, while when an alarm threshold is crossed, a red circle 517 with an "x" or cross may be displayed. Also, as seen specifically in FIGS. 20C and 20D, when the AGC status is healthy, the AGC is in a "locked" state where the system is able to automatically adjust the manually-configured gain and tilt settings of the amplifier while maintaining proper output levels at pilot frequencies, while an alarm indicates that the system is not able to maintain these proper output levels. A warning indicates a "pilot hold" state.

As just noted, the AGC loop in the amplifier adjusting the gain and gain tilt of the amplifier such that the power levels of the pilot frequencies are kept constant. As the loss in the network changes, the pilot levels will change by the same amount. The amplifier measures the power in those channels and adjusts the gain and gain tilt of the amplifier until the pilot frequencies power levels are back to where they were when the amplifier was manually configured. As long as the amplifier is able to adjust its gain and gain tilt and achieve the target pilot frequency power levels, the amplifier state will be reported as "AGC good" and the AGC will be considered "locked". The amplifier will report an "unlocked" state if it is able to determine that the pilot frequencies are present, but there is not adequate gain and/or gain tilt adjustment range left to achieve the target pilot frequency power level. "Pilot Hold" state is reserved for when the amplifier determines that the pilot frequencies are no longer present. This could be because just the pilots are turned off, or possibly because the entire downstream spectrum is no longer present. In this case, instead of adjusting the gain and gain tilt to the maximum in a futile attempt to make whatever noise it measures in place of the pilot frequencies equal to the desired channel power level, the gain and gain tilt simply freeze at their present state until the amplifier determines that the pilot frequencies have returned. This way the amplifier is not in an unreasonable state when the signals return. This scenario can occur when there is a network failure upstream of the amplifier, or during routine maintenance, or also when changes are being made to the downstream channel plan.

Referring specifically to FIG. 20 F-20H, tapping the Transponder button 515 on the main Health Status screen shown in FIG. 20A brings up a Transponder Detail View. In this view, in addition to all warning and alarm states, the Modem Status state propagates to the Transponder Detail View, which in this case is "Online." Tapping on the 3 vertical dots on the Status line brings up the Status detail view, which shows the transponder's progress through the modem ranging and authentication process. Steps that have completed successfully may show a green checkmark icon. Steps that are still in process may show a yellow line warning icon. Steps that have failed may show a red "X" alarm icon. Steps that are pending have no icon.

Figure 20G:
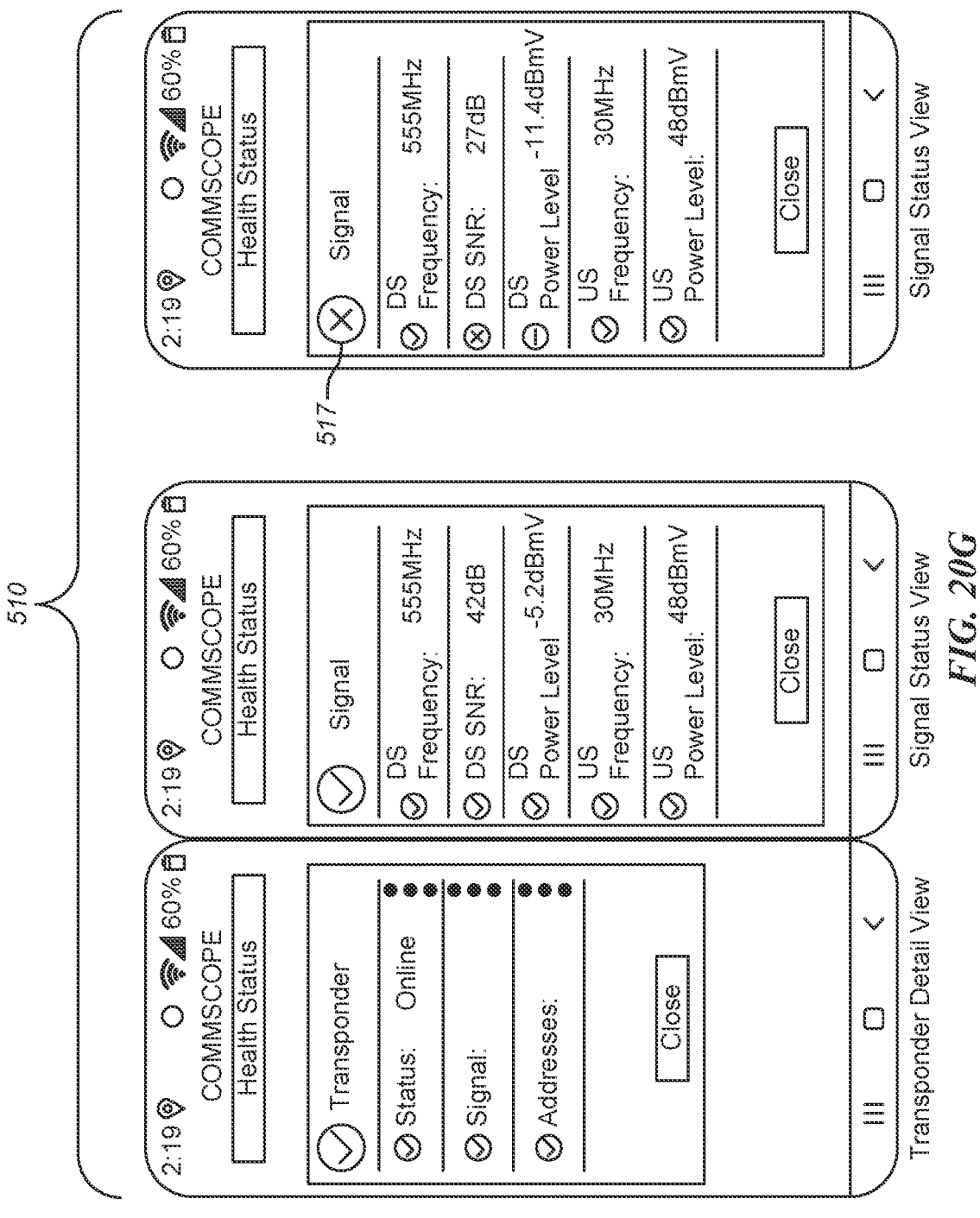
Figure 20H:
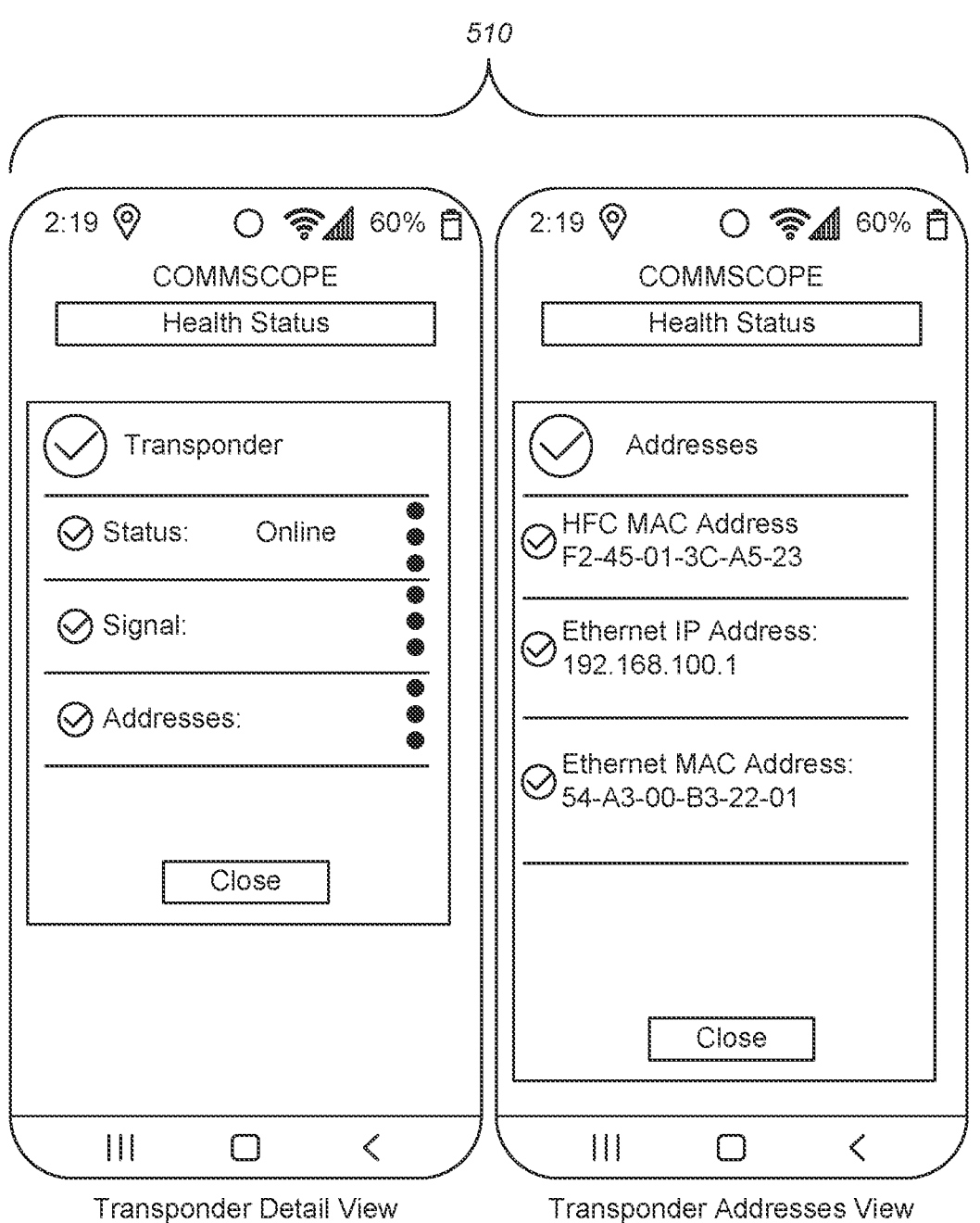

As shown in FIG. 20G, tapping on the 3 vertical dots on the Signal line brings up the Signal detail view, which shows the transponder's RF Signal configuration and status. It is expected that transponders will typically have only a single downstream and single upstream channel allocated. If multiple channels are allocated, the RF fields must be duplicated as required. Values that are within range may be marked with a green checkmark while values that cross the warning threshold may be marked with a yellow line icon. Values that cross the alarm threshold may be marked with a red "X" icon. These operational status state indicators propagate to the main Health Status view. As shown in FIG. 20H, tapping on the 3 vertical dots on the Addresses line shown in the first panel of FIG. 20F brings up the Addresses detail view, which shows the transponder's MAC and IP addresses. These fields are either blank with no icon or are populated with a green check mark icon.

Figure 21A:
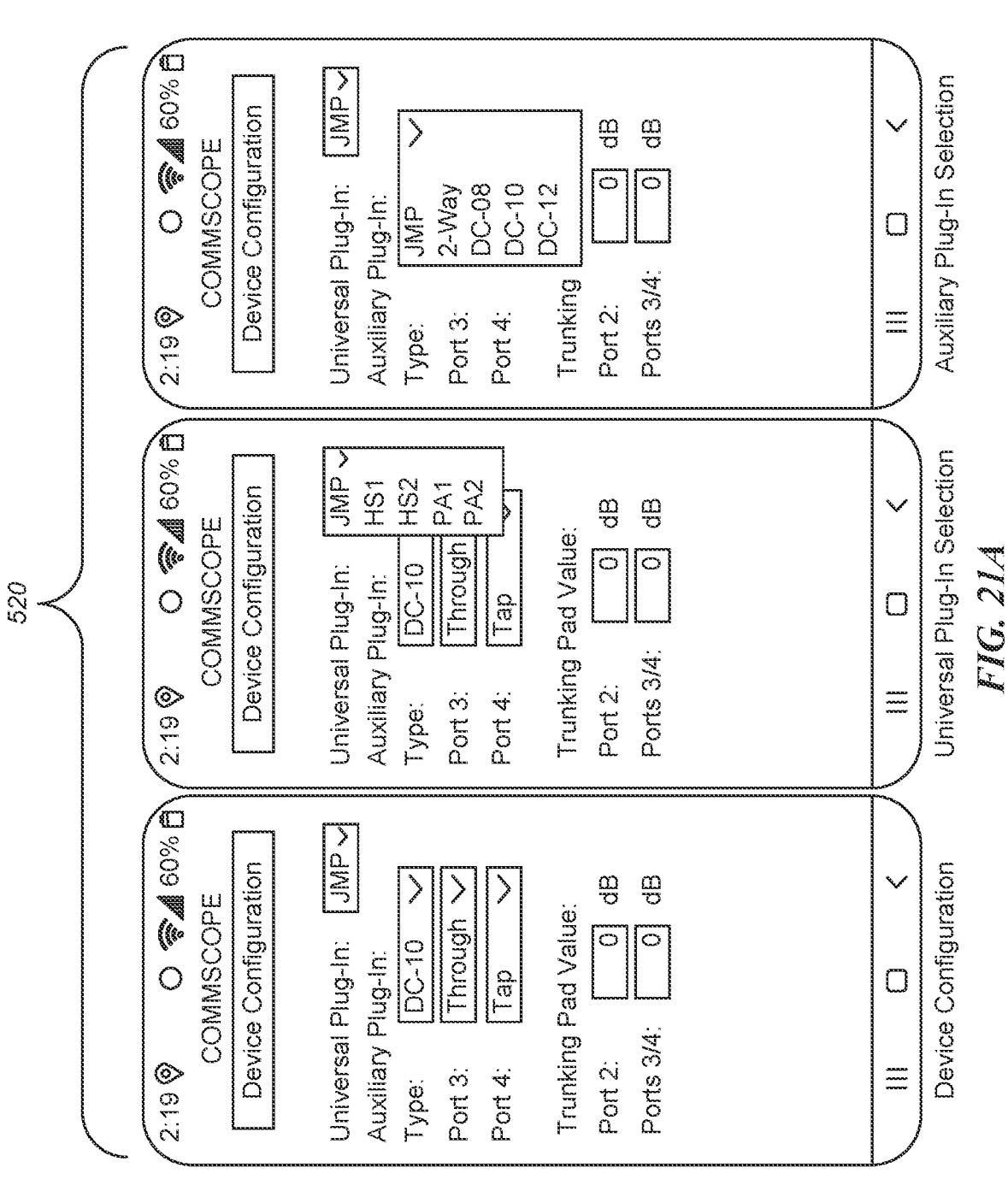
Figure 21B:
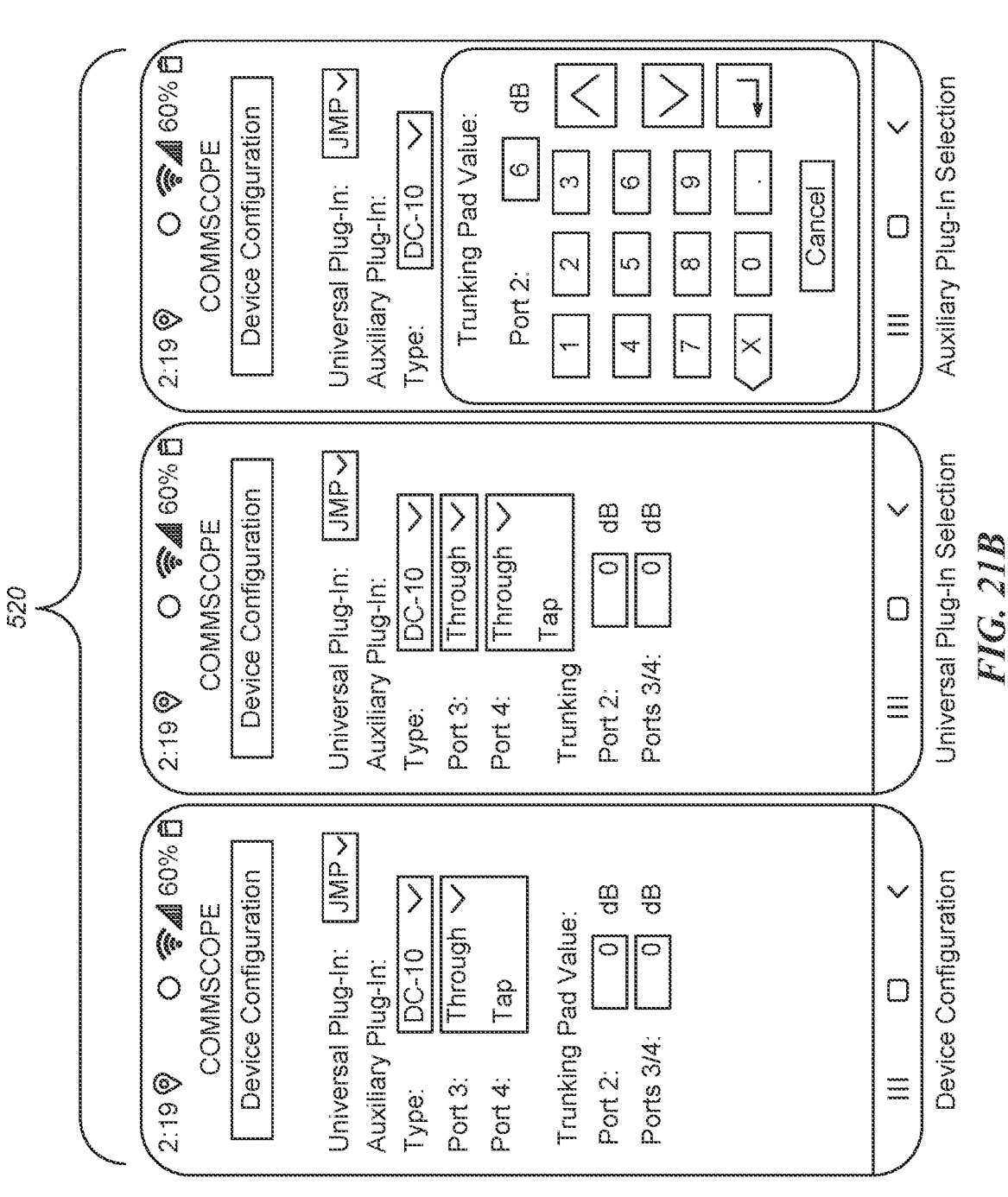
Figure 21C:
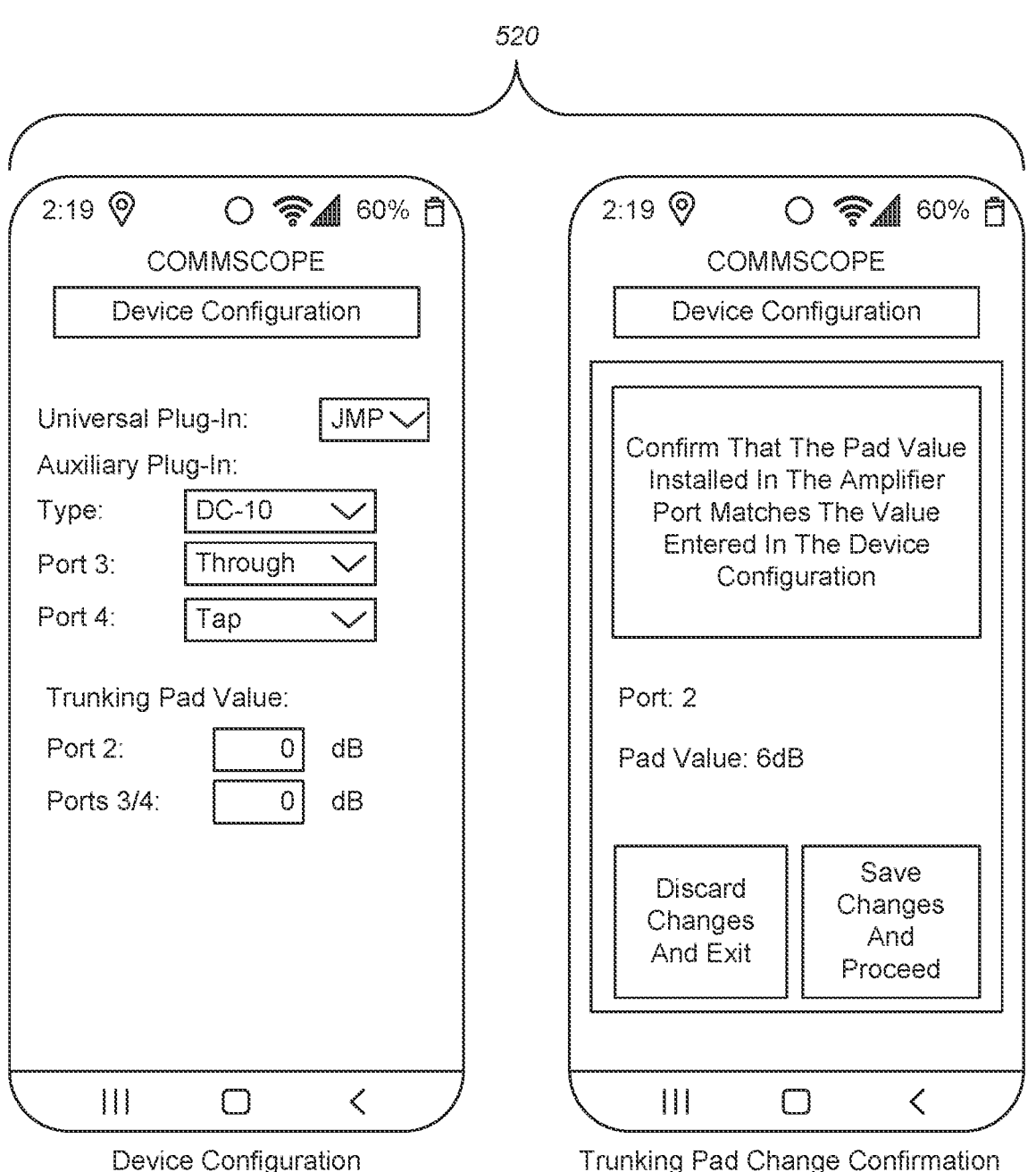

FIGS. 21A-21C show a Device Configuration interface 520 that is accessed when the device configuration button 506b, shown in FIG. 19 is selected. The Device Configuration interface allows the user to enter details of the configuration of the amplifier into the application. Preferably, all fields are pull-downs, except for the Trunking Pad Value fields. Each pull-down list indicates the currently selected value using bold text. Each pull-down list keeps the option list constant and does not rearrange based on the option selected.

Once a pull-down field is selected, clicking elsewhere on the screen closes the pull-down and keeps the selection unchanged. FIGS. 21A-21C show example configuration options for a bridger amplifier MB180. (In the case of a line-extender BLE180 the options for the Auxiliary Plug-ins and the Ports: 3/4 trunking pad are removed.) The Universal plug-in pull-down menu, which applies a "signature correction" to the entire downstream signal, allows the selection of a default "JMP" option along with "haystack" (HS1 and HS2) options and "peak attenuator" (PA1 and PA2) options. Once the Auxiliary Plug-in is selected, the options available under the Port 3 and Port 4 selection fields are adjusted.

When "JMP" is selected, the options available are "through" and "N/C." When "2-way" is selected, the only option is "through." When any of "DC-8, DC-10, or DC-12" is selected, the options are "through" and "tap." Thus, if 2-way is selected, both Port 3 and Port 4 are populated with "through." For all other Plug-in selections, when one option is selected in either Port 3 or Port 4, the other port is automatically populated with the other option, thereby preventing both ports from having matching selections.

When configuring the Trunking Pad Value, clicking in the data entry box brings up a number pad and shows which port is being modified. The up/down arrows in the number pad allow the user to increment or decrement in 0.5 dB steps. Only values of 0 dB or greater are allowed. The user may change the Trunking Pad Values using the number pad. After the user taps "Enter" on the number pad, the Trunk Pad Value Confirmation screen is launched which queries the user to confirm that a matching pad is installed in the trunking pad location in the amplifier. The confirmation screen is launched any time either pad value is changed. After tapping "Save Changes and Proceed" on the confirmation screen, the user is returned to the Device Configuration Menu and the Trunking Pad Value is updated.

Figure 22A:
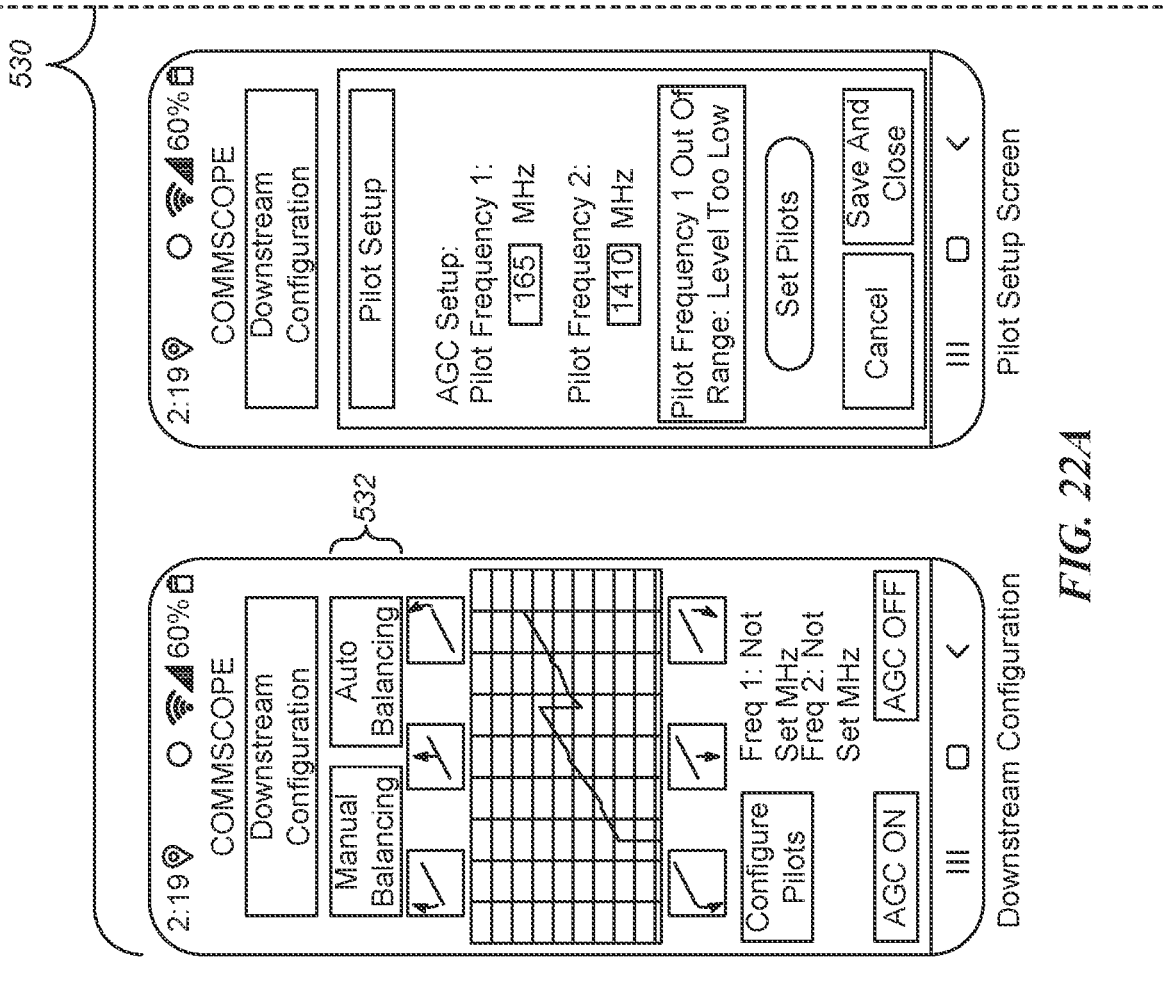
Figure 22A:
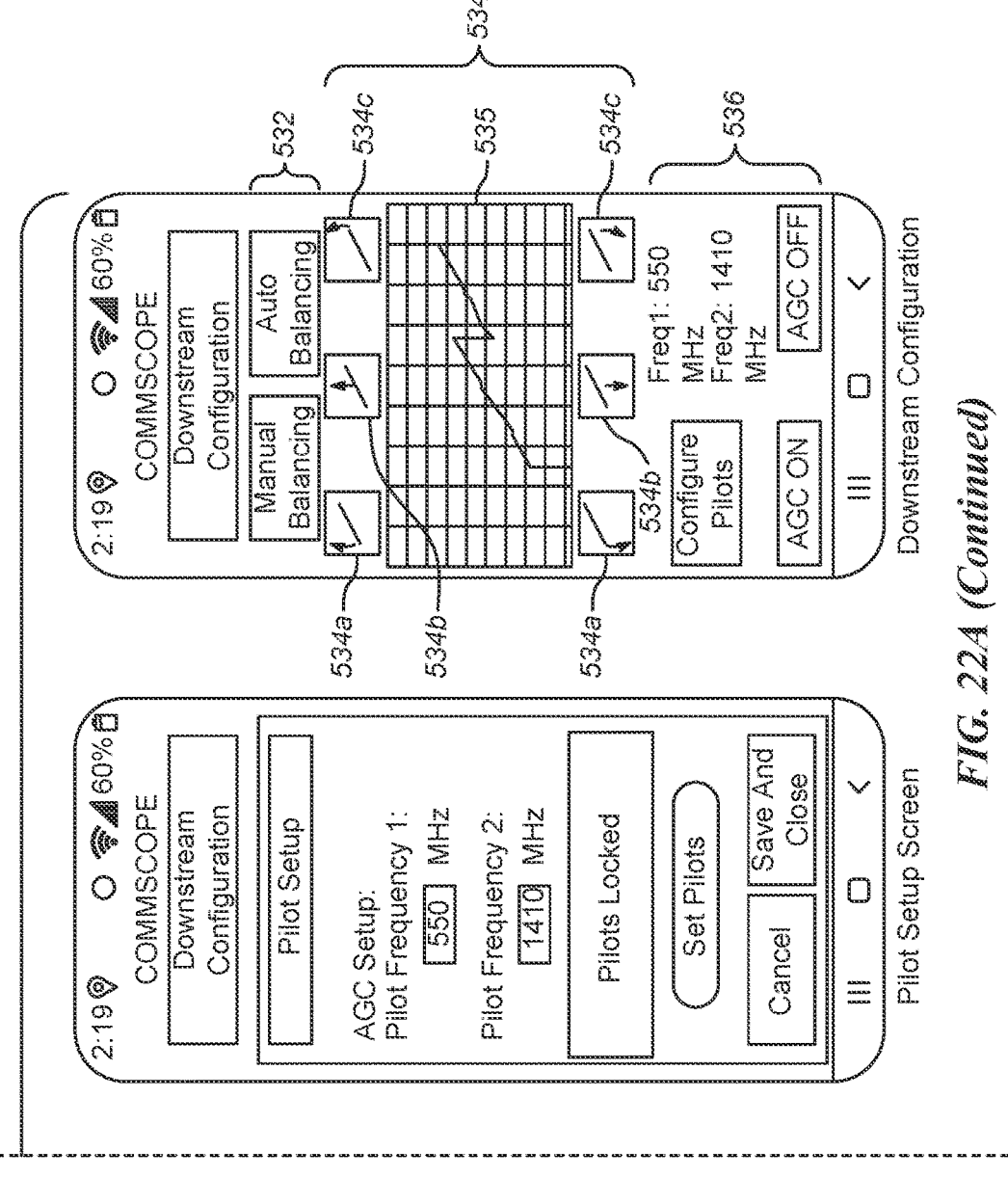
Figure 22B:
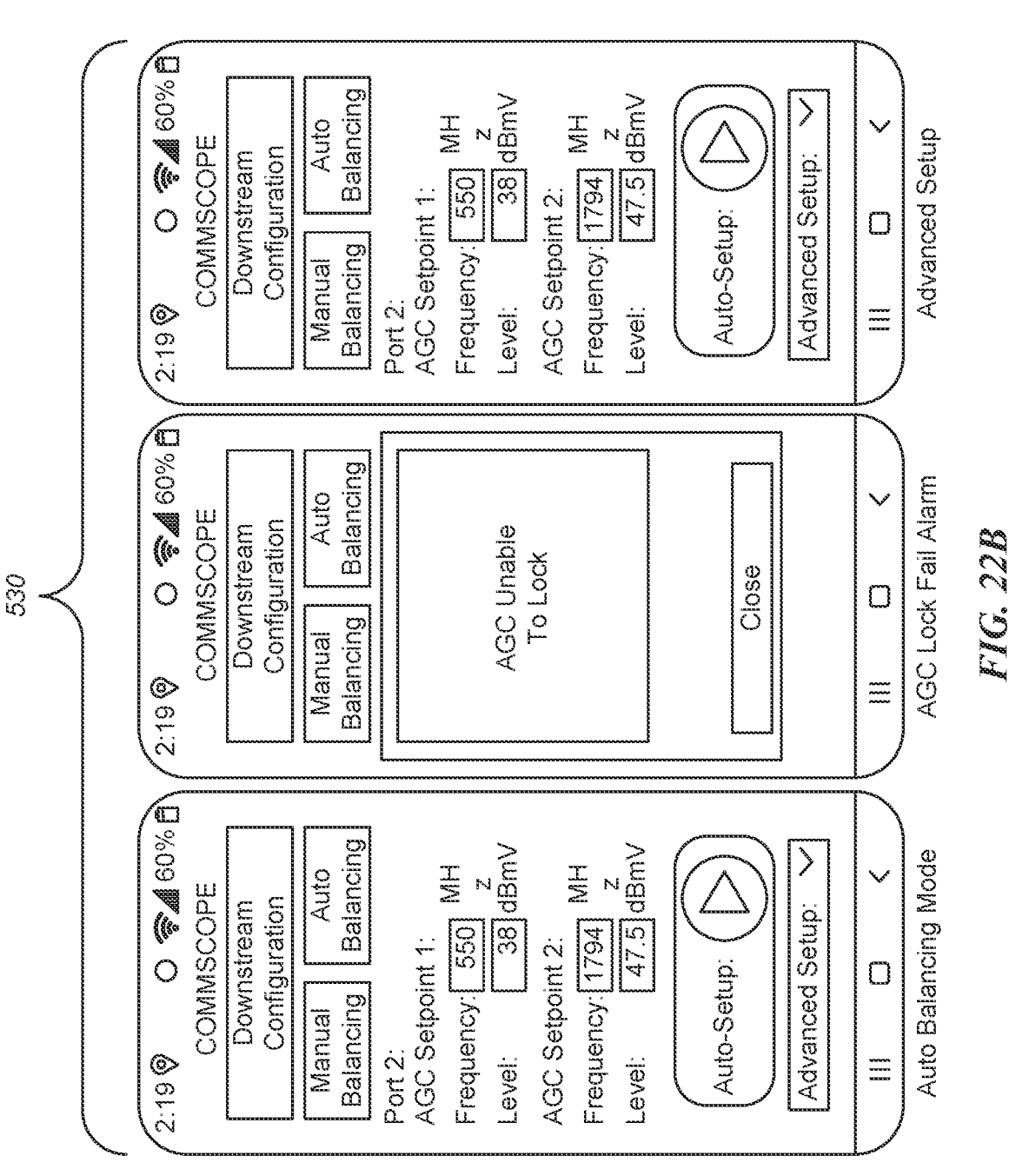

FIGS. 22A and 22B show a novel Downstream Configuration interface 530 accessed when a user selected button 506c in FIG. 19. The Downstream Configuration interface 530 presents a primary screen shown in FIG. 22A that includes an upper portion 532 that shows radio buttons by which a user may select either a manual balancing option or an auto balancing option, and also includes a lower portion 536 that presents radio buttons by which a user may turn AGC on or off, and may configure pilot frequencies.

The configuration interface 530 also presents a central portion 534 by which the user may manually configure the levels (attenuation) and tilt (equalization or cable simulation) in the downstream direction and using a novel interface that is easy and intuitive for the user. Specifically, the central portion 534 of the interface 530 presents six user-selectable buttons that together allow the user to set the levels and tilt of the amplifier in three types of actions. First, the user may choose to adjust the tilt of the amplifier by pinning the gain at the highest frequency of the downstream spectrum and using two buttons 534a to either raise or lower the gain at the lowest frequency of the downstream spectrum. This essentially hinges the tilt of the amplifier at the high downstream spectrum frequency and allows the tilt to be adjusted accordingly. Second, the user may do the opposite; adjusting the tilt of the amplifier by pinning the gain at the lowest frequency of the downstream spectrum and using two buttons 534c to either raise or lower the gain at the highest frequency of the downstream spectrum. This essentially hinges the tilt of the amplifier at the low end of the downstream spectrum and allows the tilt to be adjusted accordingly. Third, the user may adjust the level (attenuation) of the amplifier using the middle buttons 534b to either raise or lower the overall level of the amplifier. The central portion 534 also includes a display 535 that visually represents the changes made using the buttons 534a, 534b, and 534c.

As can easily be appreciated from FIG. 22A, the configuration interface 530 allows a user/technician to easily manually configure pilots and adjust the levels and tilt of the amplifier, while receiving real-time, visual feedback of not only the settings and adjustments being made.

The default for the first time the amplifier is powered up is AGC OFF and pilots Not Set. When these are changed, these states must persist over power cycling. When manual balancing is selected, the six buttons 534a, 534b, 534c can be used to adjust the level and tilt in 0.5 dB increments.

When the Configure Pilots button is tapped, the Pilot Setup Screen is launched. If pilot frequencies are selected that have too low of a level, an alarm is issued and shown in this dialog and in the health status screen. The user is not allowed to update/save the new pilot frequencies if the pilot level(s) are out of range.

The radio buttons at the bottom switch between AGC ON and AGC OFF. Pilot hold mode is a sub-state of AGC ON. If the amplifier is in pilot hold mode and the user switches the AGC state to AGC OFF, and then back to AGC ON, the amp returns to pilot hold mode with the prior hold targets until the pilot(s) return.

As seen in FIG. 22B, when the user taps the "Auto Balancing" button on the top of the Downstream Configuration screen, the Auto Setup view may be loaded. The user is able to set AGC setpoint frequencies in 1 MHz steps and the level targets in 0.5 dB steps. When the user clicks into the data entry box, a number pad (not shown) is launched which shows the field being set, and presents up and down arrows that allow for incrementing and decrementing the frequency in 1 MHz steps and the level in 0.5 dB steps.

When the "Auto-Setup" button is tapped, the amplifier adjusts gain and slope in order to satisfy the Output Level targets. If the amplifier is unable to lock, a warning message is displayed. When the Advanced Setup pull down box is tapped, it expands to show the current Gain and Tilt and pre-populates the fine tune fields with the current Gain and Tilt. When the user clicks into the data entry box, a number pad is launched which shows the field being set. The up and down arrows allow for incrementing and decrementing the level in 0.5 dB steps. If Fine Tune is different from the levels determined by "Auto Setup" the Advanced Setup pull-down stays open.

Figure 23A:
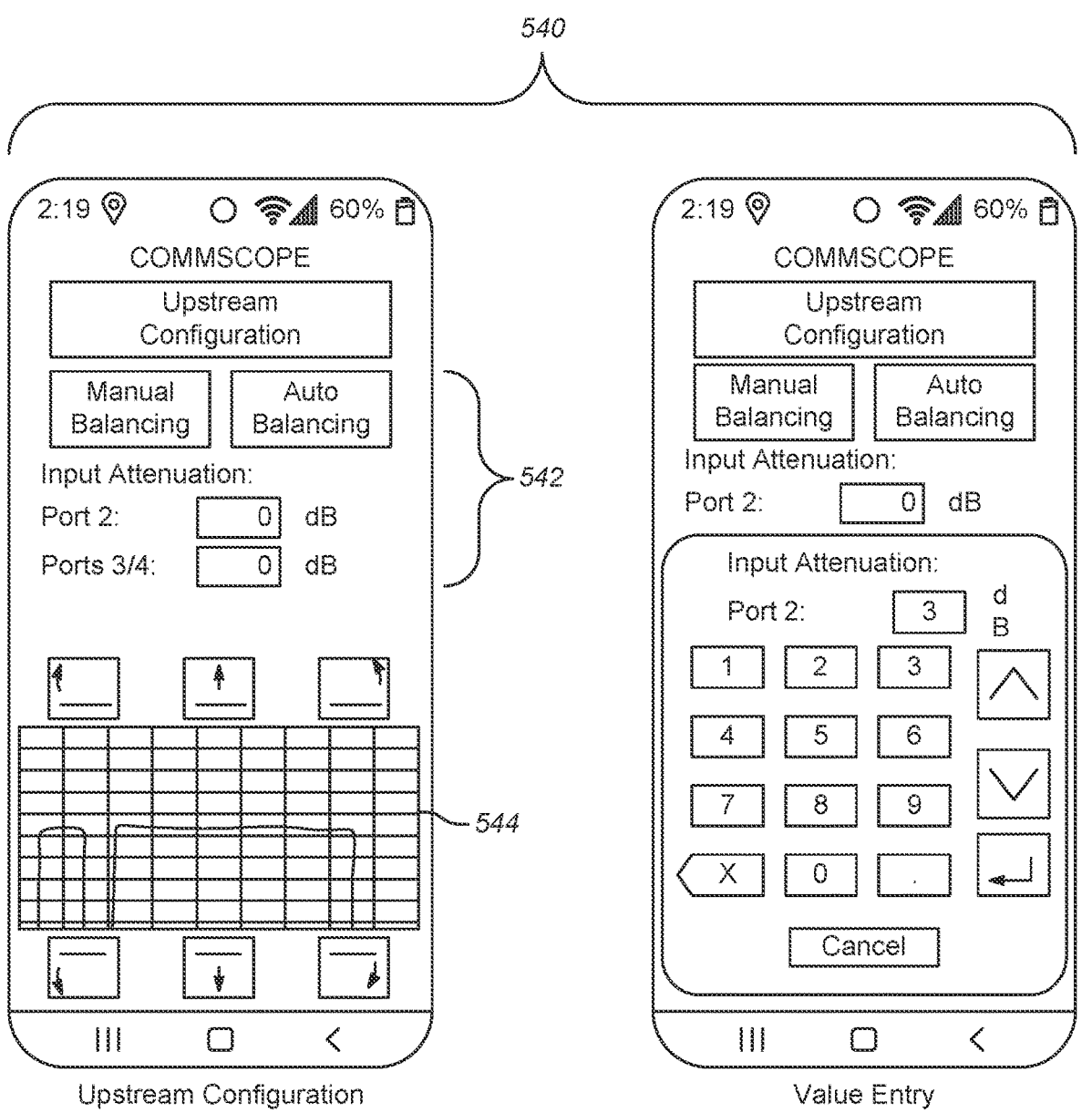
Figure 23B:
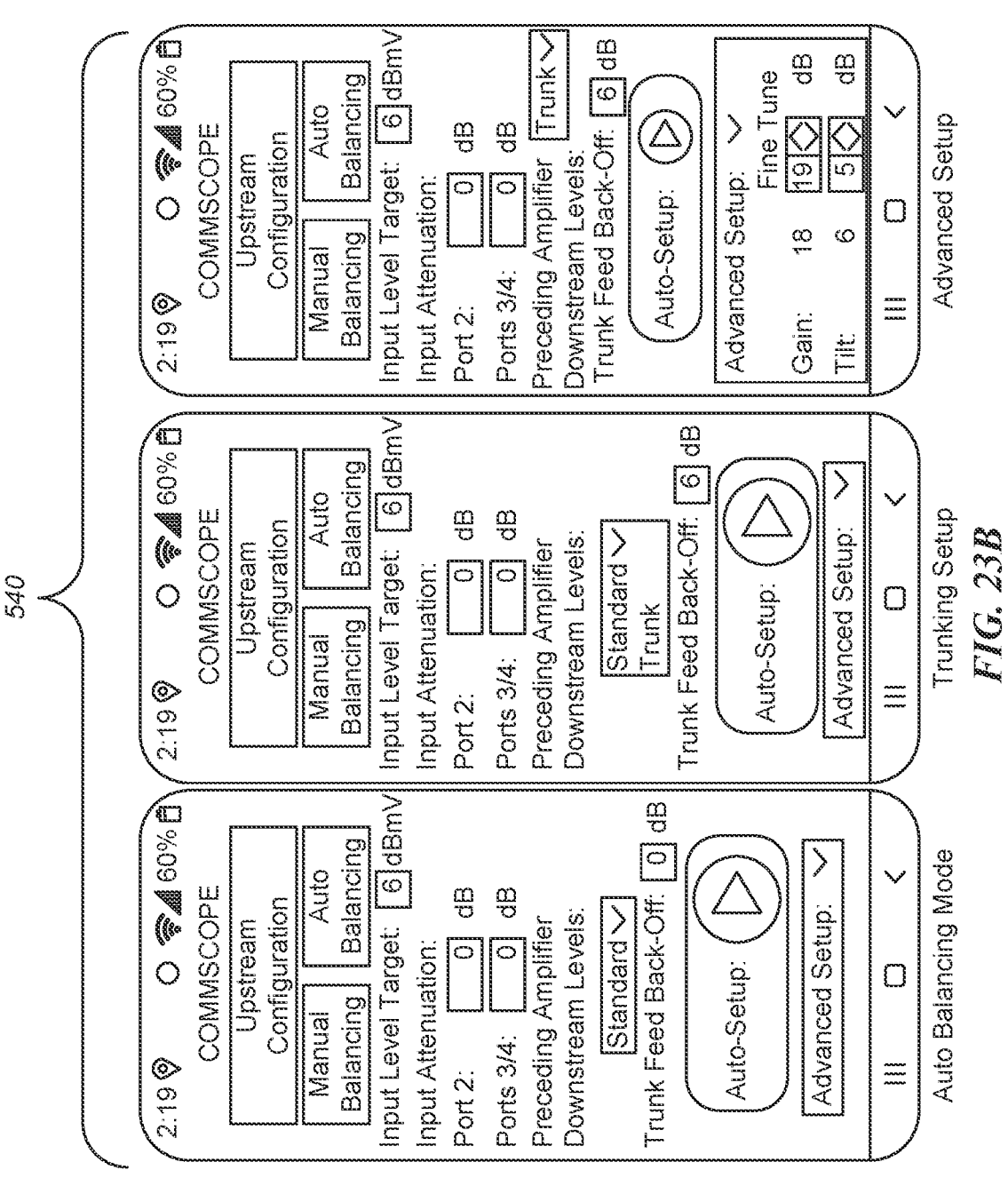

FIGS. 23A and 23B show a novel Upstream Configuration interface 540 accessed when a user selected button 506d in FIG. 19. The Upstream Configuration interface 540 presents a primary screen shown in FIG. 23A that includes an upper portion 542 that shows radio buttons by which a user may select either a manual balancing option or an auto balancing option, along with also setting input attenuation levels, and also includes a lower portion 544 by which the user may manually configure the levels (attenuation) and tilt (equalization or cable simulation) of the amplifier in the upstream direction, and using a novel interface that is easy and intuitive for the user. Specifically, the lower portion 544 of the interface 540 presents six user-selectable buttons and a display like the ones shown in FIG. 22A with respect to the downstream direction.

Manual Balancing mode for the Upstream is selected using the radio buttons at the top of the Upstream Configuration interface. Input attenuation can be set in 0.5 dB increments and persists through a power cycling event. When the user clicks in the data entry box a number pad is used to enter a value. The up and down arrows allow the user to increment or decrement in 0.5 dB steps. The 6 square buttons can be used to adjust the level and tilt in 0.5 dB increments.

Upstream AGC mode follows what is set in the downstream direction. When the user taps the "Auto Balancing" button on the top of the Downstream Configuration screen as seen in FIG. 23B, the Auto Setup view is loaded. When the user clicks in the data entry boxes, a number pad is launched (not shown) which applies to the field being set. The up and down arrows preferably allow for incrementing and decrementing the level in 0.5 dB steps. A pull-down menu is used to inform the Auto-Setup algorithm whether the link feeding the amplifier station is running at trunked levels.

When the "Auto-Setup" button is tapped, the amplifier adjusts gain and slope in order to satisfy the Output Level targets. When the Advanced Setup pull down box is tapped, it expands to show the current Gain and Tilt and pre-populates the fine tune fields with the current Gain and Tilt. When the user clicks into the data entry box, a number pad (not shown) is launched which shows the field being set. The up and down arrows allow for incrementing and decrementing the level in 0.5 dB steps. If Fine Tune is different from the levels determined by "Auto Setup" the Advanced Setup pull-down stays open.

FIGS. 24A-24D show an Advanced Diagnostics interface 550 accessed when a user selected button 506e in FIG. 19. The Advanced Diagnostics screen provides two options for selection, an Ingress Control button 552 and a Spectrum Analyzer button 554.

Figure 24A:
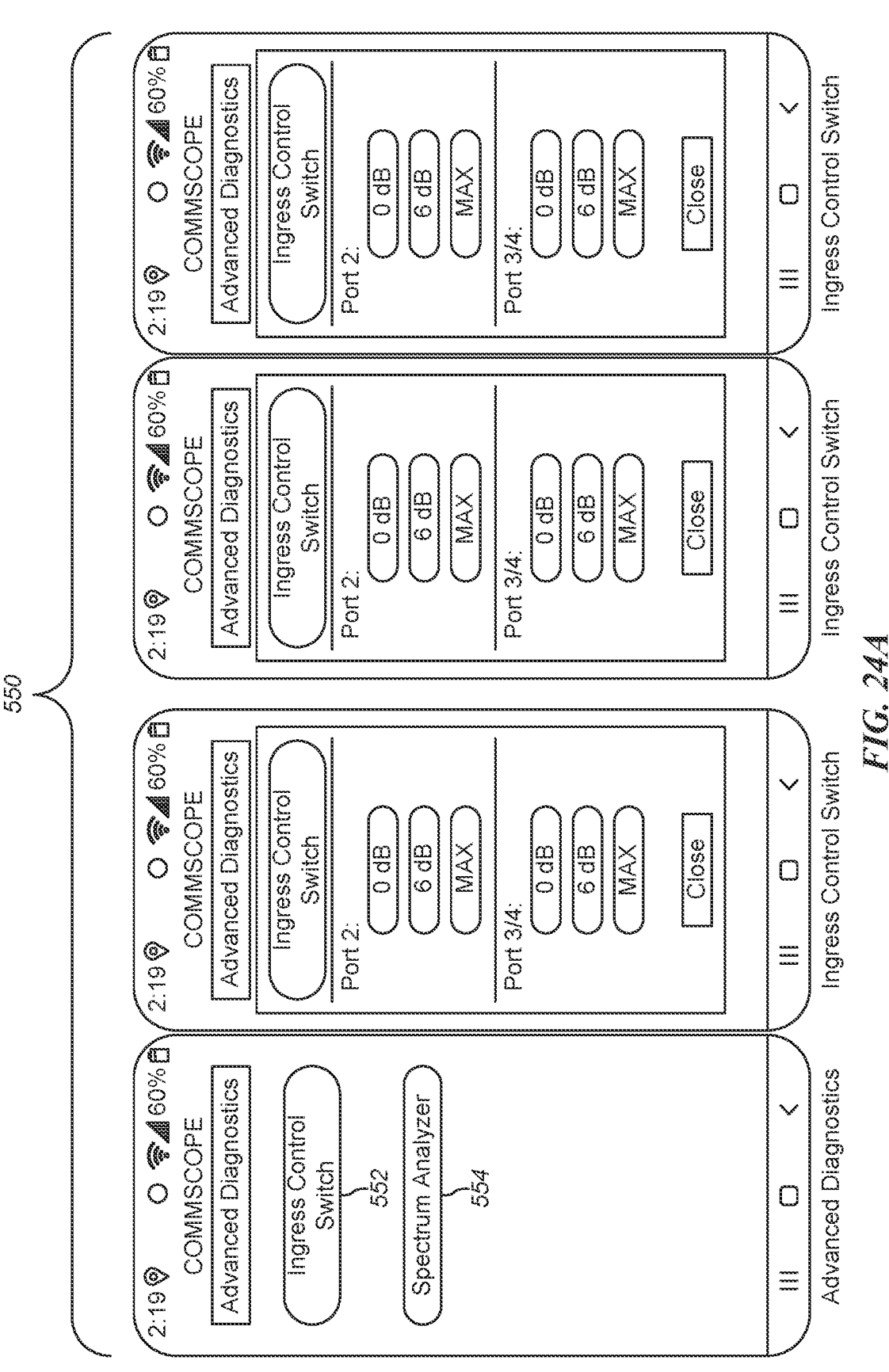

Tapping the Ingress Control button 552 brings up the screens shown in FIG. 24A. These screens may be used to temporarily add attenuation to an amplifier for the purposes of diagnosing the source of noise in a system; if adding attenuation to an amplifier dramatically reduces the noise observed in the network, this means that the source of the noise must be located in a direction feeding the input to the amplifier. For multi-port amplifiers, each port can have its attenuation adjusted independently. Any attenuation applied is added to any input attenuation that is set in the Upstream Configuration. If either the 6 dB or Max settings are selected, the system will automatically revert to 0 dB after a predetermined period of time. This reversion occurs to guard against the possibility that the user forgets to reset the attenuation settings to the operational 0 dB value, in which case modems could go offline unless the operational attenuation setting is reset in time. In preferred embodiments, this predetermined period of time is 15 seconds, which is the time that the inventors experimentally determined to typically cause modems to go offline.

Figure 24B:
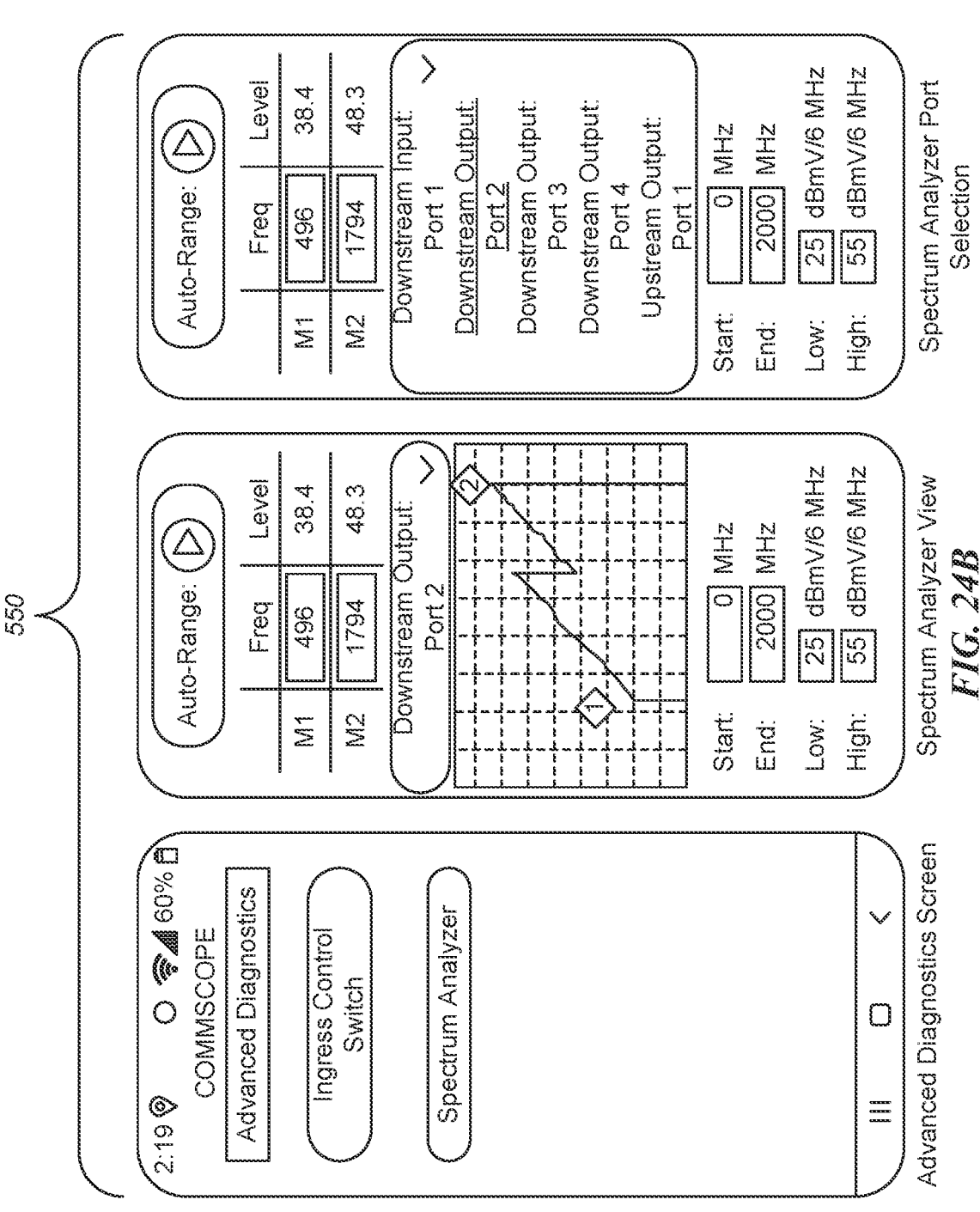

Tapping the Spectrum Analyzer button 554 brings up the Spectrum Analyzer screens shown in FIG. 24B, which shows an equalizer display 555 that includes a graphical representation of level as a function of frequency for the amplifier. Tapping the Auto-Range button sets the Y-Axis of this graphic to match the full dynamic range of the Spectrum Analyzer and the X-Axis to a range of 0 MHz to 2000 MHz. The view supports 2 markers which can be adjusted in frequency using the data entry fields in the marker table. Levels are reported in dBmV/6 MHz.

The Spectrum Analyzer display also preferably includes a pull-down menu that allows the user to select between the DS input and all of the DS and US outputs. When Auxiliary Outputs are selected, the levels shown reflect the loss of the Auxiliary Plug-in defined in the Device Configuration page. When the Auxiliary Plug-in is defined as a JMP, the unused DS output port is removed from the pull-down menu. All data entry fields can be set by tapping in the data entry box, which brings up a number pad that allows for frequency to be adjusted in 1 MHz steps and level to be adjusted in 0.5 dB steps.

Figure 24C:
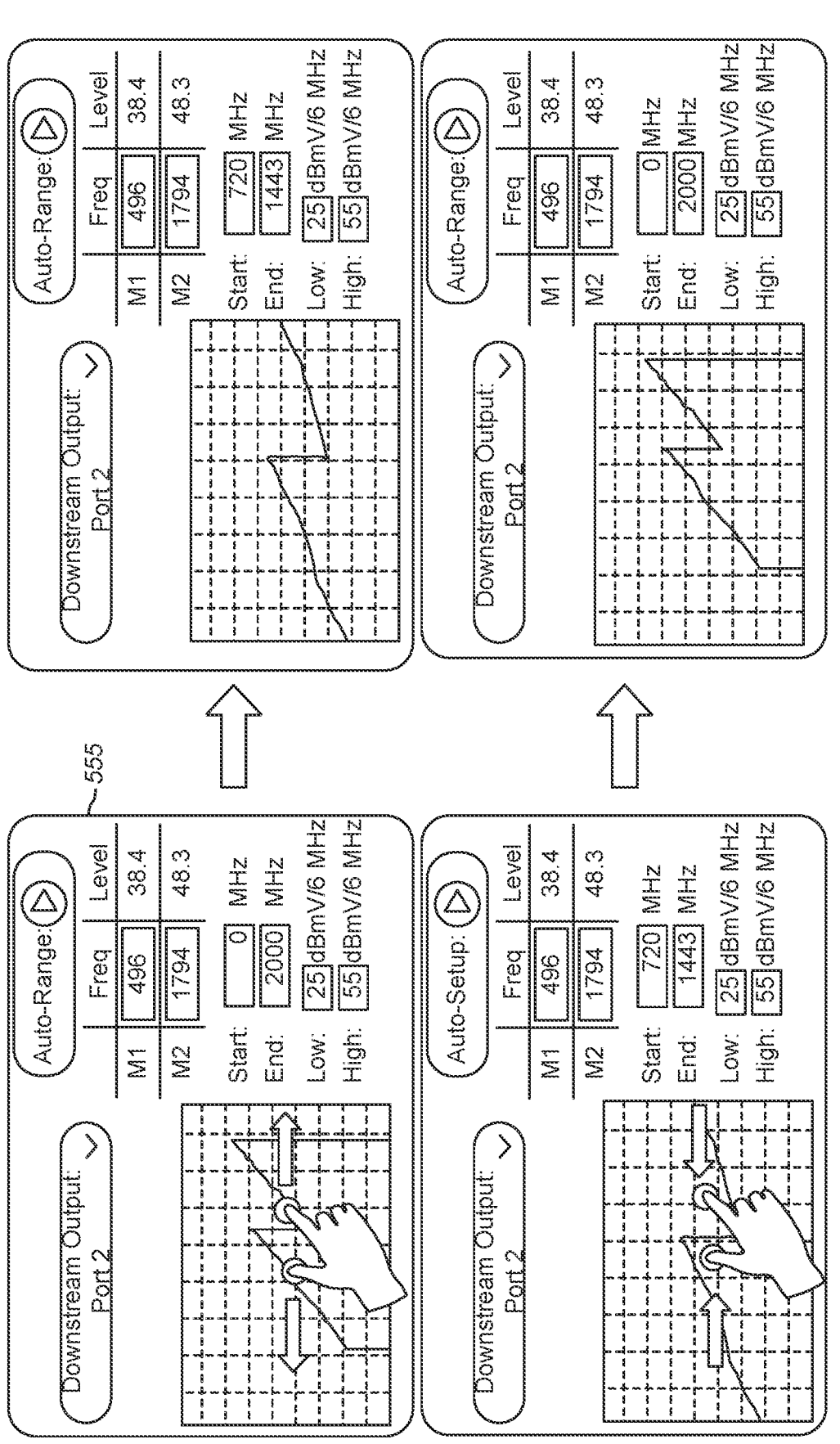
Figure 24D:
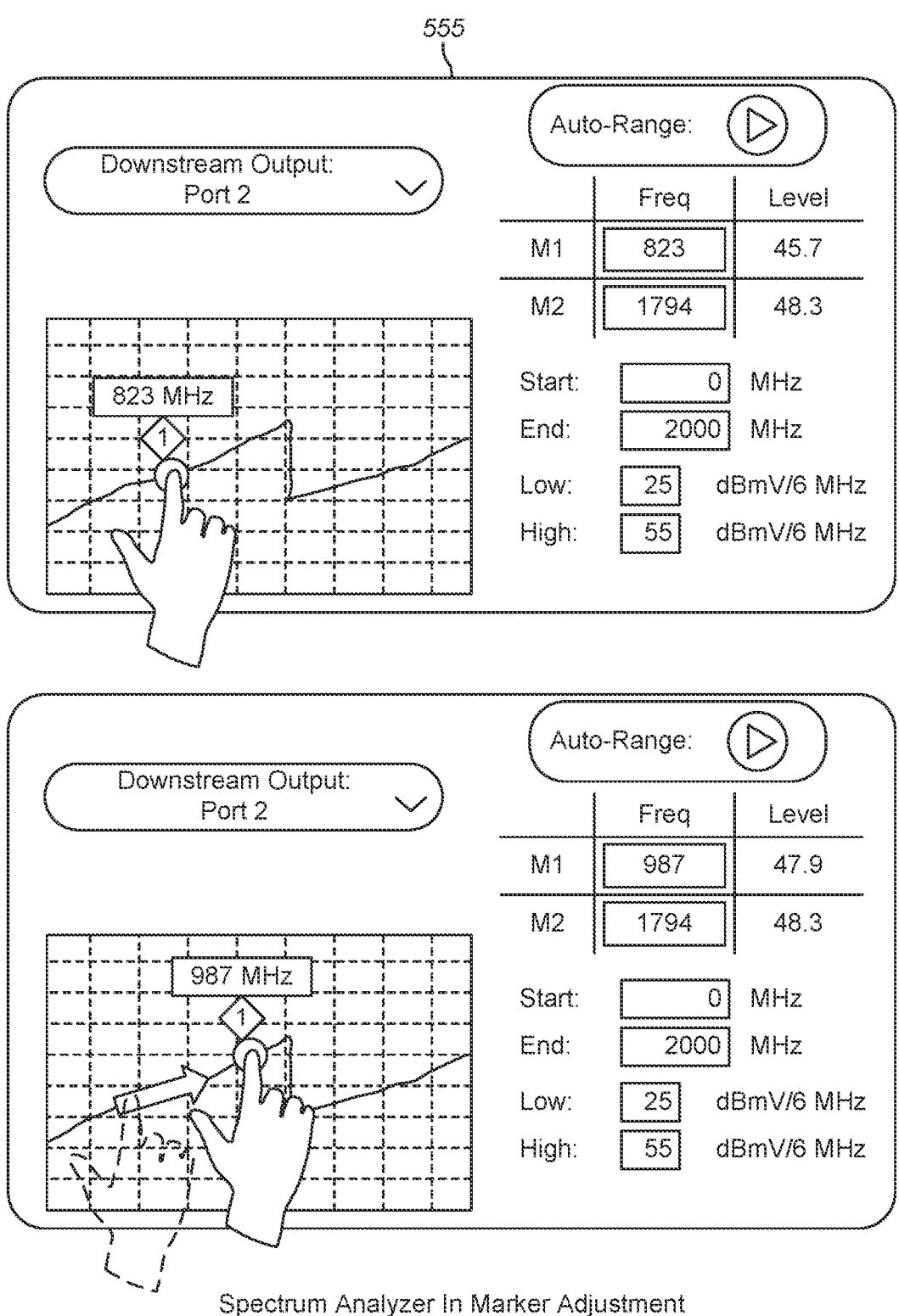

As shown in FIGS. 24C and 24D, The Spectrum Analyzer view preferably also includes/allows a landscape orientation. All functions work the same in landscape orientation as they do in portrait orientation; only the layout is changed. The Auto-Range button stays at the top of the screen in order to reduce the likelihood of inadvertently pressing this button and undoing manual setting changes.

Once in the Spectrum Analyzer view, the user can use the touch screen to change the zoom, spreading the fingers to zoom in and pinching the fingers to zoom out. In addition to adjusting the markers using the data entry boxes, the user can also use the touch screen. The user can snap the marker to a point on the spectrum by holding their finger on the screen in a fixed point for 2 seconds, at which point the phone would give a small response vibration. This action sets the X-Axis positioning of the marker, which continues to track the spectrum plot in the Y-Axis. Once the marker is selected in this way, the user can drag their finger left and right and adjust the marker location in real time. Throughout this process, the marker table values are updated in real time as well.

FIGS. 25A-25F each show a Utilities interface 560 accessed when a user selected button 506*e* in FIG. 19. The Advanced Diagnostics screen provides six buttons for selection: a Device Information button 562, an Activity Log button 563, a Geolocate button 564, an Adaptive Power button 565, a Transponder button 556, and a Firmware button 567.

Figure 25A:
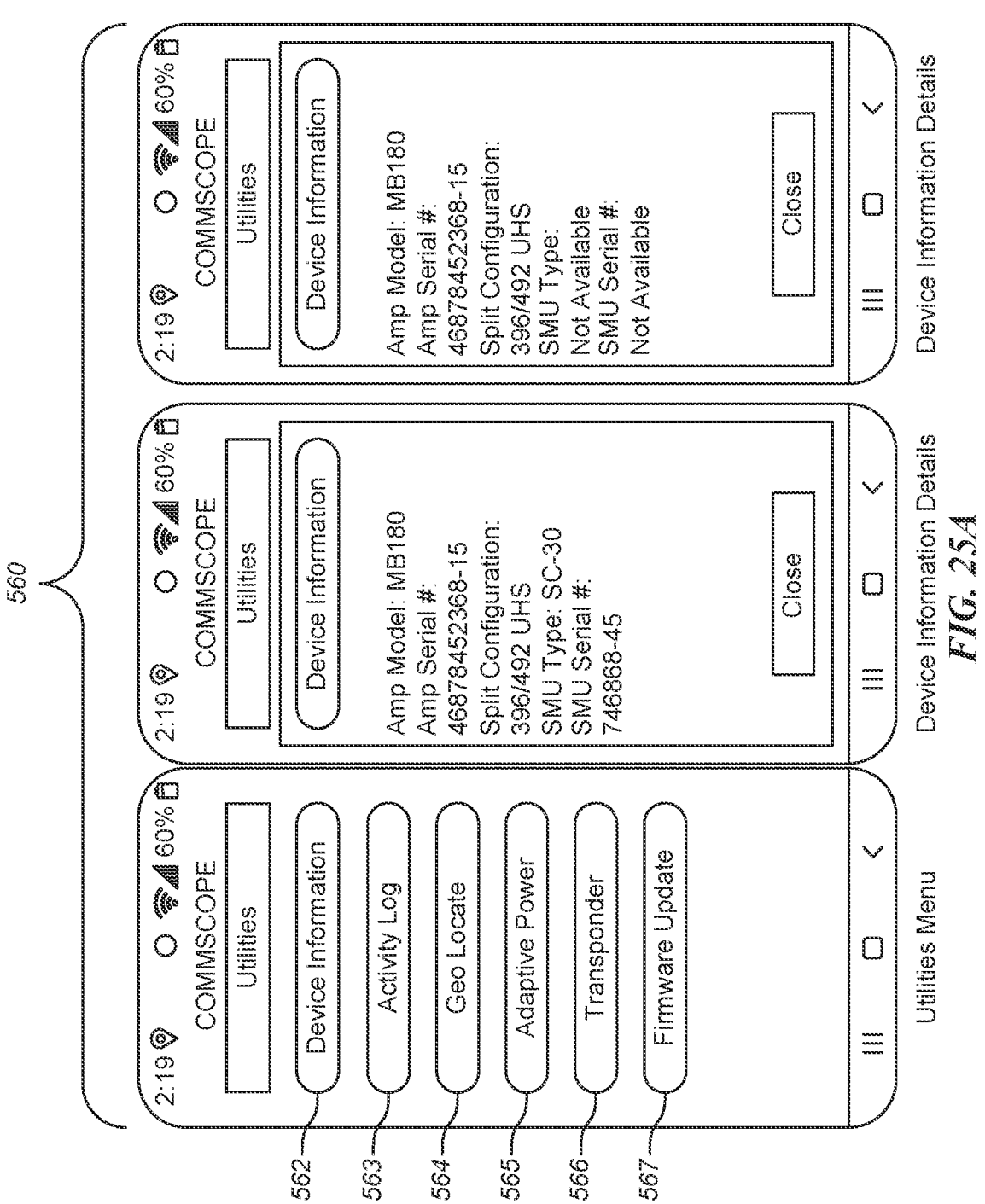
Figure 25B:
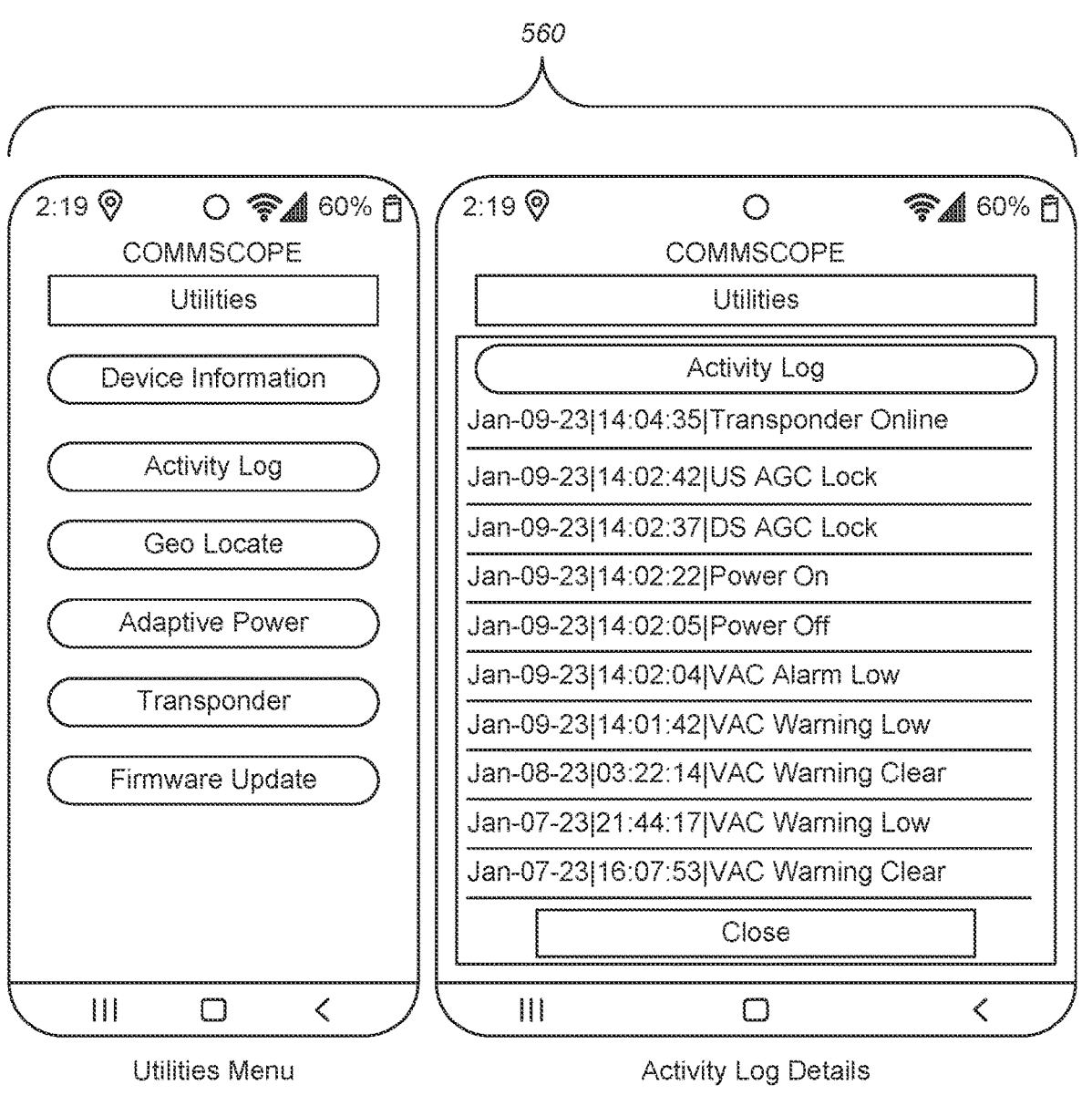

When the Device Information button 562 is selected, the third and fourth screens of FIG. 25A are presented, which contain no user configurable parameters. The amplifier Model and Serial Number fields are set in the factory. The Split Configuration is set by querying the RPF plug-in. The SMU Type is set by querying the SMU (Signal Monitoring Unit). If either the RPF or SMU are removed, those fields should read "Not Available." The Activity Log details screen shown in FIG. 25 B, and selected using button 563, continues major amplifier operational events with date and time stamps.

Figure 25C:
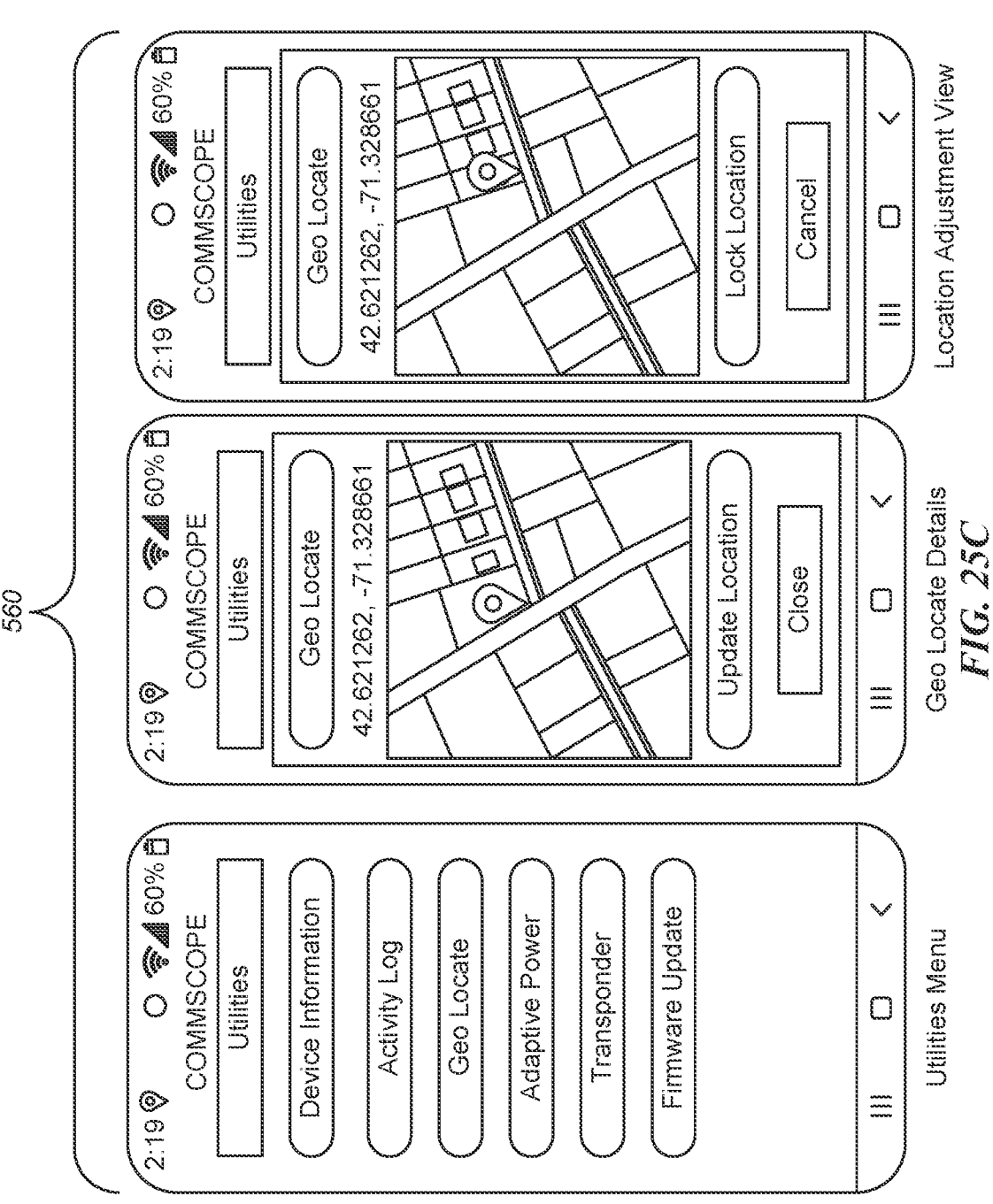

The Geo Locate view, selected using button 564 and shown in FIG. 25C allows the user to store the physical location of the amplifier. When the user taps on the Update Location button, the location adjustment screen is launched. If no existing location has been stored, this view defaults to showing the current location as determined by the phone GPS. The user can then drag the location icon wherever wanted on the screen. Once the user finds the location that they want to store they can click the Lock Location button to store it. If an existing location has been stored, the location adjustment view shows the existing location as a semi-transparent icon and initially places the non-transparent updated location as the current location determined by the GPS. The user can then drag the updated location icon wherever wanted on the screen. Once the user finds the location that they want to store they can click the Lock Location button to store it. When updating the location, if the user drags the location icon, the location icon is moved and the map is fixed. If the user drags the map, the map moves within the screen and the icons stay fixed relative to the map and shift about the screen.

Figure 25D:
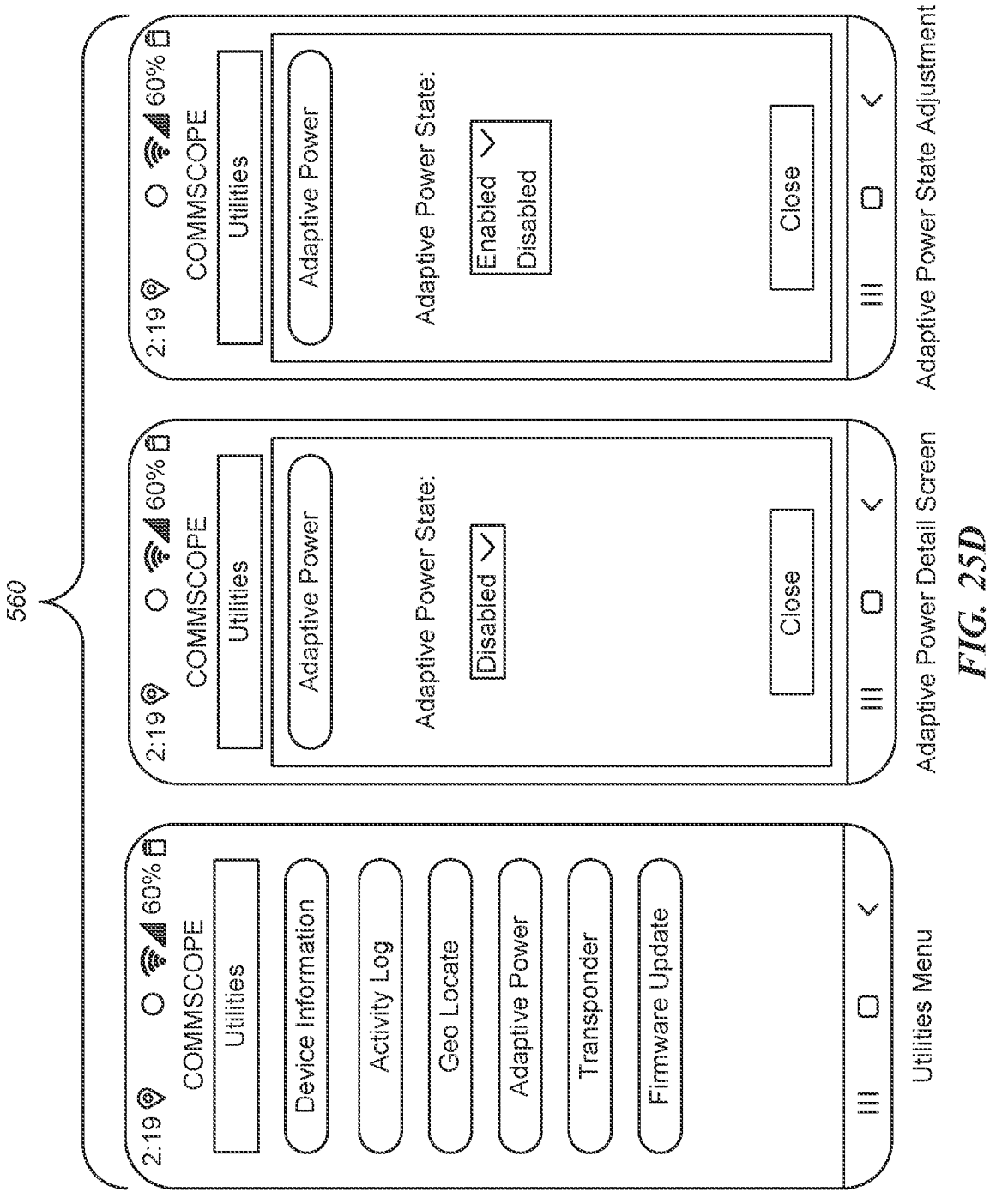

The Adaptive Power view, selected using button 565 and shown in FIG. 25D allows the user to enable and disable the adaptive power state which adjusts the bias current on the output gain block(s) based on the TCP (Total Composite Power) of the downstream spectrum.

Figure 25E:
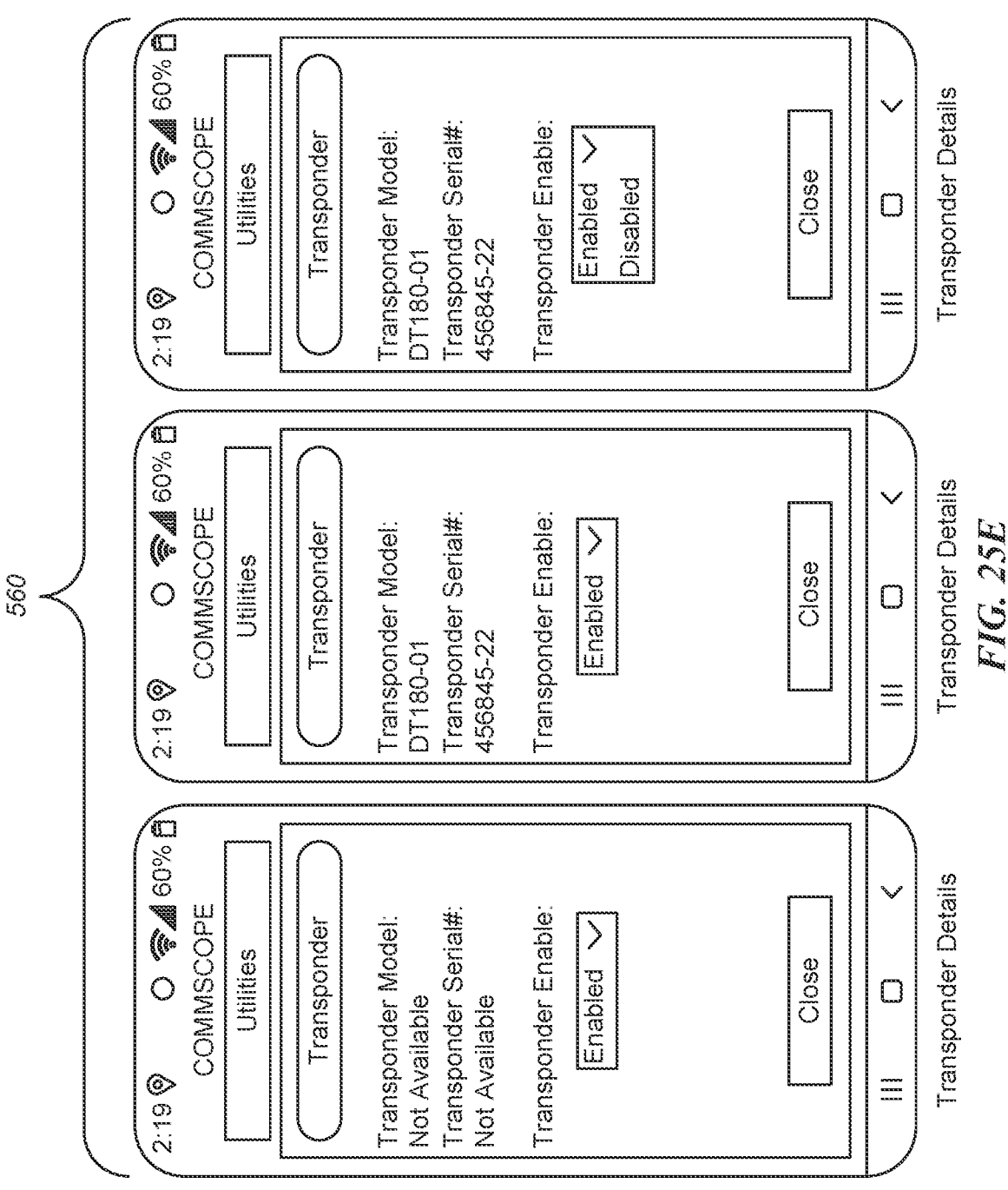

The Transponder detail view, selected using button 566 and shown in FIG. 25E displays the transponder model and serial number, both of which are not user settable and are instead queried from the transponder. If these values are not able to be read, these fields will be populated with the text: Not Available. There is a pull-down menu that allows the user to locally enable or disable the transponder.

Figure 25F:
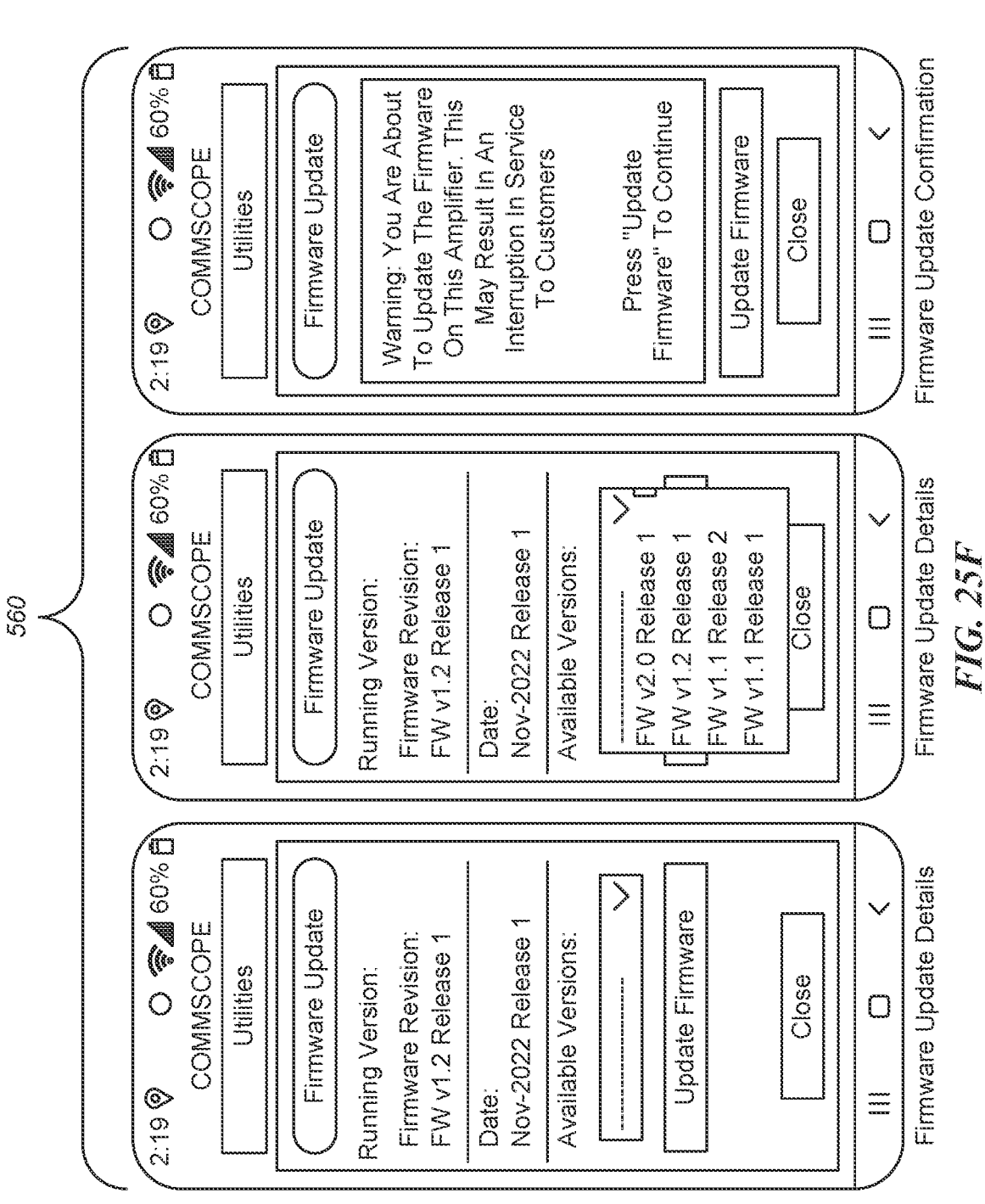

The Firmware Update view, selected using button 567 and shown in FIG. 25F allows the user to check the current firmware version that is running on the amplifier, with details that include firmware release version and release date. A pull-down menu shows the list of firmware versions that are available on the user device for updating the amplifier. After the user selects the firmware release and taps the Update Firmware button, a confirmation screen is launched that includes a warning message.

It is important that the amplifier maintains operational configuration through the upgrade process in order to minimize customer impact through the upgrade. The upgrade should not require the technician to rebalance or reconfigure the amplifier unless absolutely necessary. It is understood that a firmware update may require a reset which may cause a momentary interruption in operation.

Those of ordinary skill in the art will appreciate that, although the disclosed user interface showed and described "buttons" by which a user could configure the settings of an amplifier, alternative interfaces or icons may be used, such as sliders, dials etc. In such alternative embodiments, a different number of icons may be used to enable the same functionality or functionalities as described in this specification. For example, although FIGS. 22A-22B show six buttons that together allow three independent adjustments of the level and tilt of an amplifier, these same three independent adjustments could be provided by only three sliders or three dials. Other alternative embodiments may accomplish the same with only two icons, where one is used to cycle through the three types of adjustments and the other is used to make the quantitative (up or down) adjustment.

Similarly, those of ordinary skill in the art will appreciate that the same functionality as described and shown with respect to FIGS. 22A, 22B, 23A, and 23B could be accomplished using only two independent adjustments i.e., a first adjustment that adjusts the tilt of the amplifier by pinning the gain at the highest frequency of the downstream spectrum and using two buttons 534*a* to either raise or lower the gain at the lowest frequency of the downstream spectrum, as well as a second adjustment that adjusts the tilt of the amplifier by pinning the gain at the lowest frequency of the downstream spectrum and using two buttons 534*c* to either raise or lower the gain at the highest frequency of the downstream spectrum. Using these two adjustments in succession or combination will necessarily also adjust the net attenuation of the amplifier, substituting for buttons 534*b*.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A computing device having a processor and memory, and configured to interact with a plurality of amplifiers in a communications network, wherein said communications network is capable of sending signals in an upstream direction and a downstream direction through said plurality of amplifiers, each of the respective amplifiers having configurable settings for level and tilt, said device comprising:

(a) a communication interface to selectively enable interaction with one of said plurality of amplifiers;

(b) when said device interacts with one of said plurality of amplifiers, the device being configured to display a graphical user interface that displays a visual representation of contemporaneous settings for level and tilt of said one of said plurality of amplifiers along with a plurality of user-interactive icons that together allow a user to manually adjust the contemporaneous settings for level and tilt, and such that the adjustments are reflected in the displayed visual representation;

(c) said device being capable of manual adjustment of said contemporaneous settings for level and tilt of said one of said plurality of amplifiers in said upstream direction and independently of manual adjustment of said contemporaneous settings for level and tilt of said one of said amplifiers in said downstream direction; and (d) said device being capable of independent manual adjustment of said contemporaneous settings for level and tilt of said one of said plurality of amplifiers in said upstream direction and said device being capable of independent manual adjustment of said contemporaneous settings for level and tilt of said one of said plurality of amplifiers in said downstream direction.

2. The computing device of claim 1 where the plurality of user-interactive icons enable at least two independent adjustments.

3. The computing device of claim 2 where the at least two independent adjustments include: (a) fixing the level of said one of said plurality of amplifiers at a first frequency while allowing the level of said one of said plurality of amplifiers at a second frequency to be raised or lowered; and (b) fixing the level of said one of said plurality of amplifiers at the second frequency while allowing the level of said one of said plurality of amplifiers at the first frequency to be raised or lowered.

4. The computing device of claim 3 including a third independent adjustment, the third independent adjustment selectively raising or lowering contemporaneous settings for level of said one of said plurality of amplifiers.

5. The computing device of claim 1 including at least four of the user-interactive icons.

6. The computing device of claim 5 including six user-interactive icons.

7. The computing device of claim 1 including an interface that enables a user to enter at least two pilot frequencies at which the computing device may measure an output level of said one of said plurality of amplifiers.

8. The computing device of claim 7 including a different user interactive icon, not included in said plurality of user-interactive icons, that causes the computing device to automatically maintain the output levels of said one of said plurality of amplifiers attained at the pilot frequencies during the manual adjustment of said one of said plurality of amplifiers.

9. The computing device of claim 8 where the output levels of said one of said plurality of amplifiers at the pilot frequencies are automatically maintained by automatically adjusting the level and tilt of said one of said plurality of amplifiers from the settings made during the manual adjustment of said one of said plurality of amplifiers.

10. The computing device of claim 1 having respective pluralities of the user-interactive icons, each plurality associated with a respective one of an upstream signal through the amplifier and a downstream signal through said one of said plurality of amplifiers.

11. A method for configuring contemporaneous settings for level and tilt of an amplifier in a communications network, said communications network capable of sending signals in an upstream direction and a downstream direction through said amplifier, performed by a computing device having a processor and a memory, the method comprising:

displaying a visual representation of the amplifier's contemporaneous settings for level and tilt along with a plurality of user-interactive icons; and accepting manual input via the plurality of user interactive icons, while simultaneously updating the displayed visual representation of the amplifier's contemporaneous settings for level and tilt to reflect the manual input;

wherein the plurality of user interactive icons enable manual adjustment of said contemporaneous settings for level and tilt of said one of said plurality of amplifiers in said upstream direction and independently of manual adjustment of said contemporaneous settings for level and tilt of said one of said amplifiers in said downstream direction; and wherein the plurality of user interactive icons enable independent manual adjustment of said contemporaneous settings for level and tilt of said one of said plurality of amplifiers in said upstream direction and also enable independent manual adjustment of said contemporaneous settings for level and tilt of said one of said plurality of amplifiers in said downstream direction.

12. The method of claim 11 where the plurality of user-interactive icons enable at least two independent manual adjustments.

13. The method of claim 12 where the at least two independent adjustments include: (a) fixing the level of the amplifier at a first frequency while allowing the level of the amplifier at a second frequency to be raised or lowered; and (b) fixing the level of the amplifier at the second frequency while allowing the level of the amplifier at the first frequency to be raised or lowered.

14. The method of claim 13 including a third independent adjustment, the third independent adjustment selectively raising or lowering the amplifier's contemporaneous settings for level.

15. The method of claim 11 where there are at least four of the user-interactive icons displayed.

16. The method of claim 15 where there are at least six of the user-interactive icons displayed.

17. The method of claim 11 implemented on an interface that enables a user to enter at least two pilot frequencies at which the computing device may measure an output level of the amplifier.

18. The method of claim 17 including displaying a different user interactive icon, not included in said plurality of user-interactive icons, that causes the computing device to automatically maintain the output levels of the amplifier attained at the pilot frequencies during manual adjustment of the amplifier.

19. The method of claim 18 where the output levels of the amplifier at the pilot frequencies are automatically maintained by automatically adjusting the level and tilt of the amplifier from settings made during the manual adjustment of the amplifier.

20. The method of claim 11 having respective pluralities of the user-interactive icons, each plurality associated with a respective one of an upstream signal through the amplifier and a downstream signal through the amplifier.

* * * * *